(12) United States Patent
Beck et al.

(10) Patent No.: US 10,199,649 B2
(45) Date of Patent: Feb. 5, 2019

(54) LITHIUM RICH NICKEL MANGANESE COBALT OXIDE (LR-NMC)

(71) Applicant: QuantumScape Corporation, San Jose, CA (US)

(72) Inventors: Larry Beck, Ann Arbor, MI (US); Kevin Du, San Jose, CA (US)

(73) Assignee: QuantumScape Corporation, San Jose, CA (US)

( * ) Notice: Subject to any disclaimer, the term of this patent is extended or adjusted under 35 U.S.C. 154(b) by 224 days.

(21) Appl. No.: 14/978,808

(22) Filed: Dec. 22, 2015

(65) Prior Publication Data

US 2016/0211517 A1    Jul. 21, 2016

Related U.S. Application Data

(60) Provisional application No. 62/096,510, filed on Dec. 23, 2014.

(51) Int. Cl.
*H01M 10/052* (2010.01)
*H01M 4/505* (2010.01)
(Continued)

(52) U.S. Cl.
CPC ........... *H01M 4/505* (2013.01); *C01G 53/50* (2013.01); *H01M 4/02* (2013.01); *H01M 4/131* (2013.01); *H01M 4/525* (2013.01); *H01M 4/62* (2013.01); *C01P 2002/32* (2013.01); *C01P 2002/52* (2013.01); *C01P 2002/54* (2013.01); *C01P 2002/72* (2013.01); *C01P 2002/74* (2013.01); *C01P 2002/76* (2013.01); *C01P 2002/77* (2013.01); *C01P 2004/03* (2013.01);
(Continued)

(58) Field of Classification Search
CPC .................. H01M 10/0525; H01M 10/052
See application file for complete search history.

(56) References Cited

U.S. PATENT DOCUMENTS

| | | | |
|---|---|---|---|
| 4,567,031 A * | 1/1986 | Riley | C01G 23/005 252/519.1 |
| 5,738,957 A | 4/1998 | Amine et al. | |

(Continued)

FOREIGN PATENT DOCUMENTS

CN    1547277 A    11/2004

OTHER PUBLICATIONS

Hwang et al. (J. Mater. Chem., 2003, 13, 1962-1968).*
(Continued)

*Primary Examiner* — Olatunji A Godo
(74) *Attorney, Agent, or Firm* — Squire Patton Boggs (US) LLP

(57) ABSTRACT

Set forth herein are positive electrode active material compositions, e.g., lithium-rich nickel manganese cobalt oxides. The lithium-rich nickel manganese cobalt oxides set forth herein are characterized, in some examples, by an expanded unit cell which maximizes the uniform distribution of transition metals in the crystalline oxide. Also set forth herein are positive electrode thin films including lithium-rich nickel manganese cobalt oxide materials. Disclosed herein are novel and inventive methods of making and using lithium-rich nickel manganese cobalt oxide materials for lithium rechargeable batteries. Also disclosed herein are novel electrochemical devices which incorporate these materials.

63 Claims, 27 Drawing Sheets

(51) Int. Cl.
  *H01M 4/02* (2006.01)
  *H01M 4/525* (2010.01)
  *H01M 4/131* (2010.01)
  *H01M 4/62* (2006.01)
  *C01G 53/00* (2006.01)

(52) U.S. Cl.
  CPC ...... *C01P 2004/51* (2013.01); *C01P 2004/61* (2013.01); *C01P 2004/62* (2013.01); *C01P 2004/64* (2013.01); *C01P 2006/11* (2013.01); *C01P 2006/40* (2013.01); *H01M 2004/021* (2013.01); *H01M 2004/028* (2013.01)

(56) References Cited

U.S. PATENT DOCUMENTS

| | | | |
|---|---|---|---|
| 5,783,332 | A | 7/1998 | Amine et al. |
| 6,204,219 | B1 | 3/2001 | Brezny et al. |
| 6,333,128 | B1* | 12/2001 | Sunagawa ............ C01G 3/006 429/218.1 |
| 6,420,069 | B2 | 7/2002 | Amine et al. |
| 6,613,478 | B2* | 9/2003 | Munakata .......... C01G 45/1228 429/231.95 |
| 6,613,479 | B2* | 9/2003 | Fukuzawa .......... C01G 45/1228 429/231.95 |
| 6,623,890 | B2* | 9/2003 | Munakata .......... C01G 45/1228 429/224 |
| 6,677,082 | B2 | 1/2004 | Thackeray et al. |
| 6,680,143 | B2 | 1/2004 | Thackeray et al. |
| 6,964,828 | B2 | 11/2005 | Lu et al. |
| 7,078,128 | B2 | 7/2006 | Lu et al. |
| 7,135,252 | B2 | 11/2006 | Thackeray et al. |
| 7,205,073 | B2 | 4/2007 | Kim et al. |
| 7,314,684 | B2 | 1/2008 | Kang et al. |
| 7,468,223 | B2 | 12/2008 | Thackeray et al. |
| 7,517,613 | B2 | 4/2009 | Yuasa et al. |
| 7,709,149 | B2 | 5/2010 | Paulsen et al. |
| 7,968,235 | B2 | 6/2011 | Amine et al. |
| 8,241,791 | B2 | 8/2012 | Lu et al. |
| 8,268,198 | B2 | 9/2012 | Shin et al. |
| 8,277,683 | B2 | 10/2012 | Deng et al. |
| 8,492,030 | B2 | 7/2013 | Park et al. |
| 8,591,774 | B2 | 11/2013 | Koenig et al. |
| 8,685,565 | B2 | 4/2014 | Lu et al. |
| 8,865,348 | B2 | 10/2014 | Sun et al. |
| 2005/0164084 | A1 | 7/2005 | Adamson et al. |
| 2008/0314482 | A1 | 12/2008 | Suzuki et al. |
| 2010/0068376 | A1 | 3/2010 | Chen et al. |
| 2010/0151332 | A1* | 6/2010 | Lopez .................. H01M 4/131 429/231.95 |
| 2011/0260099 | A1* | 10/2011 | Paulsen ................ C01G 53/006 252/182.1 |
| 2012/0064395 | A1 | 3/2012 | Chang et al. |
| 2012/0282522 | A1 | 11/2012 | Axelbaum et al. |
| 2013/0202502 | A1 | 8/2013 | Schulz-Dobrick et al. |
| 2014/0193714 | A1 | 7/2014 | Kim et al. |
| 2015/0050522 | A1 | 2/2015 | Manthiram et al. |
| 2015/0099169 | A1 | 4/2015 | Dudney et al. |

OTHER PUBLICATIONS

Wei et al. (RSC Advances, 2012, 2, 3423-3429).*
U.S. Appl. No. 90/012,243, filed Jul. 19, 2013, Thackeray et al.
Amaresh, S. et al., "Facile synthesis of ZrO2 coated Li2CoPO4F cathode materials for lithium secondary batteries with improved electrochemical properties," Journal of Power Sources, 244, 2013, pp. 395-402.
Amatucci, Glenn et al., "Fluoride based electrode materials for advanced energy storage devices," Journal of Fluorine Chemistry, vol. 128, Issue 4, Apr. 2007, pp. 243-262.
Amine, K. et al., "A New Three-Volt Spinel $Li_{1+x}Mn_{1.5}Ni_{0.5}O_4$ for Secondary Lithium Batteries," J. Electrochem. Soc., vol. 143, No. 5, May 1996, pp. 1607-1613.

Ariyoshi, Kingo et al., "Structural change of $LiNi_{1/2}Mn_{1/2}O_2$ during charge and discharge in nonaqueous lithium cells," Journal of Physics and Chemistry of Solids, 69, 2008, pp. 1238-1241.
Armstrong, A. Robert et al., "Demonstrating Oxygen Loss and Associated Structural Reorganization in the Lithium Battery Cathode $Li[Ni_{0.2}Li_{0.2}Mn_{0.6}]O_2$," J. Am. Chem. Soc. 2006, 128, pp. 8694-8698.
Armstrong, A. Robert et al., "Synthesis of layered $LiMnO_2$ as an electrode for rechargeable lithium batteries," Nature, vol. 381, Jun. 6, 1996, pp. 499-500.
Armstrong, A. Robert et al., "The Layered Intercalation Compounds $Li(Mn_{1-y}Co_y)O_2$: Positive Electrode Materials for Lithium-Ion Batteries," Journal of Solid State Chemistry, 145, 1999, pp. 549-556.
Ates, Mehmet Nurullah et al., "Mitigation of Layered to Spinel Conversion of a Li-Rich Layered Metal Oxide Cathode Material for Li-Ion Batteries," Journal of the Electrochemical Society, 161 (3), 2014, pp. A290-A301.
Aurbach, Doron et al., "Studies of Aluminum-Doped $LiNi_{0.5}Co_{0.2}Mn_{0.3}O_2$: Electrochemical Behavior, Aging, Structural Transformations, and Thermal Characteristics," Journal of the Electrochemical Society, 162 (6), (2015), pp. A1014-A1027.
Bains, J. et al., "$Li(Ni_{0.40}Mn_{0.40}Co_{0.15}Al_{0.05})O_2$: A promising positive electrode material for high-power and safe lithium-ion batteries," Journal of Power Sources, 196, 2011, pp. 8625-8631.
Bareño, J. et al., "Local Structure of Layered Oxide Electrode Materials for Lithium-Ion Batteries," Adv. Mater., 2010, 22, pp. 1122-1127.
Bareño, J. et al., "Long-Range and Local Structure in the Layered Oxide $Li_{1.2}Co_{0.4}Mn_{0.4}O_2$," Chem. Mater., 2011, 23, pp. 2039-2050.
Benedek, R. et al., "Theory of Overlithiation Reaction in $LiMO_2$ Battery Electrodes," Chem. Mater., 2006, 18, pp. 1296-1302.
Bettge, Martin et al., "Improving high-capacity $Li_{1.2}Ni_{0.15}Mn_{0.55}Co_{0.1}O_2$-based lithium-ion cells by modifiying the positive electrode with alumina," Journal of Power Sources, 233, 2013, pp. 346-357.
Bhattacharya, Jishnu et al., "Prediction of Quaternary Spinel Oxides as Li-Battery Cathodes: Cation Site Preference, Metal Mixing, Voltage and Phase Stability," Journal of the Electrochemical Society, 161 (9), 2014, pp. A1440-A1446.
Caldin, E.F. et al., "Kinetics and Thermodynamics of the Complex-formation of Nickel(II) and Cobalt(II) Ions with Ammonia and Pyridine-2-azodimethylaniline in Water, at Pressures from 1 bar to 2 kbar," Journal of the Chemical Society, Farady Transactions 1, vol. 68, 1972, pp. 2247-2258.
Camardese, J. et al., "Synthesis of Spherical Core-Shell $Ni(OH)_2$—$Ni_{1/2}Mn_{1/2}(OH)_2$ Particles via a Continuously Stirred Tank Reactor," Journal of the Electrochemical Society, 161 (6), 2014, pp. A890-A895.
Cheng, Ho-Ming et al., "Enhanced Cycleability in Lithium Ion Batteries: Resulting from Atomic Layer Depostion of $Al_2O_3$ or $TiO_2$ on $LiCoO_2$ Electrodes," J. Phys. Chem. C, 2012, 116, pp. 7629-7637.
Chiang, Yet-Ming et al., "High Capacity, Temperature-Stable Lithium Aluminum Manganese Oxide Cathodes for Rechargeable Batteries," Electrochemical and Solid-State Letters, 2 (3) (1999) pp. 107-110.
Chiba, Kazuki et al., "$Na_xLi_{0.7-x}Ni_{1-y}Mn_yO_2$ as a new positive electrode material for lithiumion batteries," Journal of Power Sources, 311, 2016, pp. 103-110.
Cho, Jaephil et al., "A Breakthrough in the Safety of Lithium Secondary Batteries by Coating the Cathode Material with $AlPO_4$ Nanoparticles," Angew. Chem. Int. Ed. 2003, 42, pp. 1618-1621.
Cho, Woosuk et al., "Improved electrochemical and thermal properties of nickel rich $LiNi_{0.6}Co_{0.2}Mn_{0.2}O_2$ cathode materials by $SiO_2$ coating," Journal of Power Sources, 282, 2015, 45-50.
Cho, Yonghyun et al., "A New Type of Protective Surface Layer for High-Capacity Ni-Based Cathode Materials: Nanoscaled Surface Pillaring Layer," Nano Lett., 2013, 13, pp. 1145-1152.
Cho, Yonghyun et al., *Supporting Information*"A New Type of Protective Surface Layer for High-Capacity Ni-Based Cathode Materials: Nanoscaled Surface Pillaring Layer," Nano Lett., 2013, 13, 16 pages.

(56) References Cited

OTHER PUBLICATIONS

Choi, J. et al., "Investigation of the Irreversible Capacity Loss in the Layered $LiNi_{1/3}Mn_{1/3}Co_{1/3}O_2$ Cathodes," Electrochemical and Solid-State Letters, 8 (8), 2005, pp. C102-C105.
Choi, S. et al., "Factors Influencing the Layered to Spinel-like Phase Transition in Layered Oxide Cathodes," Journal of the Electrochemical Society, 2002, 149 (9), pp. A1157-A1163.
Chung, Kyung Yoon et al., "Comparative studies between oxygen-deficient $LiMn_2O_4$ and Al-doped $LiMn_2O_4$," Journal of Power Sources, 146, 2005, pp. 226-231.
Clause, O. et al., "Preparation and Characterization of Nickel-Aluminum Mixed Oxides Obtained by Thermal Decomposition of Hydrotalcite-Type Precursors," Journal of Catalysis, 133, 1992, pp. 231-246.
Conry, Thomas E. et al., "Structural Underpinnings of the Enhanced Cycling Stability upon Al-Substitution in $LiNi_{0.45}Mn_{0.45}Co_{0.1-y}Al_yO_2$ Positive Electrode Materials for Li-ion Batteries," Chem. Mater. 2012, 24, pp. 3307-3317.
Delmas, C. et al. "Layered Li(Ni, M)$O_2$ Systems as the Cathode Material in Lithium-Ion Batteries," MRS Bulletin, Aug. 2002, pp. 608-612.
Deng, Haixia et al., "Nanostructured Lithium Nickel Manganese Oxides for Lithium-Ion Batteries," Journal of the Electrochemical Society, 157 (4), 2010, pp. A447-A452.
Deng, Z.Q. et al., "Influence of Cationic Substitutions on the Oxygen Loss and Reversible Capacity of Lithium-Rich Layered Oxide Cathodes," J. Phys. Chem. C, 2011, 115, pp. 7097-7103.
Doan, The Nam Long et al., "Recent developments in synthesis of $xLi_2MnO_3 \cdot (1-x)LiMO_2$ (M=Ni, Co, Mn) cathode powders for high-energy lithium rechargeable batteries," Frontiers in Energy Research, Energy Storage, Sep. 2014, vol. 2, Article 36, pp. 1.
Dou, Shumei, "Review and prospect of layered lithium nickel manganese oxide as cathode materials for Li-ion batteries," J Solid State Electrochem (2013) 17, pp. 911-926.
Dyatkin, B.L. et al., "The Acidic Properties of Fluorine-Containing Alcohols, Hydroxylamines and Oximes," Tetrahedron, 1965, vol. 21, pp. 2991-2995.
El Mofid, Wassima et al., "A high performance layered transition metal oxide cathode material obtained by simultaneous aluminum and iron cationic substitution," Journal of Power Sources, 268, 2014, pp. 414-422.
Eom, Junho et al., "Dependence of Electrochemical Behavior on Concentration and Annealing Temperature of $Li_xCoPO_4$ Phase-Grown $LiNi_{0.8}Co_{0.16}Al_{0.04}O_2$ Cathode Materials," Journal of the Electrochemical Society, 155 (3), 2008, pp. A228-A233.
Fu, Xian-Zhu et al., "Nickel oxyhydroxides with various oxidation states prepared by chemicaloxidation of spherical $\beta$-Ni(OH)$_2$," Solid State Ionics, 178, 2007, pp. 987-993.
Gallagher, Kevin G. et al., "Correlating hysteresis and voltage fade in lithium- and manganese-rich layered transition-metal oxide electrodes," Electrochemistry Communications, 33, 2013, pp. 96-98.
Glaeser, Hans H. et al., "The Kinetics of Ammonia Exchange between Nickel Ammine Complexes and Ammonia in Aqueous and Anhydrous Ammonia Solutions Measured by Nuclear Magnetic Resonance of Nitrogen-14." Inorganic Chemistry, vol. 4, No. 2, Feb. 1965, pp. 206-208.
Gopalakrishnan, J., "Chimie Douce Approaches to the Synthesis of Metastable Oxide Materials," Chemistry of Materials, vol. 7, No. 7, Jul. 1995, pp. 1265-1275.
Gummow, R J et al., "Lithium Extraction From Orthorhombic Lithium Manganese Oxide and the Phase Transformation to Spinel," Mat. Res. Bull., vol. 28, 1993, pp. 1249-1256.
Gummow, R.J. et al., "Improved capacity retention in rechargeable 4 V lithium/lithiummanganese oxide (spinel) cells," Solid State Ionics, 69,1994, pp. 59-67.
Gutierrez, A. et al., "Understanding the Effects of Cationic and Anionic Substitutions in Spinel Cathodes of Lithium-Ion Batteries," Journal of the Electrochemical Society, 160 (6), 2013, pp. A901-A905.

Han, Ah Reum et al., "Soft Chemical Dehydration Route to Carbon Coating of Metal Oxides: Its Application for Spinel Lithium Manganate," J. Phys. Chem. C, 2007, 111, pp. 11347-11352.
Hayashi, N. et al., "Cathode of $LiMg_yMn_{2-y}O_4$ and $LiMg_yMn_{2-y}O_{4-\sigma}$ Spinel Phases for Lithium Secondary Batteries," Journal of the Electrochemical Society, 146 (4), 1999, pp. 1351-1354.
Hong, Jihyun et al., "Critical Role of Oxygen Evolved from Layered Li-Excess Metal Oxides in Lithium Rechargeable Batteries," Chem. Mater. 2012, 24, pp. 2692-2697.
Hong, Jihyun et al., "Critical Role of Oxygen Evolved from Layered Li-excess Metal Oxides in Lithium Rechargeable Batteries," Chem. Mater., 2012, 24 (14), pp. 2692-2697.
Hou, Peiyu et al., "A high energy density Li-rich positive-electrode material with superior performances via a dual chelating agent co-precipitation route," J. Mater. Chem. A, 2015, 3, 9427-9431.
Hou, Peiyu et al., *Supporting Information* "A high energy density Li-rich positive-electrode material with superior performances via a dual chelating agent co-precipitation route," J. Mater. Chem. A, 2015, 3, 11 pages.
Hua, Chuanshan et al., "Study of full concentration-gradient $Li(Ni_{0.8}Co_{0.1}Mn_{0.1})O_2$ cathode material for lithium ion batteries," Journal of Alloys and Compounds, 614, 2014, pp. 264-270.
Hua, Weibo et al., "Na-doped Ni-rich $LiNi_{0.5}Co_{0.2}Mn_{0.3}O_2$ cathode material with both high rate capability and high tap density for lithium ion batteries," Dalton Trans., 2014, 43, pp. 14824-14832.
Hwang, Sooyeon et al., "Investigation of Changes in the Surface Structure of $Li_xNi_{0.8}Co_{0.15}Al_{0.05}O_2$ Cathode Materials Induced by the Initial Charge," Chem. Mater. 2014, 26, pp. 1084-1092.
Hwang, Sooyeon et al., "Using Real-Time Electron Microscopy to Explore the Effects of Transition-Metal Composition on the Local Thermal Stability in Charged $Li_xNi_yMn_zCo_{1-y-z}O_2$ Cathode Materials," Chem. Mater., 2015, 27 (11), pp. 3927-3935.
Hy Sunny et al., "Understanding the Role of Ni in Stabilizing the Lithium-Rich High-Capacity Cathode Material $Li[Ni_xLi_{(1-2x)/3}Mn_{(2-x)/3}]O_2$ ($0 \leq x \leq 0.5$)" Chem. Mater. 2014, 26, pp. 6919-6927.
Irving, H. et al., "The Stability of Transition-metal Complexes," Journal of the Chemical Society, Issue 0, 1953, pp. 3192-3210.
Jarvis, Karalee A. et al., "Atomic Structure of a Lithium-Rich Layered Oxide Material for Lithium-Ion Batteries: Evidence of a Solid Solution," Chem. Mater., 2011, 23 (16), pp. 3614-3621.
Johnson, C.S. et al. "Structural and electrochemical studies of a-manganese dioxide($\alpha$-MnO$_2$)" Journal of Power Sources 68 (1997) pp. 570-577.
Johnson, Christopher S. et al., "Structural Characterization of Layered $Li_xNi_{0.5}Mn_{0.5}O_2$ ($0 \leq x \leq 2$) Oxide Electrodes for Li Batteries," Chem. Mater. 2003, 15, pp. 2313-2322.
Johnson, Christopher S. et al., "Synthesis, Characterization and Electrochemistry of Lithium Battery Electrodes: $xLi_2MnO_3 \cdot (1-x)LiMn_{0.333}Ni_{0.333}Co_{0.333}O_2$ ($0 \leq x \leq 0.7$)," Chem. Mater. 2008, 20, pp. 6095-6106.
Johnson, Christopher S. et al., "The role of $Li_2MO_2$ structures (M=metal ion) in the electrochemistry of $(x)LiMn_{0.5}Ni_{0.5}O_2 \cdot (1-x)Li_2TiO_3$ electrodes for lithium-ion batteries," Electrochemistry Communications, 4, 2002, pp. 492-498.
Jouanneau, S. et al., "Preparation, Structure, and Thermal Stability of New $Ni_xCo_{1-2x}Mn_x(OH)_2$ ($0 \leq x \leq 1/2$) Phases," Chem. Mater., vol. 15, No. 2, 2003 pp. 495-499.
Ju, Jin-Wook et al., "Optimization of Layered Cathode Material with Full Concentration Gradient for Lithium-Ion Batteries," J. Phys. Chem. C, 2014, 118, pp. 175-182.
Kam, Kinson C. et al., "Aliovalent titanium substitution in layered mixed Li Ni—Mn—Co oxides for lithium battery applications," J. Mater. Chem., 2011, 21, pp. 9991-9993.
Kam, Kinson C. et al., "Electrochemical and Physical Properties of Ti-Substituted Layered Nickel Manganese Cobalt Oxide (NMC) Cathode Materials," Journal of the Electrochemical Society, 159 (8), 2012, pp. A1383-A1392.
Kang, Kisuk et al., "Electrodes with High Power and High Capacity for Rechargeable Lithium Batteries," Science, vol. 311, Feb. 17, 2006, pp. 977-980.
Kang, Kisuk et al., "Factors that affect Li mobility in layered lithium transition metal oxides," Physical Review B, 74, 2006, pp. 094105-1-094195-7.

(56) References Cited

OTHER PUBLICATIONS

Kang, S.-H. et al., "The Effects of Acid Treatment on the Electrochemical Properties of 0.5 $Li_2MnO_3 \cdot 0.5$ $LiNi_{0.44}Co_{0.25}Mn_{0.31}O_2$ Electrodes in Lithium Cells," Journal of the Electrochemical Society, 153 (6), 2006, pp. A1186-A1192.

Kang, Sun-Ho et al., "Effects of Li Content on Structure and Electrochemical Properties of $Li_{1+x}(Ni_{0.5}Mn_{0.5})_{1-x}O_2$ (0≤x≤0.15) Electrodes in Lithium Cells (1.0-4.8 V)," Journal of the Electrochemical Society, 154 (4), 2007, pp. A268-A274.

Kang, Sun-Ho et al., "Enhancing the rate capability of high capacity $xLi_2MnO_3 \cdot (1-x)LiMO_2$ (M=Mn, Ni, Co) electrodes by Li—Ni—$PO_4$ treatment," Electrochemistry Communications, 11, 2009, pp. 748-751.

Kang, Sun-Ho et al., "First-cycle irreversibility of layered Li—Ni—Co—Mn oxide cathode in Li-ion batteries," Electrochimica Acta, 54, 2008, pp. 684-689.

Kang, Sun-Ho et al., "Investigating the first-cycle irreversibility of lithium metal oxide cathodes for Li batteries," J Mater Sci (2008) 43, pp. 4701-4706.

Kim, Chunjoong et al., "Stabilization of Battery Electrode/Electrolyte Interfaces Employing Nanocrystals with Passivating Epitaxial Shells," Chem. Mater. 2015, 27, pp. 394-399.

Kim, Duho et al., "Design of Nickel-rich Layered Oxides Using d Electronic Donor for Redox Reactions," Chem. Mater. 2015, 27, pp. 6450-6456.

Kim, H.-J. et al., "Coprecipitation and Characterization of Nickel-Cobalt-Manganese Hydroxides Precursor for Battery Cathode Materials," Abstract #849, 224th ECS Meeting, 2013 The Electrochemical Society, 1 page.

Kim, Hyun-Soo et al., "Enhanced electrochemical properties of $LiNi_{1/3}Co_{1/3}Mn_{1/3}O_2$ cathode material by coating with $LiAlO_2$ nanoparticles," Journal of Power Sources, 161, 2006, pp. 623-627.

Kim, Jeom-Soo et al., "Electrochemical and Structural Properties of $xLi_2M'O_3 \cdot (1-x)LiMn_{0.5}Ni_{0.5}O_2$ Electrodes for Lithium Batteries (M'=Ti, Mn, Zr; 0≤x≤0.3)," Chem. Mater. 2004, 16, pp. 1996-2006.

Kim, Ji Woo et al., "Unexpected high power performance of atomic layer deposition coated $Li[Ni_{1/3}Mn_{1/3}Co_{1/3}]O_2$ cathodes," Journal of Power Sources, 254, 2014, pp. 190-197.

Kong, Fantai et al., "Multivalent Li-Site Doping of Mn Oxides for Li-Ion Batteries," J. Phys. Chem. C, 2015, 119, pp. 21904-21912.

Kosova, N.V. et al., "Mixed layered Ni—Mn—Co hydroxides: Crystal structure, electronic state of ions, and thermal decomposition," Journal of Power Sources 174, 2007, pp. 735-740.

Kosova, N.V. et al., "Optimization of $Ni^{2+}/Ni^{3+}$ ratio in layered $Li(Ni,Mn,Co)O_2$ cathodes for better electrochemistry," Journal of Power Sources, 174, 2007, pp. 965-969.

Kovanda, František et al., "Mixed oxides obtained from Co and Mn containing layered double hydroxides: Preparation, characterization, and catalytic properties," Journal of Solid State Chemistry, 179, 2006, pp. 812-823.

Kovanda, František et al., "Thermal behaviour of Ni—Mn layered double hydroxide and characterization of formed oxides," Solid State Sciences, 5, 2003, pp. 1019-1026.

Koyama, Yukinori et al., "Crystal and electronic structures of superstructural $Li_{1-x}[Co_{1/3}Ni_{1/3}Mn_{1/3}]O_2$ (0≤x≤1)," Journal of Power Sources 119-121, 2003, pp. 644-648.

Lee, D.-K. et al., "High capacity $Li[Li_{0.2}Ni_{0.2}Mn_{0.6}]O_2$ cathode materials via a carbonate co-precipitation method," Journal of Power Sources 162, 2006, pp. 1346-1350.

Lee Jyh-Tsung et al., "Low-temperature atomic layer deposited $Al_2O_3$ thin film on layer structure cathode for enhanced cycleability in lithium-ion batteries," Electrochimica Acta 55, 2010, pp. 4002-4006.

Lee, M.-H. et al., "Synthetic optimization of $Li(Ni_{1/3}Co_{1/3}Mn_{1/3})O_2$ via co-precipitation," Electrochimica Acta, 50, 2004, pp. 939-948.

Li, Jinfeng et al., "Improve First-Cycle Efficiency and Rate Performance of Layered-Layered $Li_{1.2}Mn_{0.6}Ni_{0.2}O_2$ Using Oxygen Stabilizing Dopant," ACS Appl. Mater. Interfaces, 2015, 7, pp. 16040-16045.

Li, Jing et al., "Synthesis and Characterization of the Lithium-Rich Core-Shell Cathodes with Low Irreversible Capacity and Mitigated Voltage Fade," Chem. Mater. 2015, 27, pp. 3366-3377.

Li, Y. et al., "Understanding Long-Term Cycling Performance of $Li_{1.2}Ni_{0.15}Mn_{0.55}Co_{0.1}O_2$-Graphite Lithium-Ion Cells," Journal of the Electrochemical Society, 160 (5), 2013, pp. A3006-A3019.

Li, Zheng et al., "Stability and Rate Capability of Al Substituted Lithium-Rich High-Manganese Content Oxide Materials for Li-Ion Batteries," Journal of the Electrochemical Society, 159 (2), 2012, pp. A116-A120.

Liang, Jianbo et al., "Topochemical Synthesis, Anion Exchange, and Exfoliation of Co—Ni Layered Double Hydroxides: A Route to Positively Charged Co—Ni Hydroxide Nanosheets with Tunable Composition," Chem. Mater. 2010, 22, pp. 371-378.

Liao, Jin-Yun et al., "Surface-modified concentration-gradient Ni-rich layered oxide cathodes for high-energy lithium-ion batteries," Journal of Power Sources, 282, 2015, 429-436.

Lim, Jae-Hwan et al., "Electrochemical characterization of $Li_2MnO_3$—$Li[Ni_{1/3}Co_{1/3}Mn_{1/3}]O_2$ $LiNiO_2$ cathode synthesized via co-precipitation for lithium secondary batteries," Journal of Power Sources, 189, 2009, pp. 571-575.

Lin, Feng et al., "Surface reconstruction and chemical evolution of stoichiometric layered cathode materials for lithium-ion batteries," Nature Communications, Mar. 27, 2014, pp. 1-9.

Liu et al., "Electrochemical performance of $LiFePO_4$ cathode material coated with $ZrO_2$ nanolayer," Electrochemistry Communications 10 (2008), pp. 165-169.

Liu, Hao-Han et al., "Structure Evolution and Electrochemical Performance of $Al_2O_3$-coated $LiNi_{0.4}Co_{0.2}Mn_{0.4}O_2$ During Charge-discharge Cycling," Chem. Res. Chinese Universities 2012, 28(4), pp. 686-690.

Liu, Jun et al. "Spherical nanoporous LiCoPO4/C composites as high performance cathode materials for rechargeable lithium-ion batteries," J. Mater. Chem., 2011, 21, pp. 9984-9987.

Liu, Jun et al., "Carbon-coated high capacity layered $Li[Li_{0.2}Mn_{0.54}Ni_{0.13}Co_{0.13}]O_2$ cathodes," Electrochemistry Communications 12 (2010), pp. 750-753.

Liu, Jun et al., "Conductive Surface Modification with Aluminum of High Capacity Layered $Li[Li_{0.2}Mn_{0.54}Ni_{0.13}Co_{0.13}]O_2$ Cathodes," J. Phys. Chem. C 2010, 114, pp. 9528-9533.

Liu, Jun et al., "Understanding the Improvement in the Electrochemical Properties of Surface Modified 5 V $LiMn_{1.42}Ni_{0.42}Co_{0.16}O_4$ Spinel Cathodes in Lithium-ion Cells," Chem. Mater. 2009, 21, pp. 1695-1707.

Liu, Lijun et al., "Electrochemical and In Situ Synchrotron XRD Studies on $Al_2O_3$-Coated $LiCoO_2$ Cathode Material,".

Liu, Shuang et al., "Long cycle life lithium ion battery with lithium nickel cobalt manganese oxide (NCM) cathode," Journal of Power Sources, 261, 2014, pp. 285-291.

Liu, Wen et al., "Nickel-Rich Layered Lithium Transitional-Metal Oxide for High-Energy Lithium-Ion Batteries," Angew. Chem. Int. Ed. 2015, 54, pp. 4440-4458.

Liu, Xizheng et al., "Study on the capacity fading of pristine and FePO4 coated LiNi1/3Co1/3Mn1/3O2 by Electrochemical and Magnetical techniques," Electrochimica Acta 148, 2014, pp. 26-32.

Liu, Yi et al., "$Li_3V_2(PO_4)_3$-coated $Li_{1.17}Ni_{0.2}Co_{0.05}Mn_{0.58}O_2$ as the cathode materialswith high rate capability for Lithium ion batteries," Electrochimica Acta 147, 2014, pp. 696-703.

Liu, Zhaoping et al., "Synthesis, Anion Exchange, and Delamination of Co—Al Layered Double Hydroxide: Assembly of the Exfoliated Nanosheet/Polyanion Composite Films and Magneto-Optical Studies," J. Am. Chem. Soc., 2006, 128, pp. 4872-4880.

Luo, Wenbin et al., "Can Zr be Substituted for Co in $Co_{1-z}Zr_z(OH)_2$ and $LiCo_{1-z}Zr_zO_2$?," Journal of the Electrochemical Society, 158, (2), 2011, pp. A110-A114.

Luo, Wenbin et al., "Preparation of $Co_{1-z}Al_z(OH)_2(NO_3)_z$ Layered Double Hydroxides and $Li(Co_{1-z}Al_z)O_2$," Chem. Mater. 2009, 21, pp. 56-62.

Luo, Wenbin et al., "Synthesis, Characterization, and Thermal Stability of $LiNi_{1/3}Mn_{1/3}Co_{1/3}$—$zMgzO_2$, $LiNi_{1/3}zMn_{1/3}Co_{1/3}MgzO_2$, and $LiNi_{1/3}Mn_{1/3}$—$zCo_{1/3}MgzO_2$, " Chem. Mater., 2010, 22, pp. 1164-1172.

(56) References Cited

OTHER PUBLICATIONS

Luo, Wenbin et al., "The Impact of Zr Substitution on the Structure, Electrochemical Performance and Thermal Stability of Li[Ni$_{1/3}$Mn$_{1/3-z}$Co$_{1/3}$Zr$_z$]O$_2$," Journal of the Electrochemical Society, 158 (4), 2011, pp. A428-A433.
Ma, Jin et al., "A highly homogeneous nanocoating strategy for Li-rich Mn-based layered oxides based on chemical conversion," Journal of Power Sources, 277, 2015, pp. 393-402.
Ma, Miaomiao et al., "Structural and electrochemical behavior of LiMn$_{0.4}$Ni$_{0.4}$Co$_{0.2}$O$_2$," Journal of Power Sources, 165, 2007, pp. 517-534.
Makimura, Yoshinari et al., "Lithium insertion material of LiNi$_{1/2}$Mn$_{1/2}$O$_2$ for advanced lithium-ion batteries," Journal of Power Sources, 119-121, 2003, pp. 156-160.
Manthiram, Arumugam, "Materials Challenges and Opportunities of Lithium Ion Batteries," J. Phys. Chem. Lett., 2011, 2, pp. 176-184.
Markus, Isaac M. et al., "Computational and Experimental Investigation of Ti Substitution in Li$_1$(Ni$_x$Mn$_x$Co$_{1-2x-y}$Ti$_y$)O$_2$ for Lithium Ion Batteries," J. Phys. Chem. Lett. 2014, 5, pp. 3649-3655.
McCalla, E. et al., "Formation of Layered-Layered Composites in the Li—Co—Mn Oxide Pseudoternary System during Slow Cooling," Chem. Mater. 2013, 25, pp. 912-918.
McCalla, E. et al., "How Phase Transformations during Cooling Affect Li—Mn—Ni—O Positive Electrodes in Lithium Ion Batteries,"Journal of the Electrochemical Society, 160 (8), 2013, pp. A1134-A1138.
McCalla, E. et al., "Lithium loss mechanisms during synthesis of layered LixNi2—xO2 for lithium ion batteries," Solid State Ionics 219, 2012, pp. 11-19.
McCalla, E. et al., "Structural Study of the Li—Mn—Ni Oxide Pseudoternary System of Interest for Positive Electrodes of Li-Ion Batteries," Chem. Mater., 2013, 25, pp. 989-999.
McCalla, E. et al., "The Role of Metal Site Vacancies in Promoting Li—Mn—Ni—O Layered Solid Solutions," Chem. Mater., 2013, 25, pp. 2716-2721.
McCalla, E. et al., "The spinel and cubic rocksalt solid-solutions in the Li—Mn—Ni oxide pseudo-ternary system," Solid State Ionics, 242, 2013, pp. 1-9.
Meng, Ying S. et al., "Combining Ab Initio Computation with Experiments for Designing New Electrode Materials for Advanced Lithium Batteries: LiNi$_{1/3}$Fe$_{1/6}$Co$_{1/6}$Mn$_{1/3}$O$_2$," Journal of the Electrochemical Society, 151 (8), 2004, pp. A1134-A1140.
Mohanty, Debasish et al., "Structural transformation of a lithium-rich Li1.2Co0.1Mn0.55Ni0.15O2 cathode during high voltage cycling resolved by in situ X-ray diffraction," Journal of Power Sources, 229, 2013, pp. 239-248.
Mueller-Neuhaus, J.R. et al., "Understanding Irreversible Capacity in Li$_x$Ni$_{1-y}$Fe$_y$O$_2$ Cathode Materials," Journal of the Electrochemical Society, 147 (10), 2000, pp. 3598-3605.
Mulder, Grietus et al., "Comparison of commercial battery cells in relation to material properties," Electrochimica Acta, 87, 2013, pp. 473-488.
Myung, Seung-Taek et al., "Progress in High-Capacity Core-Shell Cathode Materials for Rechargeable Lithium Batteries," J. Phys. Chem. Lett., 5, 2014, pp. 671-679.
Nagash, A.R. et al., "Effect of oxygen non-stoichiometry on the electrochemical performance of lithium manganese oxide spinels," Journal of Power Sources, 102, 2001, pp. 68-73.
Noh, Hyung-Joo et al., "Cathode Material with Nanorod Structure—An Application for Advanced High-Energy and Safe Lithium Batteries," Chem. Mater., 2013, 25, pp. 2109-2115.
Noh, Hyung-Joo et al., "Comparison of the structural and electrochemical properties of layered Li[Ni$_x$Co$_y$Mn$_z$]O$_2$ (x=1/3, 0.5, 0.6, 0.7, 0.8 and 0.85) cathode material for lithium-ion batteries," Journal of Power Sources, 233, 2013, 121-130.
Noh, Hyung-Joo et al., "Formation of a Continuous Solid-Solution Particle and its Application to Rechargeable Lithium Batteries," Adv. Funct. Mater., 2013, 23, pp. 1028-1036.
Oh, Pilgun et al., "Superior Long-Term Energy Retention and Volumetric Energy Density for Li-Rich Cathode Materials," Nano Lett., 2014, 14, pp. 5965-5972.
Oh, Pilgun et al., *Supporting Information* "Superior Long-Term Energy Retention and Volumetric Energy Density for Li-Rich Cathode Materials," Nano Lett. 2014, 14, 12 pages.
Ohzuku, Tsutomo et al., "Electrochemistry and Structural Chemistry of LiNiO$_2$ (R$\bar{3}$m) for 4 Volt Secondary Lithium Cells," J. Electrochem. Soc. 140(7), 1993, pp. 1862-1870.
Ohzuku, Tsutomo et al., "High-capacity lithium insertion materials of lithium nickel manganese oxides for advanced lithium-ion batteries: toward rechargeable capacity more than 300 mA h g$^{-1}$" J. Mater. Chem., 2011, 21, pp. 10179-101888.
Ohzuku, Tsutomu et al., "Synthesis and Characterization of Li[Ni$_{1/2}$Mn$_{3/2}$]O$_4$ by Two-Step Solid State Reaction," Journal of the Ceramic Society of Japan, 110 [5], 2002, pp. 501-505.
Oishi, Masatsugu et al., "Direct observation of reversible charge compensation by oxygen ion in Li-rich manganese layered oxide positive electrode material, Li$_{1.18}$Ni$_{0.15}$Co$_{0.19}$Mn$_{0.50}$O$_2$," Journal of Power Sources, 276, 2015, pp. 89-94.
Oka Y. et al., "High-Temperature Cycling Performance of LiNi$_{1/3}$Co$_{1/3}$Mn$_{1/3}$O$_2$ Cathode with DLC Protective Film," Journal of the Electrochemical Society, 162 (2), 2015, pp. A3032-A3037.
Okada, Shigeto et al., "Fluoride Phosphate Li2COPO4F as a High Voltage Cathode in Li-ion Batteries," Journal of Power Sources, 146, 2005, pp. 565-569.
Okamoto, Kaoru et al., "X-Ray Absorption Fine Structure Study on Layered LiMO$_2$ (M=Ni, Mn, Co) Cathode Materials," Journal of the Electrochemical Society, 153 (6), 2006, pp. A1120-A1127.
Paik, Younkee et al., "Lithium and Deuterium NMR Studies of Acid-Leached Layered Lithium Manganese Oxides," Chem. Mater., 2002, 14, pp. 5109-5115.
Palacin, M.R. et al., "Electrochemical and structural study of the 3.3 V reduction step in defective Li$_x$Mn$_2$O$_4$ and Li$_x$Mn$_2$O$_{(4-y)}$F$_y$ compounds," Journal of Power Sources 81-82, 1999, pp. 627-631.
Palacin, M.R. et al., "On the role of defects in decreasing the extra 3.3/3.95 and 4.5 V redox steps in Li—Mn—O spinels," Journal of Power Sources, 97-98, 2001, pp. 398-401.
Pan, Cheng-chi et al., "Recent development of LiNi$_x$Co$_y$Mn$_z$O$_2$: Impact of micro/nano structures for imparting improvements in lithium batteries," Trans. Nonferrous Met. Soc. China, 23, 2013, pp. 108-119.
Park, B.-C., et al., "Improvement of structural and electrochemical properties of AlF3-coated Li[Ni$_{1/3}$Co$_{1/3}$Mn$_{1/3}$]O$_2$ cathode materials on high voltage region," Journal of Power Sources, 178, 2008, pp. 826-831.
Park, Joong Sun et al., "Amorphous Metal Fluoride Passivation Coatings Prepared by Atomic Layer Deposition on LiCoO2 for Li-Ion Batteries," Chem. Mater. 2015, 27, pp. 1917-1920.
Park, S.-H. et al., "Lithium—manganese—nickel-oxide electrodes with integrated layered—spinel structures for lithium batteries," Electrochemistry Communications, 9, 2007, pp. 262-268.
Paulsen, J. M. et al., "Layered Li—Mn-Oxide with the O2 Structure: A Cathode Material for Li-Ion Cells Which Does Not Convert to Spinel,"Journal of the Electrochemical Society, 146 (10), 1991, pp. 3560-3565.
Pouillerie, C. et al., "The Li$_x$Ni$_{1-y}$Mg$_y$O$_2$ (y=0.05, 0.10) system: structural modifications observed upon cycling," Solid State Ionics, 132, 2000, pp. 15-29.
Prasad, R. et al., "Dopant-induced stabilization of rhombohedral LiMnO$_2$ against Jahn-Teller distortion," Physical Review B 71, 2005, 134111-1-134111-11.
Rashid, Muhammad et al., "Effect of Relaxation Periods over Cycling Performance of a Li-Ion Battery," Journal of the Electrochemical Society, 162 (2), 2015, pp. A3145-A3153.
Riley, Leah A., "Electrochemical effects of ALD surface modification on combustion synthesized LiNi$_{1/3}$Mn$_{1/3}$Co$_{1/3}$O$_2$ as a layered-cathode material," Journal of Power Sourcesm, 196, 2011, pp. 3317-3324.
Robert, Rosa et al., "Enhancement of the high potential specific charge in layered electrode materials for lithium-ion batteries," J. Mater. Chem. A, 2014, 2, pp. 8589-8598.

(56) References Cited

OTHER PUBLICATIONS

Rowe, Aaron W. et al., "Positive Electrode Materials in the Li—Mn—Ni—O System Exhibiting Anomalous Capacity Growth during Extended Cycling," Journal of the Electrochemical Society, 161 (3), 2014, pp. A308-A317.

Saavedra-Arias, Jose J. et al., "Synthesis and electrochemical properties of Li(Ni$_{0.8}$Co$_{0.1}$Mn$_{0.1}$)O$_2$ cathode material: Ex situ structural analysis by Raman scattering and X-ray diffraction at various stages of charge—discharge process," Journal of Power Sources, 183, 2008, pp. 761-765.

Sekizawa, Oki et al., "Crystal and electronic structure change determined by various method for delithiation process of Li$_x$(Ni,Mn)O$_2$-based cathode material," Journal of Power Sources, 196, 2011, pp. 6651-6656.

Shunmugasundaram, Ramesh et al., "High Capacity Li-Rich Positive Electrode Materials with Reduced First-Cycle Irreversible Capacity Loss," Chem. Mater. 2015, 27, pp. 757-767.

Son, In Hyuk et al., "Self-Terminated Artificial SEI Layer for Nickel-Rich Layered Cathode Material via Mixed Gas Chemical Vapor Deposition," Chem. Mater. 2015, 27, pp. 7370-7379.

Song, Jie et al., "Role of Oxygen Vacancies on the Performance of Li[Ni$_{0.5-x}$Mn$_{1.5+x}$]O4 (x=0, 0.05, and 0.08) Spinel Cathodes for Lithium-Ion Batteries," Chem. Mater., 2012, 24 (15), pp. 3101-3109.

Sun, Yang-Kook et al., "High-energy cathode material for long-life and safe lithium batteries," Nature Materials, vol. 8, Apr. 2009, pp. 320-324.

Sun, Yang-Kook et al., "Nanostructured high-energy cathode materials for advanced lithium batteries," Nature Materials, vol. 11, 2012, pp. 942-947.

Sun, Yang-Kook et al., "Synthesis and Characterization of Li[(Ni$_{0.8}$Co$_{0.1}$Mn$_{0.1}$)$_{0.8}$(Ni$_{0.5}$Mn$_{0.5}$)$_{0.2}$]O$_2$ with the Microscale Core-Shell Structure as the Positive Electrode Material for Lithium Batteries," J. Am. Chem. Soc., 2005, 127, pp. 13411-13418.

Sun, Yang-Kook et al., "The Role of AlF$_3$ Coatings in Improving Electrochemical Cycling of Li-Enriched Nickel-Manganese Oxide Electrodes for Li-Ion Batteries," Adv. Mater. 2012, 24, pp. 1192-1196.

Sun, Yang-Kook, "Concentration-Gradient Materials," Energy Storage & Conversion Material Laboratory, Hanyang University, (03-05-30), 14 pages.

Tan, ShuangYuan et al., "Highly enhanced low temperature discharge capacity of LiNi$_{1/3}$Co$_{1/3}$Mn$_{1/3}$O$_2$ with lithium boron oxide glass modification," Journal of Power Sources, 277, 2015, pp. 139-146.

Tarascon, J.M. et al., "Synthesis Conditions and Oxygen Stoichiometry Effects on Li Insertion into the Spinel LiMn$_2$O$_4$," J. Electrochem. Soc., vol. 141, No. 6, Jun. 1994, pp. 1421-1431.

Tarascon, J.M. et al., "The Spinel Phase of LiMn$_2$O$_4$ as a Cathode in Secondary Lithium Cells," J. Electrochem. Soc., vol. 138, No. 10, Oct. 1991, pp. 2859-2864.

Thackeray, M. M. et al., "Advances in manganese-oxide 'composite' electrodes for lithium-ion batteries," J. Mater. Chem., 2005, 15, pp. 2257-2267.

Thackeray, M. M. et al., "ZrO$_2$-and Li$_2$ZrO$_3$-stabilized spinel and layered electrodes for lithium batteries," Electrochemistry Communications, 5, 2003, pp. 752-758.

Thackeray, M. M., "Structural Considerations of Layered and Spinel Lithiated Oxides for Lithium Ion Batteries," J. Electrochem. Soc., vol. 142, No. 8, Aug. 1995, pp. 2558-2563.

Thackeray, M.M. et al., "Comments on the structural complexity of lithium-rich Li$_{1+x}$M$_{1-x}$O$_2$ electrodes (M=Mn, Ni, Co) for lithium batteries," Electrochemistry Communications 8 (2006), pp. 1531-1538.

Thackeray, Michael M. et al., "Li$_2$ MnO$_3$-stabilized LiMO$_2$ (M=Mn, Ni, Co) electrodes for lithium-ion batteries," J. Mater. Chem., 2007, 17, pp. 3112-3125.

Van Bommel, Andrew et al., "Analysis of the Growth Mechanism of Coprecipitated Spherical and Dense Nickel, Manganese, and Cobalt-Containing Hydroxides in the Presence of Aqueous Ammonia," Chem. Mater., 2009, 21, pp. 1500-1503.

Van Bommel, Andrew et al., "Synthesis of Spherical and Dense Particles of the Pure Hydroxide Phase Ni$_{1/3}$Mn$_{1/3}$Co$_{1/3}$(OH)$_2$," Journal of the Electrochemical Society, 156 (5), 2009, pp. A362-A365.

Van Der Ven, A., et al. "Lithium Diffusion in Layered Li$_x$CoO$_2$," Electrochemical and Solid-State Letters, 3 (7) (2000), pp. 301-304.

Wang, Dapeng et al., "Synthesis of high capacity cathodes for lithium-ion batteries by morphology-tailored hydroxide co-precipitation," Journal of Power Sources, 274, 2015, pp. 451-457.

Wang, Dapeng et al., "Synthesis of Lithium and Manganese-Rich Cathode Materials via an Oxalate Co-Precipitation Method," Journal of the Electrochemical Society, 160 (5), 2013, pp. A3108-A3112.

Wang, Q. Y. et al., "High capacity double-layer surface modified Li[Li$_{0.2}$Mn$_{0.54}$Ni$_{0.13}$Co$_{0.13}$]O$_2$ cathode with improved rate capability," J. Mater. Chem., 2009, 19, pp. 4965-4972.

Wang, Tao et al., "Synthesis optimization of Li$_{1+x}$[Mn$_{0.45}$Co$_{0.40}$Ni$_{0.15}$]O$_2$ with different spherical sizes via co-precipitation," Powder Technology, 187, 2008, pp. 124-129.

Wei, Yi et al., "Kinetics Tuning of Li-ion Diffusion in Layered Li(Ni$_x$Mn$_y$Co$_z$)O$_2$," J. Am. Chem. Soc., 2015, 137, pp. 8364-8367.

Wei, Yi et al., Supporting Information "Kinetics Tuning of Li-ion Diffusion in Layered Li(Ni$_x$Mn$_y$Co$_z$)O$_2$," J. Am. Chem. Soc., 2015, 137, pp. 8364-8367.

Wilcox, James D. et al., "The Impact of Aluminum and Iron Substitution on the Structure and Electrochemistry of Li(Ni$_{0.4}$Co$_{0.2-y}$M$_y$Mn$_{0.4}$)O$_2$ Materials," Journal of the Electrochemical Society, 156 (12) 2009, pp. A1011-A1018.

Wilcox, James et al., "Structure and Electrochemistry of LiNi$_{1/3}$Co$_{1/3-y}$M$_y$Mn$_{1/3}$O$_2$ (M=Ti, Al, Fe) Positive Electrode Materials," Journal of the Electrochemical Society, 156 (3), 2009, pp. A192-A198.

Wolf-Goodrich, Silas et al., "Tailoring the surface properties of LiNi$_{0.4}$Mn$_{0.4}$Co$_{0.2}$O$_2$ by titanium substitution for improved high voltage cycling performance," Phys.Chem.Chem.Phys., 2015, 17, pp. 21778-21781.

Woo, S.-W. et al., "Improvement of electrochemical and thermal properties of Li[Ni$_{0.8}$Co$_{0.1}$Mn$_{0.1}$]O$_2$ positive electrode materials by multiple metal (Al, Mg) substitution," Electrochimica Acta, 54, 2009, pp. 3851-3856.

Wu Feng et al., "Effect of Ni$^{2+}$ Content on Lithium/Nickel Disorder for Ni-Rich Cathode Materials," ACS Appl. Mater. Interfaces 2015, 7 pp. 7702-7708.

Wu Kuichen et al., "Effect of precursor and synthesis temperature on the structural and electrochemical properties of Li(Ni$_{0.5}$Co$_{0.2}$Mn$_{0.3}$)O$_2$," Electrochimica Acta, 75, 2012, pp. 393-398.

Wu, Xiaobiao et al., "Sol-gel Synthesis of Li2CoPO4F/C Nanocomposite as a High-Power Cathode Material for Lithium Ion Batteries," Journal of Power Sources, 220, 2012, pp. 122-129.

Wu, Y. et al., "Structural stability of chemically delithiated layered (1-z)Li[Li$_{1/3}$Mn$_{2/3}$]O$_{2-zLi[Mn0.5-y}$Ni$_{0.5-y}$Co$_{2y}$]O$_2$ solid solution cathodes," Journal of Power Sources, 183, 2008, pp. 749-754.

Xiang Xingde et al., "Understanding the Effect of Co$^{3+}$ Substitution on the Electrochemical Properties of Lithium-Rich Layered Oxide Cathodes for Lithium-Ion Batteries," J. Phys. Chem. C, 2014, 118, pp. 21826-21833.

Xiong, Xunhui et al., "A modified LiF coating process to enhance the electrochemical performance characteristics of LiNi$_{0.8}$Co$_{0.1}$Mn$_{0.1}$O$_2$ cathode materials," Materials Letters, 110, 2013, pp. 4-9.

Xu, Bo et al., "Identifying surface structural changes in layered Li-excess nickel manganese oxides in high voltage lithium ion batteries: A joint experimental and theoretical study," Energy Environ. Sci., May 3, 20133, 11 pages.

Yabuuchi, Naoaki et al., "Novel lithium insertion material of LiCo$_{1/3}$Ni$_{1/3}$Mn$_{1/3}$O$_2$ for advanced lithium-ion batteries," Journal of Power Sources 119-121, 2003, pp. 171-174.

(56) References Cited

OTHER PUBLICATIONS

Yabuuchi, Naoki et al., "High-capacity electrode materials for rechargeable lithium batteries: Li3NbO4-based system with cation-disordered rocksalt structure," PNAS, vol. 112, No. 25, Jun. 23, 2015, pp. 7650-7655.

Yan, Jianhua et al., "Recent progress in Li-rich layered oxides as cathode materials for Li-ion batteries," RSC Adv., 2014, 4, pp. 63268-63284.

Yan, Pengfei et al., "Atomic-Resolution Visualization of Distinctive Chemical Mixing Behavior of Ni, Co, and Mn with Li in Layered Lithium Transition-Metal Oxide Cathode Materials," Chem. Mater., 2015, 27 (15), pp. 5393-5401.

Yang, Feifei et al., "Nanoscale Morphological and Chemical Changes of High Voltage Lithium-Manganese Rich NMC Composite Cathodes with Cycling," Nano Lett., 2014, 14, pp. 4334-4341.

Yang, Xiao-Qing et al., "Crystal structure changes of $LiMn_{0.5}Ni_{0.5}O_2$ cathode materials during charge and discharge studied by synchrotron based in situ XRD," Electrochemistry Communications, 4, 2002, pp. 649-654.

Yang, Yuan et al., "A membrane-free lithium/polysulfide semi-liquid battery for large-scale energy storage," Energy Environ. Sci., 2013, 6, pp. 1552-1558.

Yano, Akira et al., "Surface Structure and High-Voltage Charge/Discharge Characteristics of Al-Oxide Coated $LiNi_{1/3}Co_{1/3}Mn_{1/3}O_2$ Cathodes," Journal of the Electrochemical Society, 162 (2), 2015, pp. A3137-A3144.

Ye Delai et al., "Ni-induced stepwise capacity increase in Ni-less Li-rich cathode materials for high performance lithium ion batteries," Nano Research, 8(3), Feb. 2014, pp. 808-820.

Yin, S.-C. et al., "X-ray/Neutron Diffraction and Electrochemical Studies of Lithium De/Re-Intercalation in $Li_{1-x}Co_{1/3}Ni_{1/3}Mn_{1/3}O_2$ (x=0>1)," Chem. Mater. 2006, 18, pp. 1901-1910.

Yoon, Sung-Jun et al., "Improved Performances of $Li[Ni_{0.65}Co_{0.8}Mn_{0.27}]O_2$ Cathode Material with Full Concentration Gradient for Li-Ion Batteries," Journal of the Electrochemical Society, 162 (2), 2015, pp. A3059-A3063.

Yoon, Won-Sub et al. "Investigation of the Charge Compensation Mechanism on the Electrochemically Li-Ion Deintercalated $Li_{1-x}Co_{1/3}Ni_{1/3}Mn_{1/3}O_2$ Electrode System by Combination of Soft and Hard X-ray Absorption Spectroscopy," J. Am. Chem. Soc., 2005, 127, pp. 17479-17487.

Yoon, Won-Sub et al., "Electronic structural changes of the electrochemically Li-ion deintercalated $LiNi_{0.8}Co_{0.15}Al_{0.05}O_2$ cathode material investigated by X-ray absorption spectroscopy," Journal of Power Sources, 174, 2007, pp. 1015-1020.

Yoon, Won-Sub et al., "In Situ X-ray Absorption Spectroscopic Study on LiNi0.5Mn0.5O2 Cathode Material during Electrochemical Cycling," Chem. Mater. 2003, 15, pp. 3161-3169.

Yoon, Won-Sub et al., "Investigation of the Local Structure of the $LiNi_{0.5}Mn_{0.5}O_2$ Cathode Material during Electrochemical Cycling by X-Ray Absorption and NMR Spectroscopy," Electrochemical and Solid-State Letters, 5 (11), 2002, pp. A263-A266.

Yoon, Won-Sub et al., "Li MAS NMR and in situ X-ray studies of lithium nickel manganese oxides," Journal of Power Sources 119-121, 2003, pp. 649-653.

Yue, Peng et al., "A low temperature fluorine substitution on the electrochemical performance of layered $LiNi_{0.8}Co_{0.1}Mn_{0.1}O_{2-z}F_z$ cathode materials," Electrochimica Acta, 92, 2013, pp. 1-8.

Yue, Peng et al., "Effect of fluorine on the electrochemical performance of spherical $LiNi_{0.8}Co_{0.1}Mn_{0.1}O_2$ cathode materials via a low temperature method," Powder Technology, 237, 2013 pp. 623-626.

Yue Yang et al., "Growth mechanisms for spherical mixed hydroxide agglomerates prepared by co-precipitation method: A case of $Ni_{1/3}Co_{1/3}Mn_{1/3}(OH)_2$," Journal of Alloys and Compounds, 619, 2015, pp. 846-853.

Zhang, H.Z. et al., "Surface nitridation of Li-rich layered $Li(Li_{0.17}Ni_{0.25}Mn_{0.58})O_2$ oxide as cathode material for lithium-ion battery," J. Mater. Chem., 2012, 22, pp. 13104-13109.

Zhang, Shengmao et al., "Self-Assembled Hollow Spheres of β-Ni(OH)$_2$ and Their Derived Nanomaterials," Chem. Mater., 2009, 21, pp. 871-883.

Zhao Yujuan et al., "Enhanced Electrochemical Performance of Li†Li0.2Ni0.2Mn0.6‡O2 Modified by Manganese Oxide Coating for Lithium-Ion Batteries," Electrochemical and Solid-State Letters, 14 (1), 2011, pp. A1-A5.

Zhou, Fu et al., "Advantages of Simultaneous Substitution of Co in $Li[Ni_{1/3}Mn_{1/3}Co_{1/3}]O_2$ by Ni and Al," Electrochemical and Solid-State Letters, 12 (4), 2009, pp. A81-A83.

Zhou, Fu et al., "Coprecipitation Synthesis of $Ni_xMn_{1-x}(OH)_2$ Mixed Hydroxides," Chem. Mater., vol. 22, No. 3, 2010, pp. 1015-1021.

Zhou, Fu et al., "Solid-State Synthesis as a Method for the Substitution of Al for Co in $LiNi_{1/3}Mn_{1/3}Co_{(1/3-z)}Al_zO_2$," Journal of the Electrochemical Society, 156 (10), 2009, pp. A796-A801.

Zhou, Fu et al., "The effect of Al substitution on the reactivity of delithiated $LiNi_{1/3}Mn_{1/3}Co_{(1/3-z)}Al_zO_2$ with non-aqueous electrolyte," Electrochemistry Communications 10 (2008), pp. 1168-1171.

Zhu, Ye et al., "Positive Electrode Passivation by LiDFOB Electrolyte Additive in High-Capacity Lithium-Ion Cells," Journal of the Electrochemical Society, 159 (12), 2012, pp. A2109-A2117.

Levasseur et al., "Oxygen Vacancies and Intermediate Spin Trivalent Cobalt Ions in Lithium-Overstoichiometric $LiCoO_2$", Chemistry of Materials, Jan. 1, 2003, vol. 15, No. 1, pp. 348-354, XP055474666.

Ates, Mehmet Nurullah et al., "A Li-Rich Layered Cathode Material with Enhanced Structural Stability and Rate Capability for Li-on Batteries," Journal of the Electrochemical Society, 161 (3), 2014, pp. A355-A363.

Fu, Chaochao et al., "Nickel-Rich Layered Microspheres Cathodes: Lithium/Nickel Disordering and Electrochemical Performance," ACS Appl Mater Interfaces, Sep. 24, 2014, 6(18), 15822-15831.

International Search Report and Written Opinion dated Mar. 4, 2016 in PCT/US2015/067387, 19 pages.

Qian, Danna et al., "Uncovering the roles of oxygen vacancies cation migration in lithium excess layered oxides," Phys. Chem. Chem. Phys., 2014, 16, pp. 14665-14668.

Shen, Chong-Heng et al., "Facile Synthesis of the U-Rich Layered Oxide $Li_{1.23}Ni_{0.09}Co_{0.12}Mn_{0.56}O_2$ with Superior Lithium Storage Performance and New Insights into Structural Transformation of the Layered Oxide Material during Charge-Discharge Cycle: In Situ XRD Characterization," ACS Appl. Mater. Interfaces, 2014, 6 pp. 5516-5524.

Yu, Haijun et al., "Study of the lithium/nickel ions exchange in the layered $LiNi_{0.42}Mn_{0.42}Co_{0.16}O_2$ cathode material fo lithium ion batteries: experimental and first-principles calculations," Energy Environ. Sci., 2014, 11 pages.

* cited by examiner

LITHIUM RICH NICKEL MANGANESE COBALT OXIDE (LR-NMC)

This application claims priority to U.S. Provisional Patent Application No. 62/096,510, filed Dec. 23, 2014, entitled LITHIUM RICH NICKEL MANGANESE COBALT OXIDE (LR-NMC), the entire contents of which are herein incorporated by reference in its entirety for all purposes.

BACKGROUND OF THE INVENTION

Rechargeable (i.e., secondary) batteries that include positive electrode (i.e., cathode) active materials based on nickel (Ni), manganese (Mn), and cobalt (Co) oxides (herein "NMC"s) have yet to demonstrate energy densities equal to the theoretical energy densities calculated for these materials and the electrochemical cells in which these materials are used as the positive electrode active material. For example, a theoretical energy density of 1065 Wh/kg is predicted for certain known NMCs, but the best commercially available NMC has an energy density of only 702 Wh/kg. Much work is therefore still needed to increase the empirical energy density of NMCs, to match the NMC energy density to the calculated energy density for these materials, as well as to increase the power output of NMCs when used as positive electrode active materials in secondary batteries (e.g., Lithium rechargeable batteries).

Some researchers have manipulated the amounts of cobalt (Co), manganese (Mn), and nickel (Ni) in NMCs, and/or have doped NMCs with iron (Fe), aluminum (Al), magnesium (Mg), and nickel (Ni), in order to attempt to produce NMCs having improved energy densities, power capabilities, and safer positive electrode materials (See, e.g., U.S. Patent Application Publication No. 2014/0197357, to Ofer et al.; also U.S. Pat. No. 6,677,082, also 6,680,143; also U.S. Pat. No. 8,213,154, to Sullivan, et al.; also U.S. Pat. No. 7,381,496, to Onnerud, et al.; also Ates, et al., *Journal of the Electrochemical Society*, 161 (3) A355-A363 (2014); also W. El Mofid, et al.; *Journal of Power Sources*, 268 (2014) 414-422; also *Journal of the Electrochemical Society*, 147 (5) 1722-1729 (2000); also H.-B. Kim, et al. *Journal of Power Sources* 179 (2008) 347-350, J Electrochem Soc 147 (10) 3598-3605 (2000)). However, the materials set forth in these reports do not demonstrate the thermodynamically predicted energy densities for NMCs. Also, these reports show that if the amount of nickel is increased beyond a Ni:Mn:Co ratio of 5:3:2, the NMC material is not thought to be stable when electrochemically cycled. As more Ni is inserted in the crystalline lattice, the energy associated with evenly and uniformly distributing the transition metals within a given unit cell (e.g., wherein each metal has a nearest neighbor of another kind of metal) increases. After some initial electrochemical cycling, currently known NMC materials suffer from voltage fade as well as other detrimental effects. In some other reports, a discharge model suggests that when 66% ($Li_{1.08}$NMC or greater) of lithium enters the NMC, the capacity of the material decreases to 180 mAh/g. However, these same materials are expected to have a yet unrealized theoretical capacity of 272 mAh/g. As such, there is a need for new NMCs, including stable NMC which have high nickel content, as well as methods of making these NMCs.

The disclosure herein sets forth novel oxide materials, and also methods of making and using oxide materials which include nickel, manganese and cobalt, which overcome the aforementioned challenges and limitations as well as other challenges which are known in the relevant field to which the instant disclosure pertains.

BRIEF SUMMARY OF THE INVENTION

The disclosure herein provides novel NMC chemical compositions, novel layered-layered polycrystalline NCM materials, novel NMC crystal structures, and novel methods of making and using these materials. The disclosure herein provides novel NMCs which demonstrate some of the highest energy densities, fastest power capabilities, and, or, longest cycle lifetimes, ever observed for rechargeable lithium battery positive electrode active materials. In some examples, the disclosure herein provides NMC having higher relative amounts of Li than known NMCs. In some examples, the disclosure herein provides NMC having higher relative amounts of Ni than known NMCs. In some examples, the disclosure herein provides NMC having higher relative amounts of Ni and Li than known NMCs.

While some researchers have manipulated the amounts of cobalt (Co), manganese (Mn), and nickel (Ni) in NMCs, the particular amounts of Co, Ni, and Mn, set forth herein, were not known to be particularly well suited for the types of positive electrode active materials described herein (e.g., the layered-layered oxides, polycrystalline inter-grown oxides, or doped NMCs). Co is thought to be less catalytically active than Ni and, as such, previous works suggests that increasing the Co amount while decreasing the Ni amount in a NMC material should reduce side reactions, such as those reactions between the active material and a liquid electrolyte. However, the materials set forth herein which have increased Ni amounts with correspondingly decreased Co amounts are actually more stable than other NMCs that have higher Co amounts and lower Ni amounts. Additionally, the NMCs described herein demonstrate higher energy densities than previous work suggested was possible or practical for NMCs in electrochemical cells. In some examples, the lithium-rich NMCs (herein "LR-NMC") set forth herein have unexpectedly long cycle lifetimes. In some examples, the LR-NMCs set forth herein have unexpectedly high energy densities, particularly at rapid discharge rates.

In one embodiment, set forth herein is a positive electrode active material, characterized by the following formula: $Li_{1+x}Ni_yMn_wCo_zO_{2+(x/2)}$, wherein $0 \leq x \leq 0.25$, $0.5 \leq y \leq 0.8$, $0.1 \leq w \leq 0.6$, $0.1 \leq z \leq 0.45$, and $y+w+z=1$. In these materials, lithium is present in the NMC oxide in excess of the normal stoichiometric Li amount (e.g., equal moles lithium to the moles of transition metals), this excess amount being characterized by the subscript, x. For this reason, the materials herein are referred to as lithium-rich nickel manganese cobalt oxides, or LR-NMCs. When x is >0, the molar amount of lithium is greater than the molar amount of the sum of the transition metals since $y+w+z=1$. Without being bound to a particular theory, the "x" amount of lithium may occupy transition metal sites within 2d lamellar oxide layers (i.e., within oxide sheets). The majority of the lithium in the LR-NMC may occupy interstitial sites between the lamellar oxide layers (e.g., between oxide sheets in the discharged state of the battery). In some examples, y=w and Co is a minor component of the transition metals present. When x is 0.25, lithium is present in both crystalline lattice positions normally occupied by Ni, Mn, or Co and lithium is also present in interstitial sites.

In a second embodiment, set forth herein is a positive electrode active material, characterized by the following formula: $Li_{1+x}Ni_yMn_wCo_zO_e$, wherein $0 \leq x \leq 0.25$, $0.5 \leq y \leq 0.8$, $0.1 \leq w \leq 0.6$, $0.1 \leq z \leq 0.45$, $y+w+z=1$, and e is selected so that the LR-NMC-material is charge neutral. In some examples, "e" represents the amount of negatively charged oxygen required to charge balance the positively charged lithium, nickel, manganese, and cobalt in the NMC.

In a third embodiment, set forth herein is a positive electrode including a material characterized by the following formula: $Li_{1+x}Ni_yMn_zCo_zO_{2+(x/2)}$, wherein $0 \leq x \leq 0.25$, $0.5 \leq y \leq 0.8$, $0.1 \leq z \leq 0.25$. In some of these examples, $y+2z=1$.

In a fourth embodiment, set forth herein is a positive electrode including any lithium rich nickel manganese cobalt oxide set forth herein. In some of these embodiments, the positive electrode includes a solid-state catholyte in the positive electrode.

In a fifth embodiment, set forth herein is an electrochemical device including a positive electrode which includes a nickel manganese cobalt oxide or a lithium rich nickel manganese cobalt oxide set forth herein.

In a sixth embodiment, set forth herein is a method of making a lithium rich nickel manganese cobalt oxide (LR-NMC), including (1) providing a mixture of a nickel ion precursor, a manganese ion precursor, and a cobalt ion precursor at a specified ratio; (2) optionally warming the mixture between 30 and 100° C.; (3) adjusting the pH of the mixture to about 10 or 11; (4) optionally stirring the mixture; (5) precipitating a nickel manganese cobalt hydroxide or layered double hydroxide; (6) annealing the hydroxide in the presence of a lithium-containing salt, and thereby making a LR-NMC. In some examples, the hydroxide is a layered hydroxide. In some examples, the hydroxide is a layered double hydroxide. Once annealed with a lithium-containing salt, some lithium resides in between the layers of a layered-layered oxide and "x" amount of lithium resides at transition metal crystal lattice positions. The lithium is stabilized by a negatively charged framework which results as the material dehydrates. In some examples, the dehydration is a result of the loss of dangling hydroxide groups during the annealing process. When these dangling hydroxide groups are lost, some $Ni^{2+}$ in the NMC oxidizes to $Ni^{3+}$. In some examples when the material is further lithiated (i.e., lithium is added to the material) some of this additional lithium forms a lithium oxide (e.g., $Li_2O$) in the NMC. As lithium inserts into $LiNi_yMn_wCo_zO$, to form $Li_{1+x}Ni_yMn_wCo_zO_e$, or a lithium-rich NMC, the crystalline unit cell volume tends to decrease which results in certain beneficial electrochemical properties, such as, but not limited to, improved electronic conductivity, lower voltage fade during use, and lower tendencies for low voltage phases (e.g., spinel phases, or Mn-including spinels) to precipitate.

In a seventh embodiment, set forth herein is a lithium-rich nickel, manganese, cobalt oxide which is characterized by an expanded unit cell comprising twenty (20) transition metal atoms. In some examples, the unit cell includes 14 Ni atoms, 3 Mn atoms, and 3 Co atoms

BRIEF DESCRIPTION OF THE DRAWINGS

In FIG. 5, the top plot is cycle 1, the next plot below cycle 1 is cycle 10, the next plot below cycle 10 is cycle 20, the next plot below cycle 20 is cycle 30, the next plot below cycle 30 is cycle 40, the next plot below cycle 40 is cycle 50. As used in FIG. 5, "dQ/dV" refers to differential capacity vs. differential voltage.

FIG. 25 shows the compositional profiles along the scanning direction shown in (a); and, in section (c), the nickel relative concentration as a function of distance from the particle surface.

FIG. 26 shows the compositional profiles along the scanning direction shown in (a); and, in section (c), the nickel relative concentration as a function of distance from the particle surface.

DETAILED DESCRIPTION OF THE INVENTION

Figure 1:
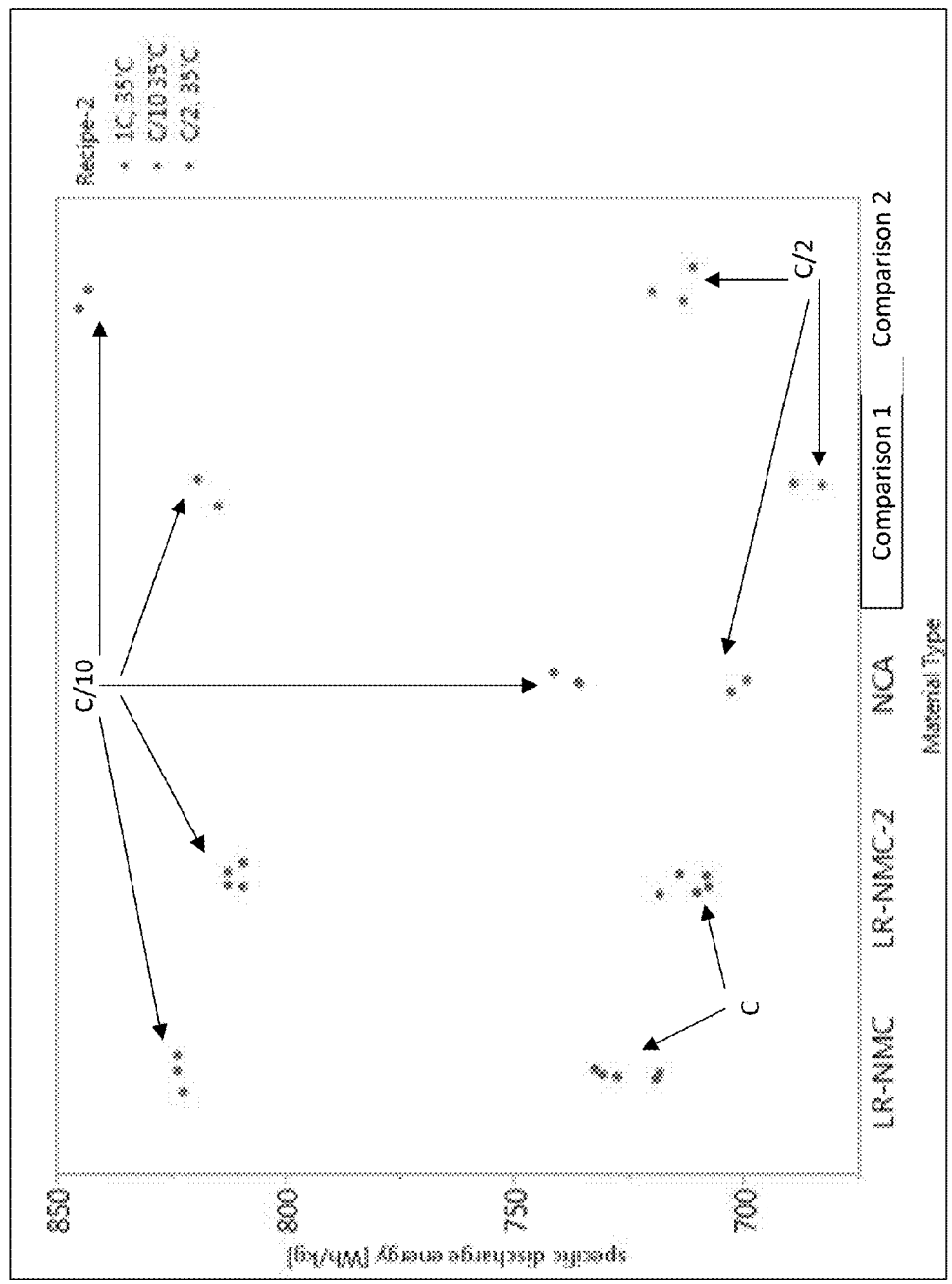
FIG. 1 shows a comparison plot of Specific Discharge Energy (Wh/kg) for different discharge rates (1 C, C/2, and C/10) for LR-NMC ($Li_{1+x}Ni_{0.5}Mn_{0.25}Co_{0.25}O_{2+(x/2)}$), LR-NMC-2=($Li_{1+x}Ni_{0.6}Mn_{0.2}Co_{0.2}O_{2+(x/2)}$), wherein $0<x\leq0.25$, NCA ($LiNi_{0.8}Co_{0.15}Al_{0.05}O_2$), Comparison 1 ($LiNi_{0.5}Mn_{0.3}Co_{0.2}O_2$), and Comparison 2 ($LiNi_{0.6}Mn_{0.2}Co_{0.2}O_2$).

The following description is presented to enable one of ordinary skill in the art to make and use the inventions set forth herein and to incorporate these inventions in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

The reader's attention is directed to all papers and documents which are filed concurrently with this specification and which are open to public inspection with this specification, and the contents of all such papers and documents are incorporated herein by reference. Unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

I. DEFINITIONS

As used herein, "positive electrode active material," "active electrode material," or "active material," refers to a material that is suitable for use in a lithium rechargeable battery cell and that is responsible for delivering or receiving lithium ions during the charging and discharging cycles, respectively, of the battery cell. The active material may undergo a chemical reaction during the charging and discharging cycles. The same battery cell may include a positive active material and a negative active material. For examples, an active positive material may include a metal oxide where the metal is in a high valence state when the battery cell is in the charged state. During the discharge cycle of the battery cell the valence of the metal is reduced by a flow of electrons through an outside circuit, and the cathode active material readily accepts lithium ions to maintain a neutral net charge. In some examples, the active material is an oxide comprising lithium, nickel, cobalt, and manganese. In some of these examples, an active material that includes a lithium, nickel, cobalt, and manganese oxide may convert between different states of lithiation (i.e., amount of lithium in the material) during the charging and discharging of the battery cell.

As used herein, the phrase "positive electrode" refers to the electrode in a secondary battery towards which positive ions, e.g., Li+, conduct, flow or move during discharge of the battery. As used herein, the phrase "negative electrode" refers to the electrode in a secondary battery from where positive ions, e.g., Li+, conduct, flow or move during discharge of the battery. In a battery comprised of a Li-metal electrode and a metal oxide electrode (i.e., active material; e.g., LR-NMC), the electrode having the metal oxide active material is referred to as the positive electrode. In some common usages, cathode is used in place of positive electrode, and anode is used in place of negative electrode. When a Li-secondary battery is charged, Li ions move from the positive electrode (e.g., LR-NMC) towards the negative electrode (e.g., Li-metal). When a Li-secondary battery is discharged, Li ions move towards the positive electrode (e.g., LR-NMC; i.e., cathode) and from the negative electrode (e.g., Li-metal; i.e., anode).

As used herein, the term "lithium rich" refers to a material (e.g., $Li_{1+x}Ni_yMn_zCo_oO_{2+(x/2)}$, wherein x>0) in which the amount of Li present in the material exceeds the minimal amount of Li required for the material to be charge neutral and, or, chemically stable. In one example, a lithium rich NMC includes a layered NMC metal oxide that includes a lamellar structure comprised of stacks of two dimensional sheets with a reduced chemical structure of $MO_2$, where M=Mn, Co, Ni, Fe, V, or other suitable metals. The sheets can include metals in several coordination geometries, including tetrahedral, octahedral square pyramidal, or the like where oxygen is commonly a bridging ligand. In certain examples, in a discharged active material, the interstitial spaces between the two dimensional sheets can be intercalated by lithium (or other metal cations) in order to maintain charge neutrality in the material. In some examples, the transition metals will be positioned within the two dimensional lamellar layer, and the lithium cations will be positioned in the interstitial space between the lamellar sheets. In certain oxide active materials, the amount of lithium that can be reversibly inserted and deinserted into the metal oxide structure is less than or equal to the total number of transition metal ions, i.e., Li/M≤1. For examples, the amount of lithium that can be reversibly inserted and deinserted in $LiCoO_2$, $LiMn_2O_4$, and $Li(Ni_{0.8}Co_{0.15}Al_{0.05})O_2$ is less than or equal to one. The LR-NMC class of materials described herein are distinguished from other NMCs in that the lithium content exceeds the sum of the transitional metals (on a molar ratio basis) in its fully discharged state and also includes a significant amount of lithium in the charged state. In this class of materials, and without being bound to a particular theory, at least some of the transition metal sites in the two dimensional lamellar sheets (described above) may become substituted by lithium atoms when the lithium to metal molar ratio is greater than one. When Li substitutes into an NMC crystal, for example at a transition metal cite, the positively charged Li is typically less positively charged than the transition metal for which it substitutes. As a result, and in order to maintain charge neutrality, the NMC oxidizes some of the remaining transition metals (e.g., $Ni^{2+}$ to $Ni^{3+}$) or creates oxygen deficiencies. In some examples, as Lithium substitutes into an NMC, the material becomes oxygen deficient.

As used herein, the term "primarily nanocrystalline" refers to a material that includes nanodimensioned crystalline domains as the majority phase or majority component, which contributes to the crystalline character of the material.

As used herein, "nearest neighbors," refers to the closest crystalline lattice position in a crystalline lattice for a similar charged atom (either similarly positively charged, or similarly negatively charged) with respect to the atom characterized as having a nearest neighbor. For example, in crystalline $NiO_2$, all of the positively charged ions are Ni atoms. In this example, Ni only has Ni nearest neighbors. In $LiNiMnCoO_2$, all of the positively charged ions are Ni, Mn, and Co atoms. Depending on how these atoms are arranged, Ni may be surrounded by other Ni atoms, or other Mn atoms, or other Co atoms, or a combination thereof. If the closest positively charged atoms to a given Ni atom are all Mn atoms, then the Ni is characterized as having all Mn nearest neighbors. In some materials herein, when the Ni, Mn, and Co atoms are evenly distributed, each has a nearest neighbor that is a positively charged atom of a type other than the atom characterized as having a nearest neighbor. For example, in some material herein, Ni only has Mn and Co nearest neighbors. For example, in some material herein, Mn only has Ni and Co nearest neighbors. For example, in some material herein, Co only has Mn and Ni nearest neighbors. In some examples herein, the NMC includes Ni, Mn, and Co wherein each metal has a nearest neighbor of another type of metal.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein, "characterized by," refers to a distinguishing property of the material qualified by this phrase. For example, the phrase "characteristic length" and "characteristic particle size dimension" refers to the physical distance for a given particle at the maximum separation of the boundaries of said particle. For example, the characteristic length of a sphere is the diameter of the sphere. As used herein, the characteristic particle size includes the largest physical dimension of a particle or the diameter for a spherically shaped particle.

As used herein, "an amount of the Li occupies Ni, Mn, or Co crystal lattice positions," refers to a material in which lithium atoms are bonded, or localized, at crystal lattice positions that would otherwise by occupied by Ni, Mn, or Co, in the absence of the localized lithium. A crystal lattice site does not include an interstitial position within a crystalline lattice.

As used herein, "polycrystalline," refers to a material which includes a collection, or combination, or crystallites. As opposed to a material that is a single crystal, a polycrystalline material is made up of a multitude (e.g., at least one or more) crystals. As used herein, the crystals in the multitude can be of the same size or of different sizes.

As used herein, "C-rate" is defined with respect to the amount of charge capacity of a given material with respect to the rate at which that charge is discharged from the material. For example, a C-rate of C/1 is defined as a constant current cycle where the nameplate capacity is discharged in one hour. A C-rate of C/X is defined in reference to that rate, where the charge and discharge current is 1/X of that at C/1, approximately corresponding to a full discharge at constant current in X hours.

As used herein, "layered-layered oxide," refers to class of active materials for battery storage that are comprised of two distinct chemical compositions and/or two distinct crystallographic phases, as identified by powder X-ray diffraction or electron diffraction methods. Both chemical phases are distinct in formulation and exhibit different crystallographic structures (by diffraction analysis) but each can be described as a layered oxide (as defined above) and is a lamellar structure of two-dimensional transitional metal oxide sheets having interstitial space that may be intercalated by lithium ions.

As used herein, "inter-grown phases" refers to at least two phases of materials in which the bonding arrangement, or crystal structure, of one phase overlaps or penetrates into the second phase. Inter-grown phases, in some examples, include at least two polycrystalline layered oxide phases that have overlapping or interpenetrating crystal structures.

As used herein, "interpenetrating" refers to a collection of at least two or more crystalline materials in which one crystal's lattice, or a portion of said lattice, overlaps, intersects, or is contained within a second crystal's lattice. Interpenetrating also includes polycrystalline inter-growth, in which a collection of crystals have overlapping or intersecting crystalline lattices.

As used herein "SSA" refers to specific surface area. In some examples, the LR-NMCs herein have, but are not necessarily limited to, a SSA of 1-2 and a tap density greater than 2.

As used herein, "specific capacity" refers to the Coulometric capacity (i.e., the total Amp-hours available when the battery is discharged at a certain discharge current, specified at a C-rate) from 100 percent state-of-charge to the cut-off voltage. Capacity is calculated by multiplying the discharge current (in Amps) by the discharge time (in hours) and decreases, generally, with increasing C-rate.

As used herein, "about" when qualifying a number or range of numbers, e.g., about 50 nm to about 500 nm, refers to the number or range of numbers qualified, and optionally the numbers included in the range, and a range ±10% of the qualified number or range of numbers. For example, about 50 nm includes 45 nm and also 55 nm. For example, about 50 nm to about 500 nm includes 45 nm to 550 nm.

As used herein, "grain size is determined by a FWHM analysis" refers to the grain size calculated based on the full-width at half maximum for an x-ray diffraction (XRD) peak.

In some examples, the determination is calculated using the Scherrer equation or another method known in the art as suitable for calculating grain sizes from XRD patterns.

As used herein, "grain size is determined by analysis of a scanning electron microscopy image" refers to the analytical method of visually determining a grain size using a microscopy image. Transmission electron microscopy can also be used to determine grain sizes.

As used herein, "dominant crystal phase" refers to the crystalline material in a mixture of crystalline materials that is the majority crystal phase.

As used herein, a "dopant" refers to an impurity, or an added element, ion, chemical, or material, which is present in amounts less than the amount of the substance into which the dopant is added in order to alter the properties of the substance. In some embodiments, the LR-NMC can be doped with a dopant including, but not limited to, oxygen, carbon, a metal selected from the group consisting of Li, Mg, Al, Si, Ca, Ti, V, Cr, Mn, Fe, Co, Ni, Cu, Zn, Y, Zr, Nb, Ba, or Hf, a metal oxide of said metal, a cation of said metal, a metal fluoride of said metal, or combinations thereof. In some embodiments, the dopant can include $Li_2O$, Cu, $CuF_2$, $NiF_2$, $ZrF_4$, $CaF_2$, or $AlF_3$.

As used herein, "surface coating" refers to a layer or series of layers that bonds to the periphery or another material. In some instances, the LR-NMCs set forth herein have a coating or outside layer that includes another material (e.g., lithium aluminum phosphate, aluminum fluoride, or cobalt oxide) which increase, for example, the chemical compatibility of the LR-NMC with other materials or chemicals (e.g., catholytes) which may be proximate to the LR-NMC. In some examples, the surface coating also improves the conductivity of the LR-NMC (e.g., a coating of a mixed electron ion conductor).

As used herein, "a tap density" refers to the bulk density of solid material after the material is tapped, vibrated, or disturbed such that material is allowed to settle or reach a minimum energy compacted state. In some examples, a powder is added to a graduated cylinder and then the graduated cylinder is tapped, vibrated, or disturbed so that the powder settles in the graduate cylinder. By measuring the mass of powder in the graduated cylinder, and by recording the volume occupied by the powder, after it settles, in the graduate cylinder, the tap density is determined by dividing the measured mass by the recorded volume.

As used herein, a "catholyte" refers to an ion conductor that is intimately mixed with, or that surrounds, or that contacts the active material (e.g., LR-NMC). Catholytes suitable with the embodiments described herein include, but are not limited to, LSS, LTS, LXPS, LXPSO, where X is Si, Ge, Sn, As, Al, LATS, also Li-stuffed garnets, or combinations thereof, and the like. Catholytes may also be liquid, gel, semi-liquid, semi-solid, polymer, and/or solid polymer ion conductors known in the art. Catholytes include those catholytes set forth in International PCT Patent Application No. PCT/US14/38283, entitled SOLID STATE CATHOLYTE OR ELECTROLYTE FOR BATTERY USING $Li_4MP_BS_C$ (M=Si, Ge, AND/OR Sn), filed May 15, 2014, as well as in U.S. patent application Ser. No. 14/618,979, filed Feb. 10, 2015, now U.S. Pat. No. 9,172,114, which issued Oct. 27, 2015, the contents of both of which are incorporated by reference in their entirety. Catholytes include those catholytes set forth in International PCT Patent Application No. PCT/US2014/059575, entitled GARNET MATERIALS FOR LI SECONDARY BATTERIES AND METHODS OF MAKING AND USING GARNET MATERIALS, filed Oct. 7, 2014, the contents of which are incorporated by reference in their entirety.

As used herein, "LSS" refers to lithium silicon sulfide which can be described as $Li_2S$—$SiS_2$, Li—S—Si, and/or a catholyte consisting essentially of Li, S, and Si. LSS refers to an electrolyte material characterized by the formula $Li_xSi_yS_z$ where $0.33 \le x \le 0.5$, $0.1 \le y \le 0.2$, $0.4 \le z \le 0.55$, and it may include up to 10 atomic % oxygen. LSS also refers to an electrolyte material comprising Li, Si, and S. In some examples, LSS is a mixture of $Li_2S$ and $SiS_2$. In some examples, the ratio of $Li_2S:SiS_2$ is 90:10, 85:15, 80:20, 75:25, 70:30, 2:1, 65:35, 60:40, 55:45, or 50:50 molar ratio. LSS may be doped with compounds such as $Li_xPO_y$, $Li_xBO_y$, $Li_4SiO_4$, $Li_3MO_4$, $Li_3MO_3$, $PS_x$, and/or lithium halides such as, but not limited to, LiI, LiCl, LiF, or LiBr, wherein $0 < x \le 5$ and $0 < y \le 5$.

As used herein, "LPSI" refers to a lithium, phosphorus, sulfur, and iodine compound which can be described by $Li_xP_yS_zI_t$, wherein $5 \le x \le 12$; $1 \le y \le 3$; $5 \le z \le 9$, and $0.1 \le t \le 2$. LPSI also refers to any mixture of $Li_2S:P_2S_5:LiI$, pre or post annealing and any annealing products thereof. Examples of LPSI are found in U.S. Provisional Patent Application No. 62/263,409, filed Dec. 4, 2015, entitled LITHIUM, PHOSPHORUS, SULFUR, AND IODINE CONTAINING ELECTROLYTE AND CATHOLYTE COMPOSITIONS, ELECTROLYTE MEMBRANES FOR ELECTROCHEMICAL DEVICES, AND ANNEALING METHODS OF MAKING THESE ELECTROLYTES AND CATHOLYTES.

As used herein, "LTS" refers to a lithium tin sulfide compound which can be described as $Li_2S$—$SnS_2$, $Li_2S$—SnS, Li—S—Sn, and/or a catholyte consisting essentially of Li, S, and Sn. The composition may be $Li_xSn_yS_z$ where $0.25 \le x \le 0.65$, $0.05 \le y \le 0.2$, and $0.25 \le z \le 0.65$. In some examples, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In. As used herein, "LATS" refers to LTS, as used above, and further comprising Arsenic (As).

As used herein, "LXPS" refers to a catholyte material characterized by the formula $Li_aMP_bS_c$, where M is Si, Ge, Sn, and/or Al, and where $2 \le a \le 8$, $0.5 \le b \le 2.5$, $4 \le c \le 12$. "LSPS" refers to an electrolyte material characterized by the formula $L_aSiP_bS_c$, where $2 \le a \le 8$, $0.5 \le b \le 2.5$, $4 \le c \le 12$. Exemplary LXPS materials are found, for example, in International Patent Application No. PCT/US2014/038283, filed May 16, 2014, and entitled SOLID STATE CATHOLYTE OR ELECTROLYTE FOR BATTERY USING $LI_4MP_BS_C$ (M=Si, Ge, AND/OR Sn), as well as in U.S. patent application Ser. No. 14/618,979, filed Feb. 10, 2015, now U.S. Pat. No. 9,172,114, which issued Oct. 27, 2015, which is incorporated by reference herein in its entirety. When M is Sn and Si—both are present—the LXPS material is referred to as LSTPS. As used herein, "LSTPSO," refers to LSTPS that is doped with, or has, O present. In some examples, "LSTPSO," is a LSTPS material with an oxygen content between 0.01 and 10 atomic %. "LSPS," refers to an electrolyte material having Li, Si, P, and S chemical constituents. As used herein "LSTPS," refers to an electrolyte material having Li, Si, P, Sn, and S chemical constituents. As used herein, "LSPSO," refers to LSPS that is doped with, or has, O present. In some examples, "LSPSO," is a LSPS material with an oxygen content between 0.01 and 10 atomic %. As used herein, "LATP," refers to an electrolyte material having Li, As, Sn, and P chemical constituents. As used herein "LAGP," refers to an electrolyte material having Li, As, Ge, and P chemical constituents. As used herein, "LXPSO" refers to a catholyte material characterized by the formula $Li_aMP_bS_cO_d$, where M is Si, Ge, Sn, and/or Al, and where $2 \leq a \leq 8$, $0.5 \leq b \leq 2.5$, $4 \leq c \leq 12$, $d<3$. LXPSO refers to LXPS, as defined above, and having oxygen doping at from 0.1 to about 10 atomic %. LPSO refers to LPS, as defined above, and having oxygen doping at from 0.1 to about 10 atomic %.

As used herein, "LPS," refers to an electrolyte having Li, P, and S chemical constituents. As used herein, "LPSO," refers to LPS that is doped with or has O present. In some examples, "LPSO," is a LPS material with an oxygen content between 0.01 and 10 atomic %. LPS refers to an electrolyte material that can be characterized by the formula $Li_xP_yS_z$ where $0.1 \leq x \leq 0.8$, $0.07 \leq y \leq 0.5$ and $0.4 \leq z \leq 1.2$. LPS also refers to an electrolyte characterized by a product formed from a mixture of $Li_2S:P_2S_5$ wherein the molar ratio is 10:1, 9:1, 8:1, 7:1, 6:1 5:1, 4:1, 3:1, 7:3, 2:1, or 1:1. LPS also refers to an electrolyte characterized by a product formed from a mixture of $Li_2S:P_2S_5$ wherein the reactant or precursor amount of $Li_2S$ is 95 atomic % and $P_2S_5$ is 5 atomic %. LPS also refers to an electrolyte characterized by a product formed from a mixture of $Li_2S:P_2S_5$ wherein the reactant or precursor amount of $Li_2S$ is 90 atomic % and $P_2S_5$ is 10 atomic %. LPS also refers to an electrolyte characterized by a product formed from a mixture of $Li_2S:P_2S_5$ wherein the reactant or precursor amount of $Li_2S$ is 85 atomic % and $P_2S_5$ is 15 atomic %. LPS also refers to an electrolyte characterized by a product formed from a mixture of $Li_2S:P_2S_5$ wherein the reactant or precursor amount of $Li_2S$ is 80 atomic % and $P_2S_5$ is 20 atomic %. LPS also refers to an electrolyte characterized by a product formed from a mixture of $Li_2S:P_2S_5$ wherein the reactant or precursor amount of $Li_2S$ is 75 atomic % and $P_2S_5$ is 25 atomic %. LPS also refers to an electrolyte characterized by a product formed from a mixture of $Li_2S:P_2S_5$ wherein the reactant or precursor amount of $Li_2S$ is 70 atomic % and $P_2S_5$ is 30 atomic %. LPS also refers to an electrolyte characterized by a product formed from a mixture of $Li_2S:P_2S_5$ wherein the reactant or precursor amount of $Li_2S$ is 65 atomic % and $P_2S_5$ is 35 atomic %. LPS also refers to an electrolyte characterized by a product formed from a mixture of $Li_2S:P_2S_5$ wherein the reactant or precursor amount of $Li_2S$ is 60 atomic % and $P_2S_5$ is 40 atomic %.

As used herein, LPSO refers to an electrolyte material characterized by the formula $Li_xP_yS_zO_w$, where $0.33 \leq x \leq 0.67$, $0.07 \leq y \leq 0.4$, $0.4 \leq z \leq 1.2$, $0 \leq w \leq 0.15$. Also, LPSO refers to LPS, as defined above, that includes an oxygen content of from 0.01 to 10 atomic %. In some examples, the oxygen content is 1 atomic %. In other examples, the oxygen content is 2 atomic %. In some other examples, the oxygen content is 3 atomic %. In some examples, the oxygen content is 4 atomic %. In other examples, the oxygen content is 5 atomic %. In some other examples, the oxygen content is 6 atomic %. In some examples, the oxygen content is 7 atomic %. In other examples, the oxygen content is 8 atomic %. In some other examples, the oxygen content is 9 atomic %. In some examples, the oxygen content is 10 atomic %.

As used herein, "Li-stuffed garnet" refers to oxides that are characterized by a crystal structure related to a garnet crystal structure. Li-stuffed garnets include compounds having the formula $Li_aLa_bM'_cM''_dZr_eO_f$, $Li_aLa_bM'_cM''_dTa_eO_f$, or $Li_aLa_bM'_cM''_dNb_eO_f$, where $4<a<8.5$, $1.5<b<4$, $0 \leq c \leq 2$, $0 \leq d \leq 2$; $0 \leq e < 2$, $10<f<13$, and M' and M" are, independently in each instance, selected from Al, Mo, W, Nb, Sb, Ca, Ba, Sr, Ce, Hf, Rb, or Ta, or $Li_aLa_bZr_cAl_dMe''_eO_f$, where $5<a<7.7$, $2<b<4$, $0<c \leq 2.5$, $0 \leq d \leq 2$, $0 \leq e<2$, $10<f<13$ and Me" is a metal selected from Nb, Ta, V, W, Mo, or Sb and as described herein. "Garnets," as used herein, also include those garnets described above that are doped with $Al_2O_3$. Garnets, as used herein, also include those garnets described above that are doped so that $Al^{3+}$ substitutes for $Li^+$. As used herein, Li-stuffed garnets, and garnets, generally, include, but are not limited to, $Li_{7.0}La_3(Zr_{t1}+Nb_{t2}+Ta_{t3})O_{12}$+$0.35Al_2O_3$, wherein (t1+t2+t3=subscript 2) so that the La:(Zr/Nb/Ta) ratio is 3:2. Also, garnet and lithium-stuffed garnets as used herein can include $Li_xLa_3Zr_2O_{12}+yAl_2O_3$, where x ranges from 5.5 to 9 and y ranges from 0 to 1. In some embodiments, x is 7 and y is 1.0. In some embodiments, x is 7 and y is 0.35. In some embodiments, x is 7 and y is 0.7. In some embodiments x is 7 and y is 0.4. Also, garnets as used herein can include $Li_xLa_3Zr_2O_{12}+yAl_2O_3$. Exemplary lithium-stuffed garnets are found in the compositions set forth in International Patent Application Nos. PCT/US2014/059575 and PCT/US2014/059578, filed Oct. 7, 2014, entitled GARNET MATERIALS FOR LI SECONDARY BATTERIES AND METHODS OF MAKING AND USING GARNET MATERIALS.

As used herein "median diameter $(d_{50})$" refers to the median size, in a distribution of sizes, measured by microscopy techniques or other particle size analysis techniques, including, but not limited to, scanning electron microscopy or dynamic light scattering. $D_{50}$ includes the characteristic dimension at which 50% of the particles are smaller than the recited size.

As used herein "diameter $(d_{90})$" refers to the size, in a distribution of sizes, measured by microscopy techniques or other particle size analysis techniques, including, but not limited to, scanning electron microscopy or dynamic light scattering. $D_{90}$ includes the characteristic dimension at which 90% of the particles are smaller than the recited size.

As used herein "diameter $(d_{10})$" refers to the size, in a distribution of sizes, measured by microscopy techniques or other particle size analysis techniques, including, but not limited to, scanning electron microscopy or dynamic light scattering. $D_{10}$ includes the characteristic dimension at which 10% of the particles are smaller than the recited size.

As used herein, the term "electrolyte," refers to a material that allows ions, e.g., $Li^+$, to migrate therethrough but which does not allow electrons to conduct therethrough. Electrolytes are useful for electrically isolating the cathode and anodes of a secondary battery while allowing ions, e.g., $Li^+$, to transmit through the electrolyte.

As used herein, the phrase "energy storage electrode," refers to, for example, an electrode that is suitable for use in an energy storage device, e.g., a lithium rechargeable battery cell. Such an electrode is operable to conduct electrons and deliver or receive lithium ions during the charging and discharging of a rechargeable battery cell.

As used herein, a "mixed electronic ionic conductor" (MEIC) refers to a material that conducts both ions (e.g., $Li^+$ions) and electrons. MEICs useful in the examples set forth herein include, but are not limited to, carbon (C), MoS wherein $0<x \leq 3$, $MoS_2$, MoS, $LiV_3O_8$, $LiV_3O_6$, MoOF, $MoO_3$, wherein $0 \leq x \leq 1$, $Li_xVO_y$ wherein $0 \leq x<2y$ and $1 \leq y \leq 2.5$, $V_2O_5$, $Mn_aO_b$ where $1 \leq a \leq 2$ and $1 \leq b \leq 7$, MnO, $Mn_3O_4$, $Mn_2O_3$, $MnO_2$, $LiAlCl_4$, LISICON, NASICON, $Na_{1+x}Zr_2Si_xP_{3-x}O_{12}$ wherein x in each instance is $0 < x < 3$ and optionally wherein Na, Zr and/or Si are replaced by isovalent elements, NASICON-structured phosphates, $Li_cNa_cV_2(PO_4)_3$ wherein c in each instance is independently $0 \ll c < 1$, $Li_dNa_eM_eM'_f(PO_4)_3$ wherein d in each instance is independently $0 \leq d \leq 2$, and $0 \leq e \leq 2$, $0 \leq f \leq 2$, and M and M' are metals selected from the group consisting of V, Nb, Ta, Cr, Fe, Al, Co, Ni, and Cu, $Li_gMM'(SO_4)_3$ where M and M' are transition metals and g is selected so that the compound is charge neutral, and $LiMXO_4$ where X is Ge, Si, Sb, As, or P, $Li_hNaV_2(PO_4)_3$, $Li_hNa_2FeV(PO_4)_3$, $Li_hFeTi(PO_4)_3$, $Li_hTiNb(PO_4)_3$, $Li_hFeNb(PO_4)_3$, wherein $0 \leq h \leq 1$, and antiperovskite.

As used herein, the phrase "particle size" refers to the smallest individual, free or loose particle that can be poured or can be suspended in a fluid. In some examples, particle size is measured by laser diffraction or dynamic light scattering.

II. MATERIALS

In some examples, sets forth herein is a positive electrode active material, characterized by the formula: $Li_{1+x}Ni_yMn_wCo_zO_{2+(x/2)}$, wherein: $0 \leq x \leq 0.25$; $0.5 \leq y \leq 0.8$; $0.1 \leq w \leq 0.6$; $0.05 \leq z \leq 0.45$; and $y+w+z=1$. In some of these examples, $w=z$. In other examples, $y>w+z$. In still other examples, $y>w$. In other examples, $y>z$. In certain examples, an amount of the Li occupies Ni, Mn, or Co crystal lattice positions. In some of these examples, an amount of the Li occupies Ni crystal lattice positions. In some of these examples, this amount of the Li ranges from 0.1 to 15 mol %. In some of the above examples, $x>0$. In some of the examples herein, the LR-NMC material is a layered-layered oxide. In certain examples, the material includes at least two polycrystalline layered oxide phases. In certain examples, at least two polycrystalline layered oxide phases are inter-grown phases. In some examples, the material also includes a third polycrystalline inter-growth layered oxide. In yet other of these examples, one of the at least two crystalline layered oxide phases is $Li_2M^1O_3$ where $M^1$ is selected from Ni, Mn, or Co. In some examples, one of the $Li_2M^1O_3$ is isostructural to $Na_2MnO_3$ and has C2/m symmetry. In some examples, one of the at least two crystalline layered oxide phases is $Li_{1+x}M^2O_2$ where $M^2$ is selected from Ni, Mn, or Co. In some of these examples, the $Li_{1+x}M^2O_2$ is isostructural to $NaFeO_2$ and has R3m symmetry. In other examples, the third polycrystalline inter-growth layered oxide is selected from a low voltage stability phase. In certain examples, this low voltage stability phase is a spinel phase, such as a manganese oxide spinel. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some of the above examples, sets forth herein is a positive electrode active material, characterized by the formula: $Li_{1+x}Ni_yMn_wCo_zO_{2+(x/2)}$ in which $y=w$. In other examples, $w=z$. In still other examples, $y>w$. In yet other examples, y is more than twice w or more than twice z.

In some examples, sets forth herein is a positive electrode active material, characterized by the following formula: $Li_{1+x}Ni_yMn_zCo_zO_{2+(x/2)}$, wherein $0 \leq x \leq 0.25$, $0.5 \leq y \leq 0.8$, $0.1 \leq z \leq 0.25$, and $x+y+2z=0.8$. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In certain examples, the LR-NMC set forth herein is characterized by $Li_{1+x}Ni_{0.5}Mn_{0.25}Co_{0.25}O_2$; $Li_{1+x}Ni_{0.6}Mn_{0.20}Co_{0.20}O_2$; $Li_{1+x}Ni_{0.475}Mn_{0.475}Co_{0.05}O_2$; $Li_{1+x}Ni_{0.45}Mn_{0.45}Co_{0.1}O_2$; or $Li_{1+x}Ni_{0.55}Mn_{0.4}Co_{0.05}O_2$, wherein $0 \leq x \leq 0.25$.

In some examples, the LR-NMC set forth herein is characterized by $Li_{1+x}Ni_{0.5}Mn_{0.25}Co_{0.25}O_e$; $Li_{1+x}$ $Ni_{0.6}Mn_{0.20}Co_{0.20}O_e$; $Li_{1+x}Ni_{0.475}Mn_{0.475}Co_{0.05}O_e$; $Li_{1+x}Ni_{0.45}Mn_{0.45}Co_{0.1}O_e$; or $Li_{1+x}Ni_{0.55}Mn_{0.4}Co_{0.05}O_e$, $0 \leq x \leq 0.25$ and e is selected so that the LR-NMC-material is charge neutral. In these examples, $0 \leq x \leq 0.25$ and "e" represents the amount of negatively charged oxygen required to charge balance the positively charged lithium, nickel, manganese, and cobalt in the NMC.

In any of the above examples, a dopant may be added based on the dopants and amounts set forth below. Dopants can be added up to 10 mol %. Further doping can have detrimental effects such as diluting the energy density of the LR-NMC.

In some examples, sets forth herein is a positive electrode active material, characterized by the following formula: $Li_{1+x}Ni_yMn_zCo_zO_{2+(x/2)}$, wherein $0 \leq x \leq 0.25$, $0.5 \leq y \leq 0.8$, $0.1 \leq z \leq 0.25$, and $x+y+2z=0.9$. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some examples, sets forth herein is a positive electrode active material, characterized by the following formula: $Li_{1-x}Ni_yMn_zCo_zO_{2-(x/2)}$, wherein $0 \leq x \leq 0.25$, $0.5 \leq y \leq 0.8$, $0.1 \leq z \leq 0.25$, and $x+y+2z=0.9$. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some examples, sets forth herein is a positive electrode active material, characterized by the following formula: $Li_{1+x}Ni_yMn_zCo_zO_{2+(x/2)}$, wherein $0 \leq x \leq 0.25$, $0.5 \leq y \leq 0.8$, $0.1 \leq z \leq 0.25$, and $x+y+2z=1$. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some examples, sets forth herein is a positive electrode active material, characterized by the following formula: $Li_{1+x}Ni_yMn_zCo_zO_{2-(x/2)}$, wherein $0 \leq x \leq 0.25$, $0.5 \leq y \leq 0.8$, $0.1 \leq z \leq 0.25$, and $x+y+2z=1.1$. In some of these examples, the oxide is oxygen deficient. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some examples, sets forth herein is a positive electrode active material, characterized by the following formula: $Li_{1+x}Ni_yMn_zCo_zO_{2+(x/2)}$, wherein $0 \leq x \leq 0.25$, $0.5 \leq y \leq 0.8$, $0.1 \leq z \leq 0.25$, and $x+y+2z=1.1$. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some examples, sets forth herein is a positive electrode active material, characterized by the following formula: $Li_{1+x}Ni_yMn_zCo_zO_{2-(x/2)}$, wherein $0 \leq x \leq 0.25$, $0.5 \leq y \leq 0.8$, $0.1 \leq z \leq 0.25$, and $x+y+2z=1.1$. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some examples, sets forth herein is a positive electrode active material, characterized by the following formula: $Li_{1+x}Ni_yMn_zCo_zO_{2+(x/2)}$, wherein $0 \leq x \leq 0.25$, $0.5 \leq y \leq 0.8$, $0.1 \leq z \leq 0.25$, and $x+y+2z=1.2$. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some examples, sets forth herein is a positive electrode active material, characterized by the following formula:

$Li_{1+x}Ni_yMn_zCo_zO_{2+(x/2)}$, wherein $0 \leq x \leq 0.25$, $0.5 \leq y \leq 0.8$, $0.1 \leq z \leq 0.25$, and $x+y+2z=1.5$. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some examples, sets forth herein is a positive electrode active material, characterized by the following formula: $Li_{1+x}Ni_yMn_zCo_zO_{2-(x/2)}$, wherein $0 \leq x \leq 0.25$, $0.5 \leq y \leq 0.8$, $0.1 \leq z \leq 0.25$, and $x+y+2z=1.5$. In the aforementioned formula, x is, in some examples, selected from 0, 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, 0.2, 0.21, 0.22, 0.23, 0.24, or 0.25. In the aforementioned formula, y is, in some examples, selected from 0.5, 0.51, 0.52, 0.53, 0.54, 0.55, 0.56, 0.57, 0.58, 0.59, 0.6, 0.61, 0.62, 0.63, 0.64, 0.65, 0.66, 0.67, 0.68, 0.69, 0.7, 0.71, 0.72, 0.73, 0.74, 0.75, 0.76, 0.77, 0.78, 0.79, or 0.8. In the aforementioned formula, z is, in some examples, selected from 0, 0.1, 0.12, 0.13, 0.14, 0.15, 0.16, 0.17, 0.18, 0.19, 0.2, 0.21, 0.22, 0.23, 0.24, or 0.25. In some examples, y is 0.5 and z is 0.25. In some examples, y is 0.6 and z is 0.2. In some examples, y is 0.55 and z is 0.225. In some examples, y is 0.65 and z is 0.175.

In some of the examples, set forth herein is a positive electrode material wherein an amount of the Li occupies Ni, Mn, or Co crystal lattice positions. In some of these examples, 1 Li per $Ni_yMn_zCo_zO_{2+(x/2)}$ occupies a Ni, Mn, or Co crystal lattice position. In some of these examples, 0.1 Li per $Ni_yMn_zCo_zO_{2+(x/2)}$ occupies a Ni, Mn, or Co crystal lattice position. In some of these examples, 0.15 Li per $Ni_yMn_zCo_zO_{2+(x/2)}$ occupies a Ni, Mn, or Co crystal lattice position. In some of these examples, 0.2 Li per $Ni_yMn_zCo_zO_{2+(x/2)}$ occupies a Ni, Mn, or Co crystal lattice position. In some of these examples, 0.25 Li per $Ni_yMn_zCo_zO_{2+(x/2)}$ occupies a Ni, Mn, or Co crystal lattice position.

In some examples, sets forth herein is a positive electrode active material, characterized by the following formula: $Li_{1+x}Ni_yMn_zCo_zO_{2+(x/2)}$, wherein $0 \leq x \leq 0.25$, $0.5 \leq y \leq 0.8$, $0.1 \leq z \leq 0.25$. In some of these examples, $x+y+2z=1$.

In some examples, sets forth herein is a positive electrode active material, characterized by the following formula: $LiNi_yMn_zCo_zO_2$, wherein $0.5 \leq y \leq 0.8$, $0.1 \leq z \leq 0.25$. In some of these examples, $y+2z=0.8$. In other examples, $y+2z=0.9$. In some of these examples, $y+2z=1$. In other examples, $y+2z=1.1$. In some other examples, $y+2z=1.2$.

In some examples, sets forth herein is a positive electrode active material, characterized by the following formula: $Li_{1+x}Ni_yMn_zCo_zO_{2-(x/2)}$, wherein $0 \leq x \leq 0.25$, $0.5 \leq y \leq 0.8$, $0.1 \leq z \leq 0.25$. In some of these examples, $x+y+2z=1$. In some other examples, $y+2z=1$. In some other examples, $y+2z=1.1$. In some other examples, $y+2z=1.2$. In some other examples, $y+2z=1.25$.

In some examples, sets forth herein is a positive electrode active material, characterized by the following formula: $LiNi_yMn_zCo_zO_2$, wherein $0.5 \leq y \leq 0.8$, $0.1 \leq z \leq 0.25$. In some of these examples, $y+2z=0.8$. In other examples, $y+2z=0.9$. In some of these examples, $y+2z=1$. In other examples, $y+2z=1.1$. In some other examples, $y+2z=1.2$.

In some of the examples wherein an amount of the Li occupies Ni, Mn, or Co crystal lattice positions, the amount of Li ranges from 0 to 15 mol %. In some of these examples, the amount is 0 mol %. In some other of these examples, the amount is 0.5 mol %. In other examples, the amount is 1 mol %. In certain of these examples, the amount is 1.5 mol %. In yet other of these examples, the amount is 2.0 mol %. In some of these examples, the amount is 2.5 mol %. In some other of these examples, the amount is 3.0 mol %. In certain of these examples, the amount is 3.5 mol %. In yet other of these examples, the amount is 4.0 mol %. In some other of these examples, the amount is 4.5 mol %. In other examples, the amount is 5 mol %. In certain of these examples, the amount is 5.5 mol %. In yet other of these examples, the amount is 6.0 mol %. In some of these examples, the amount is 6.5 mol %. In some other of these examples, the amount is 7.0 mol %. In certain of these examples, the amount is 7.5 mol %. In yet other of these examples, the amount is 8.0 mol %. In some other of these examples, the amount is 8.5 mol %. In other examples, the amount is 9 mol %. In certain of these examples, the amount is 9.5 mol %. In yet other of these examples, the amount is 10.0 mol %. In some of these examples, the amount is 10.5 mol %. In some other of these examples, the amount is 11.0 mol %. In certain of these examples, the amount is 11.5 mol %. In yet other of these examples, the amount is 12.0 mol %. In some other of these examples, the amount is 12.5 mol %. In other examples, the amount is 13 mol %. In certain of these examples, the amount is 13.5 mol %. In yet other of these examples, the amount is 14.0 mol %. In some of these examples, the amount is 14.5 mol %. In some other of these examples, the amount is 15.0 mol %.

In some examples, set forth herein is a material as described above wherein $x>0$. In some examples, set forth herein is a material as described above wherein $x>0.05$ and $x<0.5$. In some examples, set forth herein is a material as described above wherein $x>0.10$. In some examples, set forth herein is a material as described above wherein $x>0.15$. In some examples, set forth herein is a material as described above wherein $x>0.20$.

In some examples, set forth herein is positive electrode active material that is a layered-layered oxide. In some of these examples, the material comprises at least two polycrystalline layered oxide phases. In certain of these examples, at least two polycrystalline layered oxide phases are inter-grown phases. In yet other of these examples, a third polycrystalline phase is present as an inter-growth layered oxide. In some examples, this third phase is a spinel, either cubic or tetragonal, phase, such as but not limited to $LiMn_2O_4$, $LiNi_2O_4$, $Li(Ni_yCo_z)_2O_4$. In some examples, this third phase is a low voltage stable phase that precipitates during the use or cycling of the active material.

In some examples, set forth herein is positive electrode active, wherein one of the at least two crystalline layered oxide phases is $Li_2M^1O_3$ where $M^1$ is selected from Ni, Mn, or Co. In some examples, $M^1$ is Ni. In some other examples, $M^1$ is Mn. In yet other examples, $M^1$ is Co. In certain other examples, $M^1$ is a combination of at least two of Ni, Mn, or Co. In some examples, the $Li_2M^1O_3$ is isostructural to $Na_2MnO_3$ and has C2/m symmetry.

In some examples, set forth herein is positive electrode active, wherein one of at least two crystalline layered oxide phases is $Li_{1+x}M^2O_2$ where $M^2$ is selected from Ni, Mn, or Co. In some examples, $M^2$ is Ni. In some other examples, $M^2$ is Mn. In yet other examples, $M^2$ is Co. In certain other examples, $M^2$ is a combination of at least two of Ni, Mn, or Co. In some examples, the $Li_{1+x}M^2O_2$ is isostructural to α-NaFeO$_2$ and has R3m symmetry.

In some examples, set forth herein is positive electrode active, wherein the material is described as a two-phase mixture a $Li_2M^1O_3+(1-a)Li_{1+x}M^2O_2$, wherein $0 \leq a \leq 0.3$ is the relative mole fraction of $Li_2M^1O_3$, and $0 \leq x \leq 0.1$ is the mole fraction of excess lithium in $Li_{1+x}M^2O_2$. In some examples, a is 0. In some other examples, a is 0.1. In yet other examples, a is 0.2. In still other examples, a is 0.3.

In some examples, set forth herein is positive electrode active, as described above, and further comprising an amorphous phase.

Figure 9:
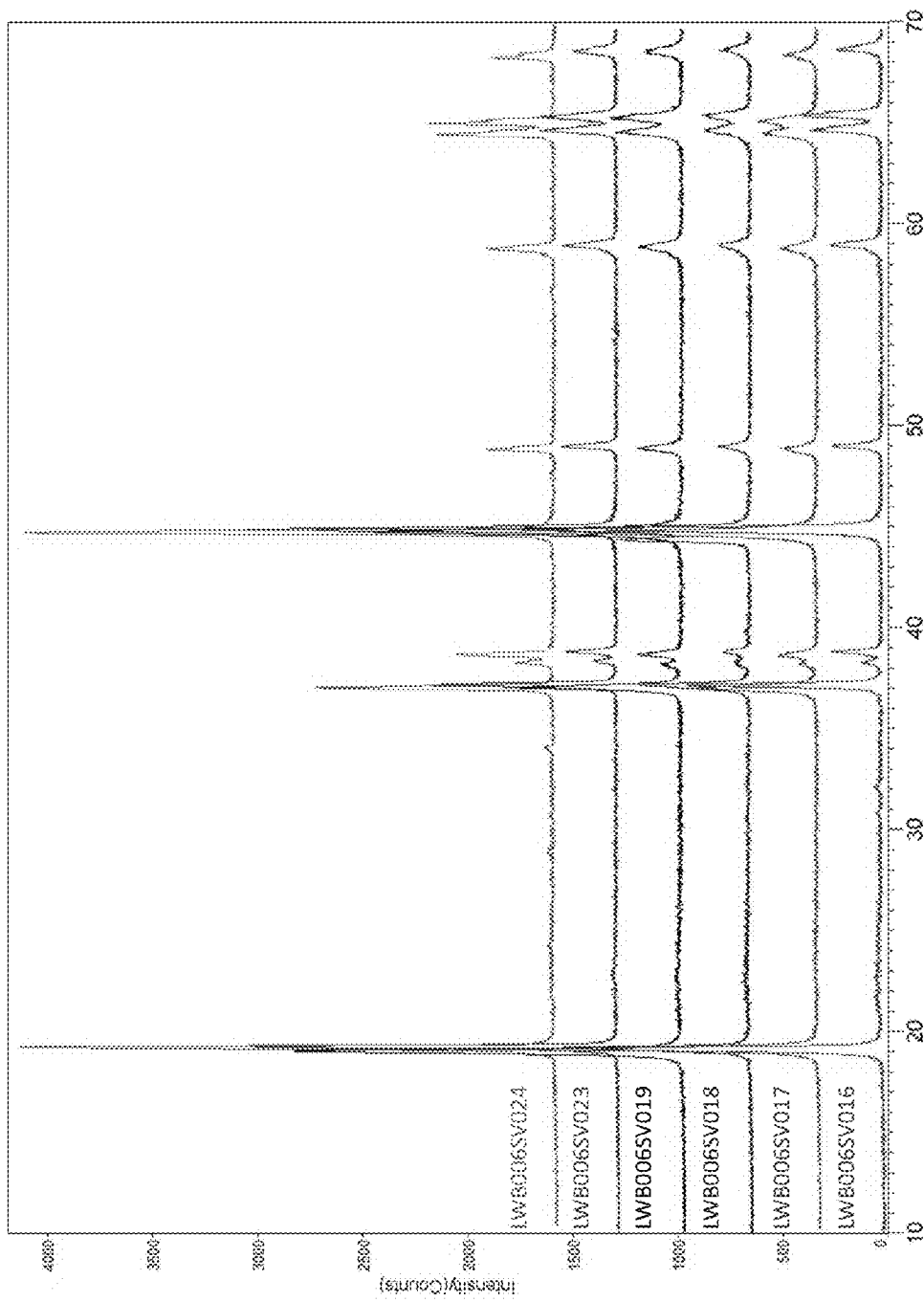
FIG. 9 shows an X-ray diffraction pattern for LR-NMC powder prepared according to example 1.
Figure 10:
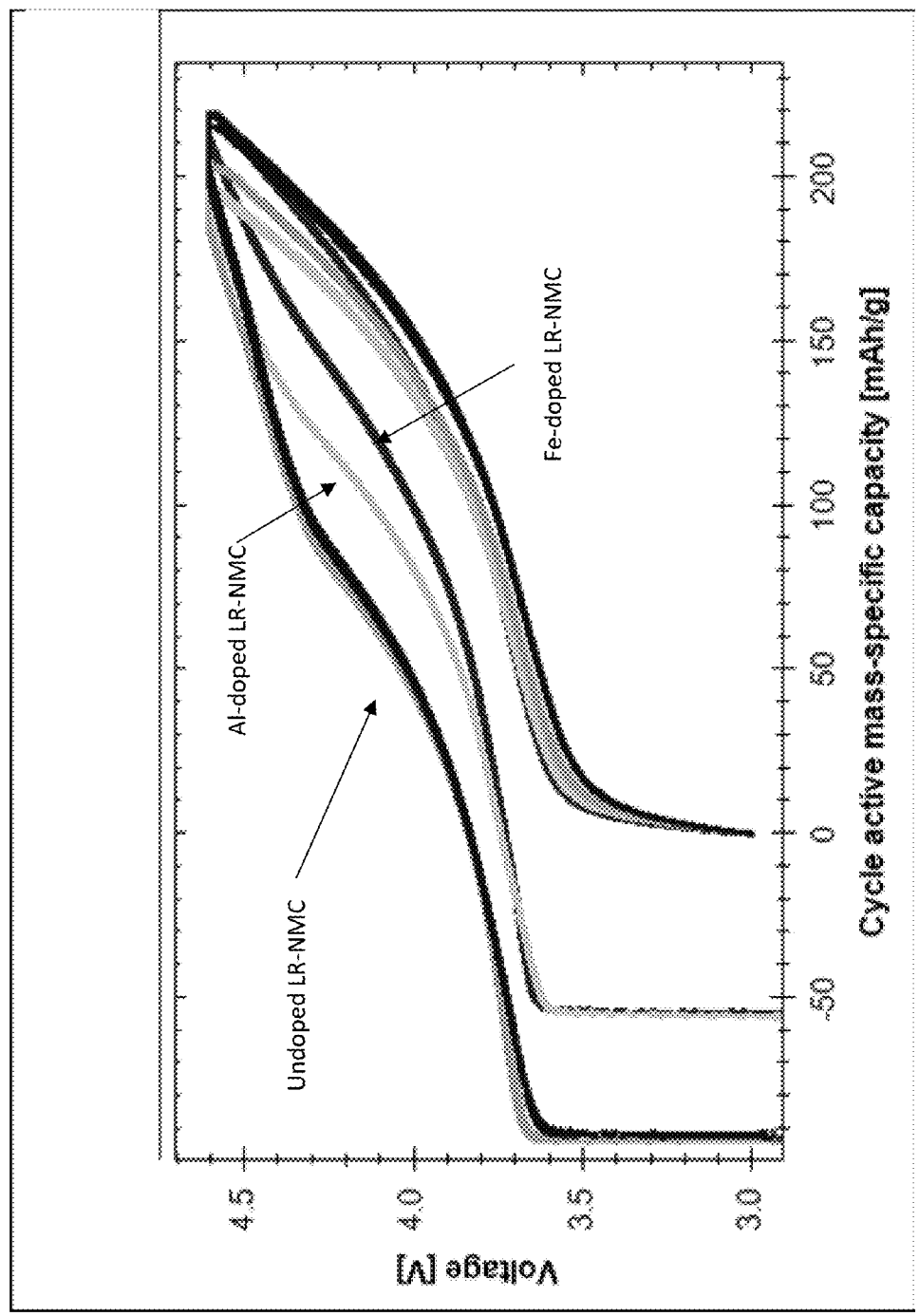
FIG. 10 shows Voltage v. Li as a function of cycle active mass-specific capacity (mAh/g) for undoped LR-NMC, LR-NMC doped with Al, and LR-NMC doped with Fe.
Figure 11:
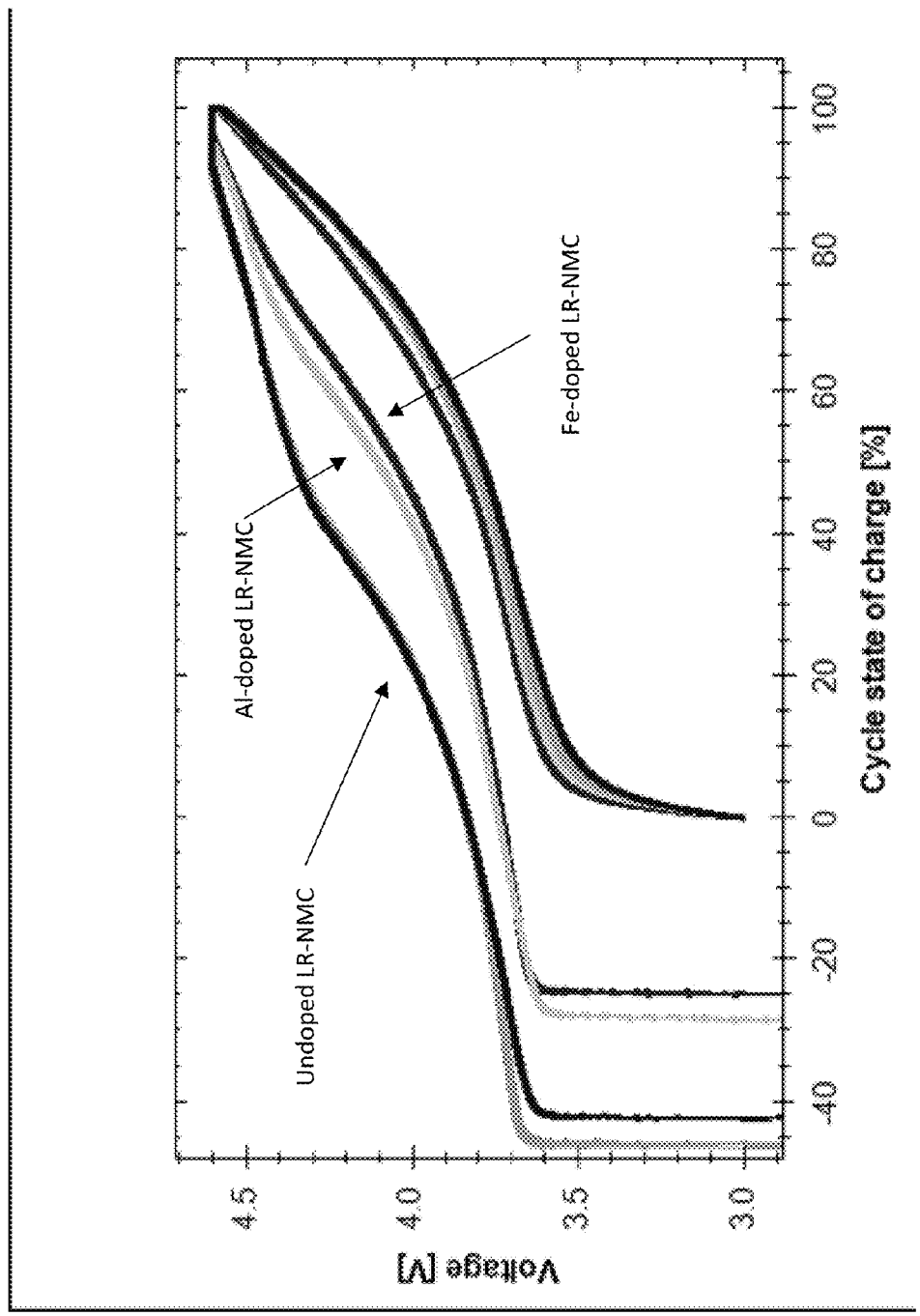
FIG. 11 shows Voltage v Li as a function of cycle state of charge (SOC) for undoped LR-NMC, LR-NMC doped with Al, and LR-NMC doped with Fe.

In some examples, set forth herein is positive electrode active, wherein the material is polycrystalline and characterized by a first X-ray diffraction (XRD) pattern intensity peak at 19° (2Θ) and a second XRD at 38-39° (2Θ), and wherein the ratio of the first peak to the second peak is equal to or greater than 1. In some examples, the ratio of the first peak to the second peak is equal to or greater than 2. In some examples, the material is characterized by a X-ray diffraction pattern substantially as set forth in FIG. 9.

In some examples, set forth herein is positive electrode active, wherein the material includes a $Li_{1+x}M^2O_2$ unit cell which is characterized by a unit cell volume ranging from 95 to 120 Å$^3$. In some of these examples, the unit cell volume is about 95 Å$^3$. In some other of these examples, the unit cell volume is about 96 Å$^3$. In yet other of these examples, the unit cell volume is about 97 Å$^3$. In still other of these examples, the unit cell volume is about 98 Å$^3$. In some other of these examples, the unit cell volume is about 99 Å$^3$. In some of these examples, the unit cell volume is about 100 Å$^3$. In some of these examples, the unit cell volume is about 101 Å$^3$. In some other of these examples, the unit cell volume is about 102 Å$^3$. In yet other of these examples, the unit cell volume is about 103 Å$^3$. In still other of these examples, the unit cell volume is about 104 Å$^3$. In other of these examples, the unit cell volume is about 105 Å$^3$. In some other of these examples, the unit cell volume is about 106 Å$^3$. In some of these examples, the unit cell volume is about 107 Å$^3$. In some of the examples, the unit cell of $Li_{1+x}M^2O_2$ is characterized by a unit cell volume ranging from 102 to 103 Å$^3$. In certain of these examples, the unit cell of $Li_{1+x}M^2O_2$ is characterized by a unit cell volume less than 102 Å$^3$. In some other of these examples, the unit cell is greater than 95 Å$^3$.

Generally, as more Li occupies Ni, Mn, or Co crystal lattice positions, the unit cell volume decreases. In some embodiments, as the amount of Li which occupies crystal lattice positions in $Li_{1+x}M^2O_2$ increases, the unit cell volume decreases.

In some examples, set forth herein is a positive electrode material having a specific energy density of about 800-850 mWh/g at a discharge current of about C/10. In some examples, set forth herein is a positive electrode material having a specific energy density of about 750-800 mWh/g at a discharge current of about C/5. In some examples, set forth herein is a positive electrode material having a specific energy density of about 700-750 mWh/g at a discharge current of about C/1. In some examples, set forth herein is a positive electrode material having a specific energy density of about 650-700 mWh/g at a discharge current of about 2.5 C. In some examples, the positive electrode material set forth herein has a specific energy density of about 850 mWh/g at C/1.

Figure 16:
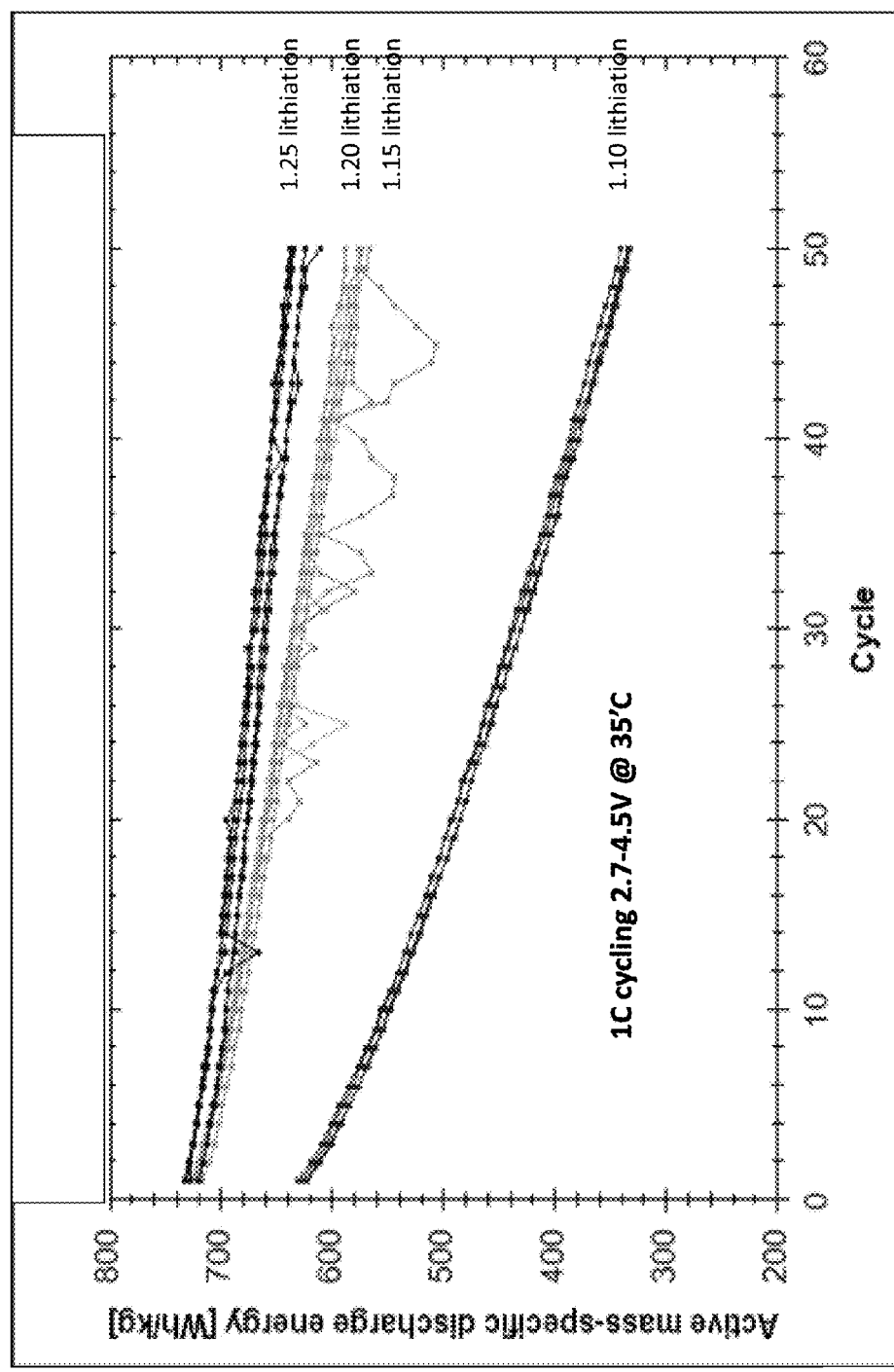
FIG. 16 shows active mass-specific discharge energy (Wh/kg) as a function of charge-discharge cycle for LR-NMCs having varying lithium amounts. Top plot is LR-NMC wherein x is 0.25. Bottom plot is LR-NMC wherein x is 0.10. Plots in the middle are LR-NMC wherein x is either 0.20 or 0.15.
Figure 17:
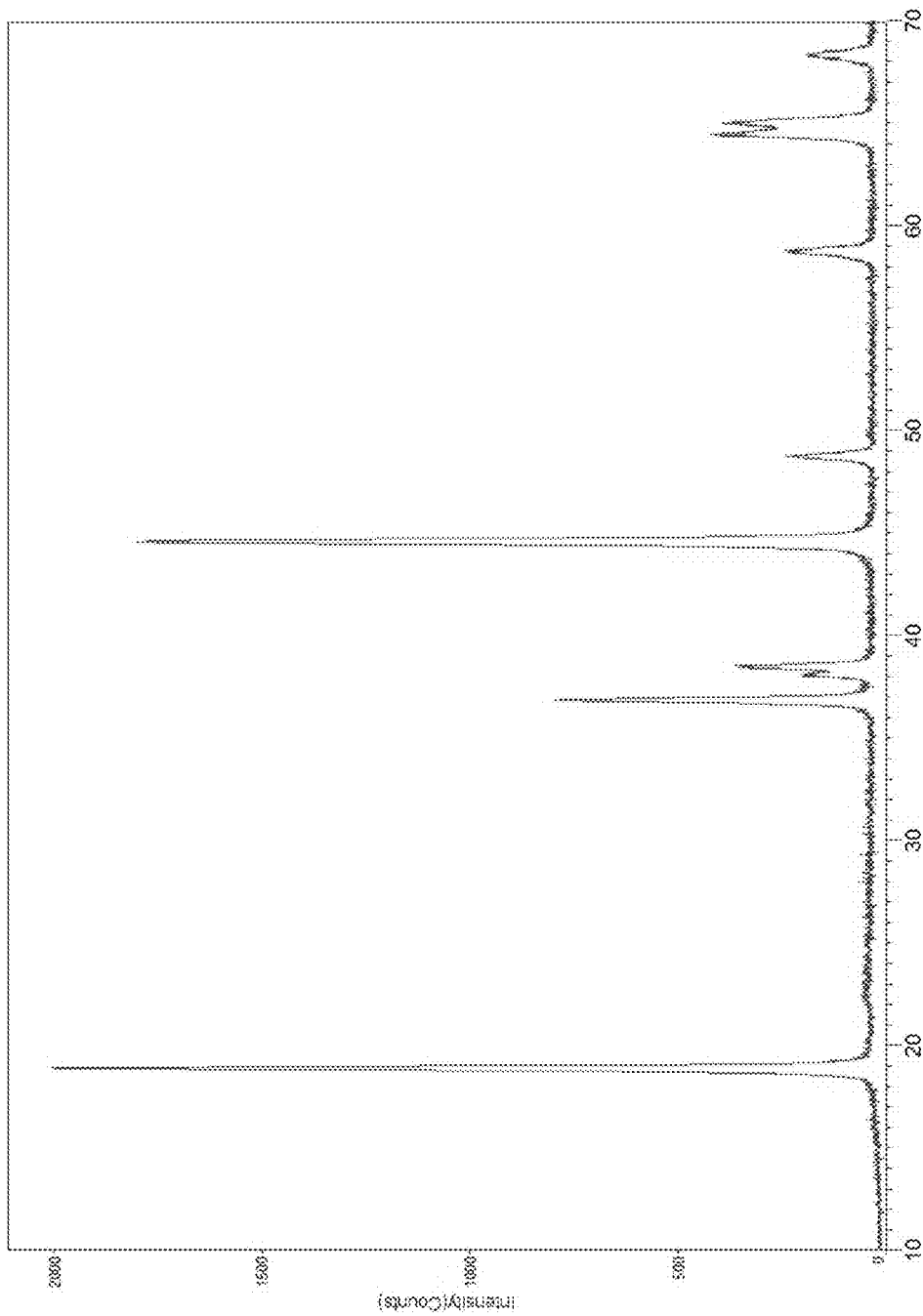
FIG. 17 shows an X-ray diffraction plot [Intensity v. Degree (2Θ)] for LR-NMC ($Li_{1+x}Ni_{0.5}Mn_{0.25}Co_{0.25}O_{2+(x/2)}$). The ratio of the {003} peak at 19° (2Θ) to the {101} peak at 38° (2Θ) to the {104} peak at 45° (2Θ) is 100:38.4:89.1.
Figure 18:
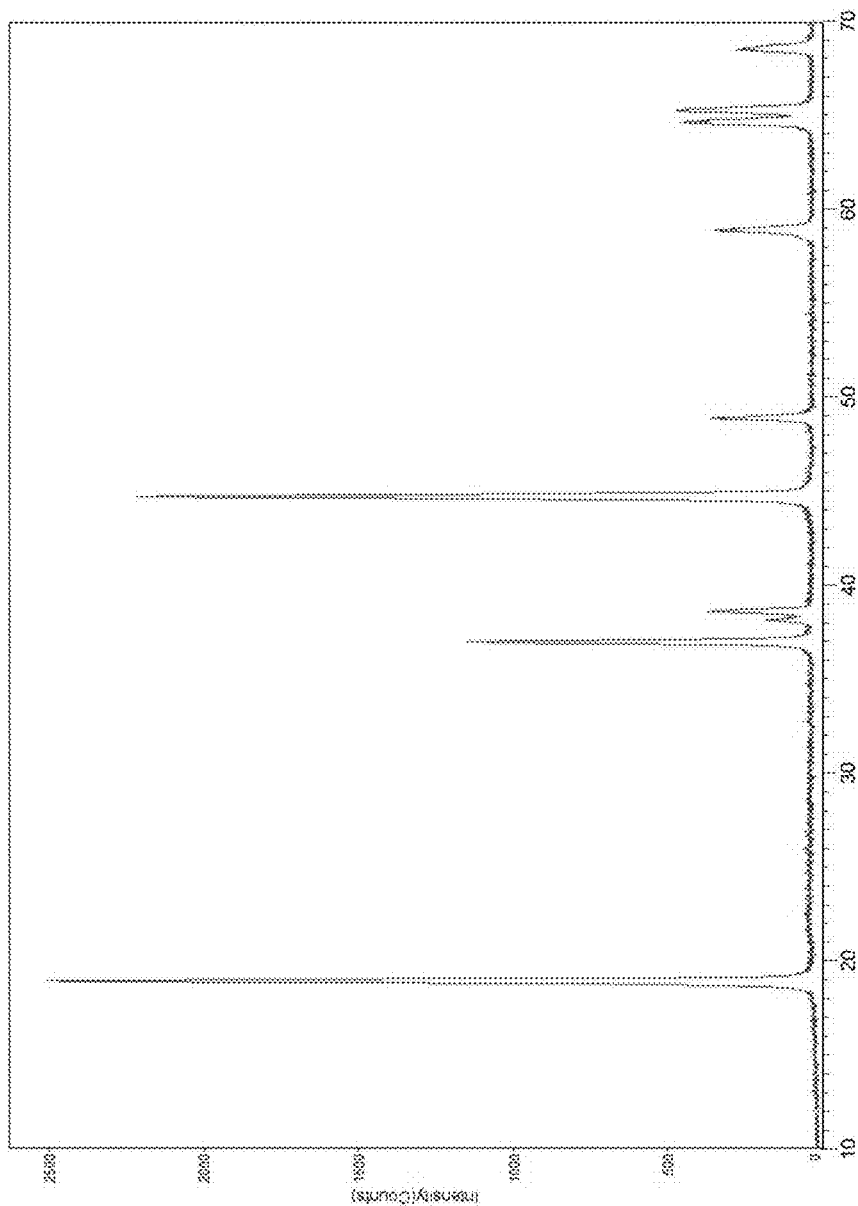
FIG. 18 shows an X-ray diffraction plot [Intensity v. Degree (2Θ)] for LR-NMC ($Li_{1+x}Ni_{0.5}Mn_{0.25}Co_{0.25}O_{2+(x/2)}$). The ratio of the {003} peak at 19° (2Θ) to the {101} peak at 38° (2Θ) to the {104} peak at 45° (2Θ) is 100:44.9: 88.0.
Figure 19:
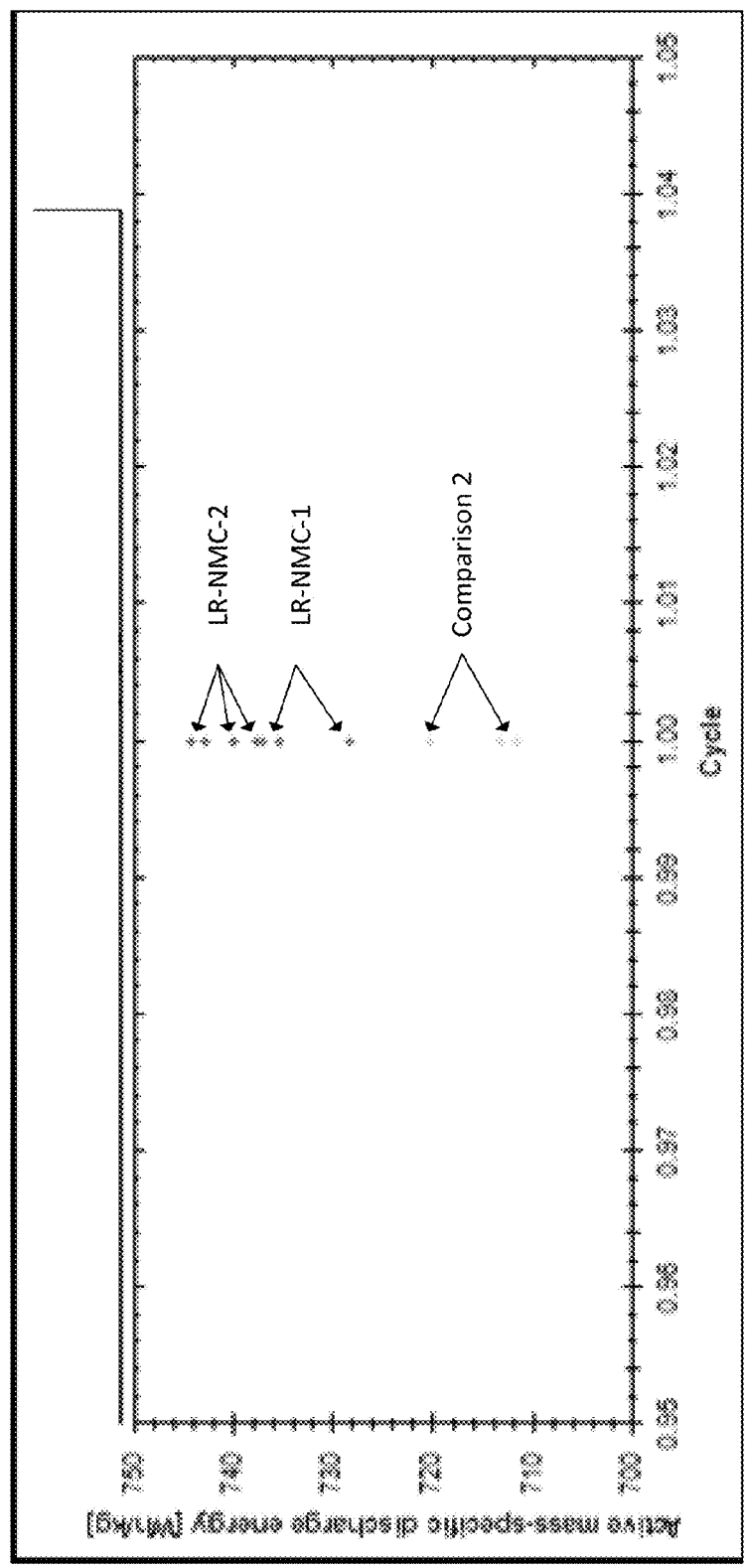
FIG. 19 shows a comparison plot of Active mass-specific discharge energy [Wh/kg] for LR-NMC ($Li_{1+x}Ni_{0.5}Mn_{0.25}Co_{0.25}O_{2+(x/2)}$), LR-NMC-2=($Li_{1+x}Ni_{0.6}Mn_{0.2}Co_{0.2}O_{2-(x/2)}$), and Comparison 2 ($LiNi_{0.6}Mn_{0.2}Co_{0.2}O_2$), wherein $0 \leq x \leq 0.25$, for 1 C discharge at 35° C.
Figure 20:
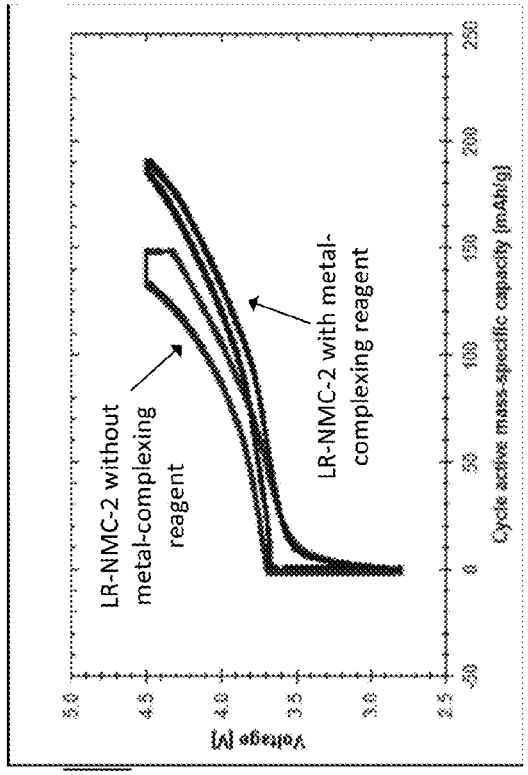
FIG. 20 shows Voltage (V v. Li) v. Cycle Active Mass-specific Capacity [mAh/g] for LR-NMC-2=($Li_{1+x}Ni_{0.6}Mn_{0.2}Co_{0.2}O_{2+(x/2)}$) prepared with and without a metal-complexing reagent.
Figure 20:
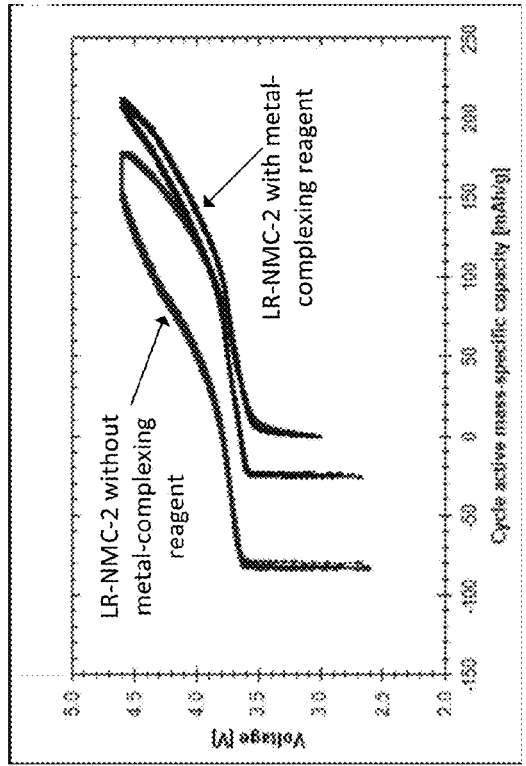
Figure 21:
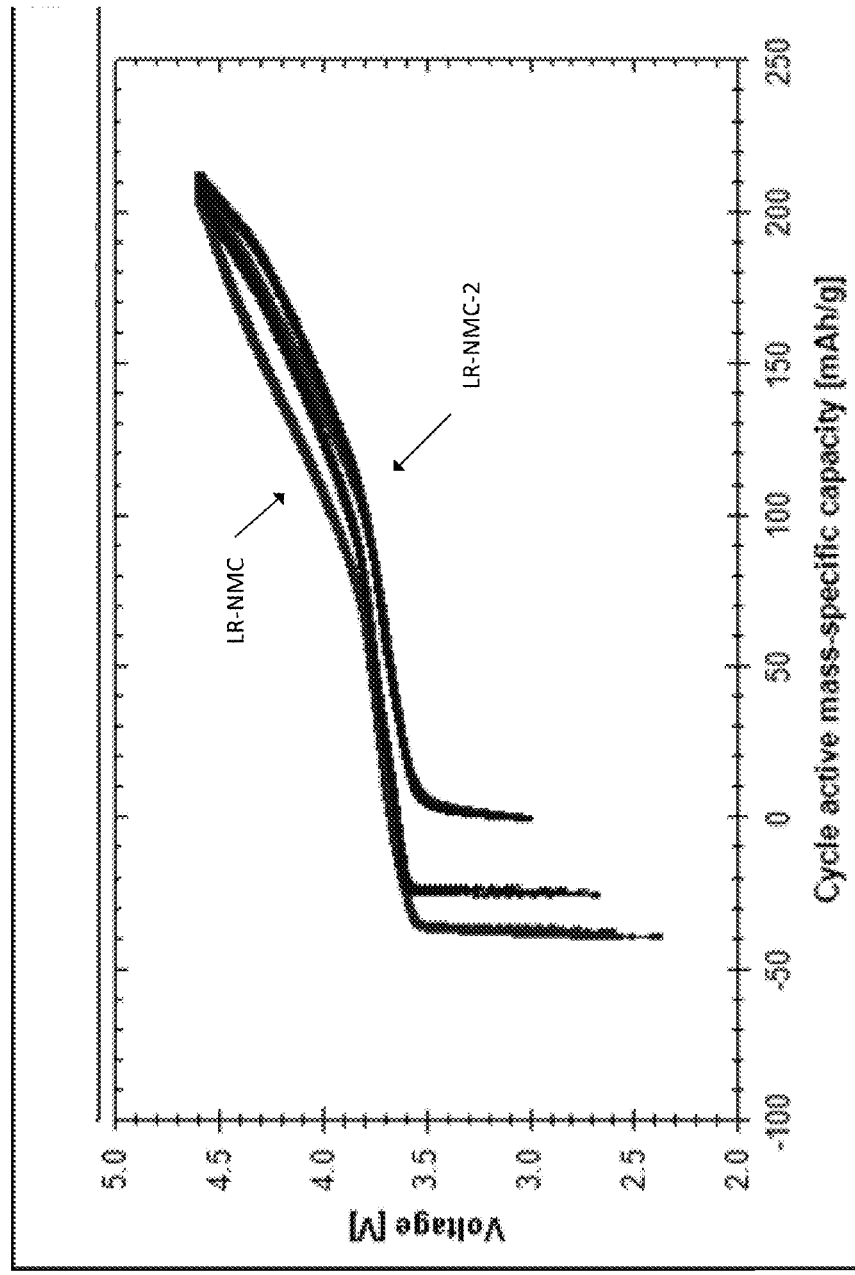
FIG. 21 shows Voltage (V v. Li) v. Cycle Active Mass-specific Capacity [mAh/g] for LR-NMC with comparison to LR-NMC-2.

In some examples, set forth herein are lithium rich nickel, manganese, cobalt oxides that demonstrate a specific energy of 820 Wh/kg at C/10 rate. In some examples, set forth herein are lithium rich nickel, manganese, cobalt oxides that demonstrate a specific energy of 720 Wh/kg at C/1 rate. In some examples, set forth herein are lithium rich nickel, manganese, cobalt oxides that demonstrate a specific energy of 690 Wh/kg at 2.5 C rate between. In some examples, the specific energy is increased by increasing the long range order of the transition metal cations. As shown in FIG. 16, over lithiation improves capacity retention. Going from $Li_{1.25}Ni_{0.5}Mn_{0.25}Co_{0.25}O_{2.125}$ to $Li_{1.2}Ni_{0.5}Mn_{0.25}Co_{0.25}O_{2.1}$ to $Li_{1.15}Ni_{0.5}Mn_{0.25}Co_{0.25}O_{2.075}$ to $Li_{1.1}Ni_{0.5}Mn_{0.25}Co_{0.25}O_{2.05}$, the active mass-specific discharge energy decreases.

In some examples, set forth herein is a positive electrode material wherein one of the at least one crystalline material therein has a grain size from about 50 nm to about 500 nm. In some examples, the grain size is from about 50 nm to about 450 nm. In some examples, the grain size is from about 50 nm to about 400 nm. In some examples, the grain size is from about 50 nm to about 350 nm. In some examples, the grain size is from about 50 nm to about 300 nm. In some examples, the grain size is from about 50 nm to about 250 nm. In some examples, the grain size is from about 50 nm to about 200 nm. In some examples, the grain size is from about 50 nm to about 150 nm. In some examples, the grain size is from about 50 nm to about 100 nm.

In some examples, set forth herein is a positive electrode material wherein one of the at least one crystalline material therein has a grain size from about 50 nm to about 500 nm. In some examples, the grain size is from about 60 nm to about 500 nm. In some examples, the grain size is from about 70 nm to about 500 nm. In some examples, the grain size is from about 80 nm to about 500 nm. In some examples, the grain size is from about 90 nm to about 500 nm. In some examples, the grain size is from about 100 nm to about 500 nm. In some examples, the grain size is from about 150 nm to about 500 nm. In some examples, the grain size is from about 200 nm to about 500 nm. In some examples, the grain size is from about 250 nm to about 500 nm. In some examples, the grain size is from about 300 nm to about 500 nm. In some examples, the grain size is from about 350 nm to about 500 nm. In some examples, the grain size is from about 400 nm to about 500 nm. In some examples, the grain size is from about 450 nm to about 500 nm. In some examples, the grain size is from about 100 nm to about 500 nm. In some examples, the grain size is from about 50 nm to about 400 nm. In some examples, the grain size is from about 60 nm to about 300 nm. In some examples, the grain size is from about 70 nm to about 200 nm. In some examples, the grain size is from about 80 nm to about 100 nm. In some examples, the grain size is from about 90 nm to about 100 nm.

In some of these examples, set forth herein is a positive electrode material wherein one of the at least one crystalline material therein has a grain size from about 1 nm to about 500 nm the grain size is 50 nm. In some examples, the grain size is 1 nm. In some examples, the grain size is 3 nm. In some examples, the grain size is 5 nm. In some examples, the grain size is 10 nm. In some examples, the grain size is 15 nm. In some examples, the grain size is 20 nm. In some examples, the grain size is 25 nm. In some examples, the grain size is 30 nm. In some examples, the grain size is 35 nm. In some examples, the grain size is 40 nm. In some examples, the grain size is 45 nm. In some examples, the grain size is 50 nm. In other examples, the grain size is 55 nm. In yet other examples, the grain size is 60 nm. In still other examples, the grain size is 65 nm. In other examples, the grain size is 70 nm. In other examples, the grain size is 70 nm. In some other examples, the grain size is 75 nm. In some of these examples, the grain size is 80 nm. In other examples, the grain size is 85 nm. In yet other examples, the grain size is 90 nm. In still other examples, the grain size is 95 nm. In other examples, the grain size is 100 nm. In other examples, the grain size is 105 nm. In some other examples, the grain size is 110 nm. In some of these examples, the grain size is 115 nm. In other examples, the grain size is 120 nm. In yet other examples, the grain size is 125 nm. In still other examples, the grain size is 130 nm. In other examples, the grain size is 135 nm. In other examples, the grain size is 140 nm. In some other examples, the grain size is 145 nm. In some of these examples, the grain size is 150 nm. In other examples, the grain size is 155 nm. In yet other examples, the grain size is 160 nm. In still other examples, the grain size is 165 nm. In other examples, the grain size is 170 nm. In other examples, the grain size is 175 nm. In some other examples, the grain size is 180 nm. In some of these examples, the grain size is 185 nm. In other examples, the grain size is 190 nm. In yet other examples, the grain size is 195 nm. In still other examples, the grain size is 200 nm. In other examples, the grain size is 205 nm. In other examples, the grain size is 210 nm. In some other examples, the grain size is 215 nm. In some of these examples, the grain size is 220 nm. In other examples, the grain size is 225 nm. In yet other examples, the grain size is 230 nm. In still other examples, the grain size is 235 nm. In other examples, the grain size is 240 nm. In other examples, the grain size is 245 nm. In some other examples, the grain size is 250 nm. In some of these examples, the grain size is 255 nm. In other examples, the grain size is 260 nm. In yet other examples, the grain size is 270 nm. In still other examples, the grain size is 280 nm. In other examples, the grain size is 285 nm. In other examples, the grain size is 290 nm. In some other examples, the grain size is 295 nm. In some of these examples, the grain size is 300 nm. In other examples, the grain size is 305 nm. In yet other examples, the grain size is 310 nm. In still other examples, the grain size is 315 nm. In other examples, the grain size is 320 nm. In other examples, the grain size is 325 nm. In some other examples, the grain size is 330 nm.

In some of these examples, set forth herein the grain size of the positive electrode active material is determined by a FWHM analysis of a powder x-ray diffraction pattern (XRD).

In some of these examples, set forth herein the grain size of the positive electrode active material is determined by analysis of a scanning electron microscopy image.

In some of these examples, set forth herein is a positive electrode active material as set forth above wherein the grain size specified is from the dominant crystal phase in a collection of crystal phases.

In some of these examples, set forth herein is a positive electrode active material as set forth above wherein the grain size specified is with reference to each distinct crystallographic phases in an interpenetrating combination of phase.

In some of these examples, set forth herein is a positive electrode active material characterized by the formula $Li_{1+x}Ni_{0.5}Mn_{0.25}Co_{0.25}O_{2+x/2}$ or $Li_{1+x}Ni_{0.6}Mn_{0.20}Co_{0.20}O_{2+x/2}$; wherein $0 \leq x \leq 0.25$. In this formula, in some examples, x is 0. In some other examples, x is 0.1. In yet other examples, x is 0.2. In certain other examples, x is 0.25.

In some of these examples, set forth herein is a positive electrode active material characterized by the formula $Li_{1+x}Ni_{0.5}Mn_{0.25}Co_{0.25}O_{2-x/2}$ or $Li_{1+x}Ni_{0.6}Mn_{0.20}Co_{0.20}O_{2+x/2}$; wherein $0 \leq x \leq 0.25$. In this formula, in some examples, x is 0. In some other examples, x is 0.1. In yet other examples, x is 0.2. In certain other examples, x is 0.25.

In some of these examples, set forth herein is a positive electrode active material as set forth above wherein the material is doped with a dopant selected from the group consisting of Al, Fe, Mg, Na, V, Cr, Ti, Zr and combinations thereof. In some examples, the dopant is Al. In other examples, the dopant is Fe. In still other examples, the dopant is Mg. In some other examples, the dopant is Na. In other examples, the dopant is V. In some examples, the dopant is Cr. In yet other examples, the dopant is Ti. In still other examples, the dopant is Zr. In some examples, the dopant includes a combination of at least two or more of Al, Fe, Mg, Na, V, Cr, Ti, or Zr. In some other examples, the dopant includes a combination of Al and Fe. As set forth above, the amount of dopants, when present, are present at a concentration of 0.1 to 10 atomic %. In some examples, the concentration is 0.1 to 5 atomic %. In these examples, the percent is calculated with respect to the transition metals present in the LR-NMC which is doped. For example, a dopant of 5 mol % in LR-NMC is at a 5 mol % with respect to the total amount of Ni+Mn+Co.

In some examples, a combination of Al and Fe are used as dopants. In some examples, this combination has a total dopant concentration of about 5 mol %. In some of these examples, wherein the total dopant concentration is 5 mol %, the amount of Fe is 2.5 mol % and the amount of Al is 2.5 mol %. In other examples, the total dopant concentration for a combination of dopants is 1 mol %. In some other examples, the total dopant concentration for a combination of dopants is 2 mol %. In yet other examples, the total dopant concentration for a combination of dopants is 3 mol %. In other examples, the total dopant concentration for a combination of dopants is 4 mol %. In some other examples, the total dopant concentration for a combination of dopants is 5 mol %.

In some of these examples, set forth herein is a positive electrode active material as set forth above wherein the material is doped with cation having an ionic radii within 10% of Ni3+. In some of these examples, set forth herein is a positive electrode active material as set forth above wherein the material is doped with cation having an ionic radii within 10% of Li+ (octahedral coordination). Added for completeness and to not get restricted to doping for TM only. Dopant may occupy Li interstitial sites too.

In some of these examples, set forth herein is a positive electrode active material as set forth above wherein the material is doped with a dopant wherein the dopant is present at about 0.1 to 5 atomic %. In some examples, the amount of the dopant set forth above is about 0.1 atomic %. In some other examples, the amount of the dopant is about 0.2 atomic %. In other examples, the amount of the dopant is about 0.3 atomic %. In certain examples, the amount of the dopant is about 0.4 atomic %. In some examples, the amount of the dopant is about 0.5 atomic %. In some other examples, the amount of the dopant is about 0.6 atomic %. In some examples, the amount of the dopant is about 0.7 atomic %. In certain examples, the amount of the dopant is about 0.8 atomic %. In some examples, the amount of the dopant is about 0.9 atomic %. In some other examples, the amount of the dopant is about 1 atomic %. In some examples, the amount of the dopant set forth above is about 1.1 atomic %. In some other examples, the amount of the dopant is about 1.2 atomic %. In other examples, the amount of the dopant is about 1.3 atomic %. In certain examples, the amount of the dopant is about 1.4 atomic %. In some examples, the amount of the dopant is about 1.5 atomic %. In some other examples, the amount of the dopant is about 1.6 atomic %. In some examples, the amount of the dopant is about 1.7 atomic %. In certain examples, the amount of the dopant is about 1.8 atomic %. In some examples, the amount of the dopant is about 1.9 atomic %. In some other examples, the amount of the dopant is about 2 atomic %. In some examples, the amount of the dopant set forth above is about 2.1 atomic %. In some other examples, the amount of the dopant is about 2.2 atomic %. In other examples, the amount of the dopant is about 2.3 atomic %. In certain examples, the amount of the dopant is about 2.4 atomic %. In some examples, the amount of the dopant is about 2.5 atomic %. In some other examples, the amount of the dopant is about 2.6 atomic %. In some examples, the amount of the dopant is about 2.7 atomic %. In certain examples, the amount of the dopant is about 2.8 atomic %. In some examples, the amount of the dopant is about 2.9 atomic %. In some other examples, the amount of the dopant is about 3 atomic %. In some examples, the amount of the dopant set forth above is about 3.1 atomic %. In some other examples, the amount of the dopant is about 3.2 atomic %. In other examples, the amount of the dopant is about 3.3 atomic %. In certain examples, the amount of the dopant is about 3.4 atomic %. In some examples, the amount of the dopant is about 3.5 atomic %. In some other examples, the amount of the dopant is about 3.6 atomic %. In some examples, the amount of the dopant is about 3.7 atomic %. In certain examples, the amount of the dopant is about 3.8 atomic %. In some examples, the amount of the dopant is about 3.9 atomic %. In some other examples, the amount of the dopant is about 4 atomic %. In some examples, the amount of the dopant set forth above is about 4.1 atomic %. In some other examples, the amount of the dopant is about 4.2 atomic %. In other examples, the amount of the dopant is about 4.3 atomic %. In certain examples, the amount of the dopant is about 4.4 atomic %. In some examples, the amount of the dopant is about 4.5 atomic %. In some other examples, the amount of the dopant is about 4.6 atomic %. In some examples, the amount of the dopant is about 4.7 atomic %. In certain examples, the amount of the dopant is about 4.8 atomic %. In some examples, the amount of the dopant is about 4.9 atomic %. In some other examples, the amount of the dopant is about 5 atomic %.

Figure 12:
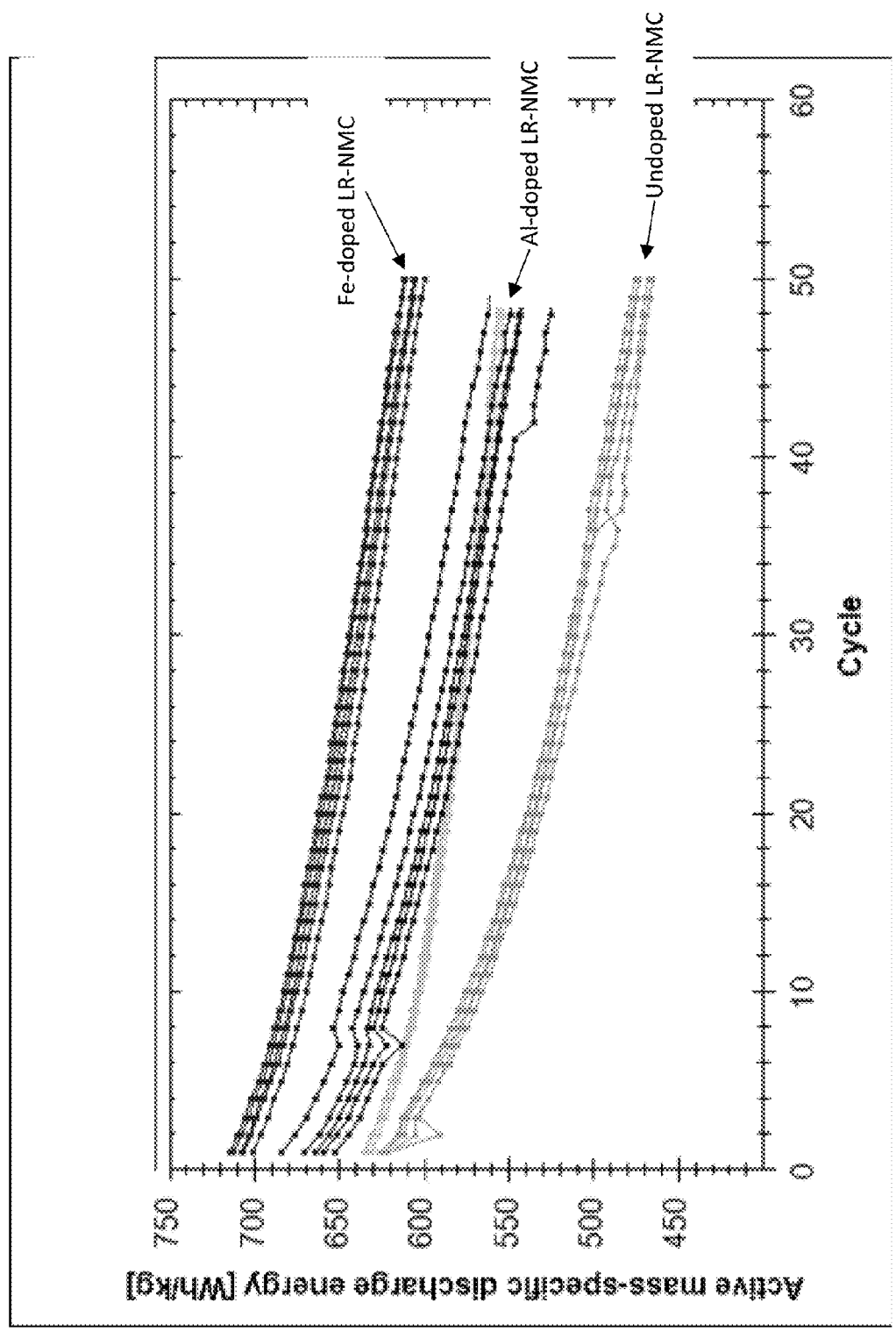
FIG. 12 shows active mass-specific discharge energy (Wh/kg) as a function of cycle charge/discharge cycle for undoped LR-NMC, LR-NMC doped with Al at 5 mol %, and LR-NMC doped with Fe at 5 mol %. Herein, 5 mol % is a % relative to the total mol amount of (Ni+Mn+Co).
Figure 13:
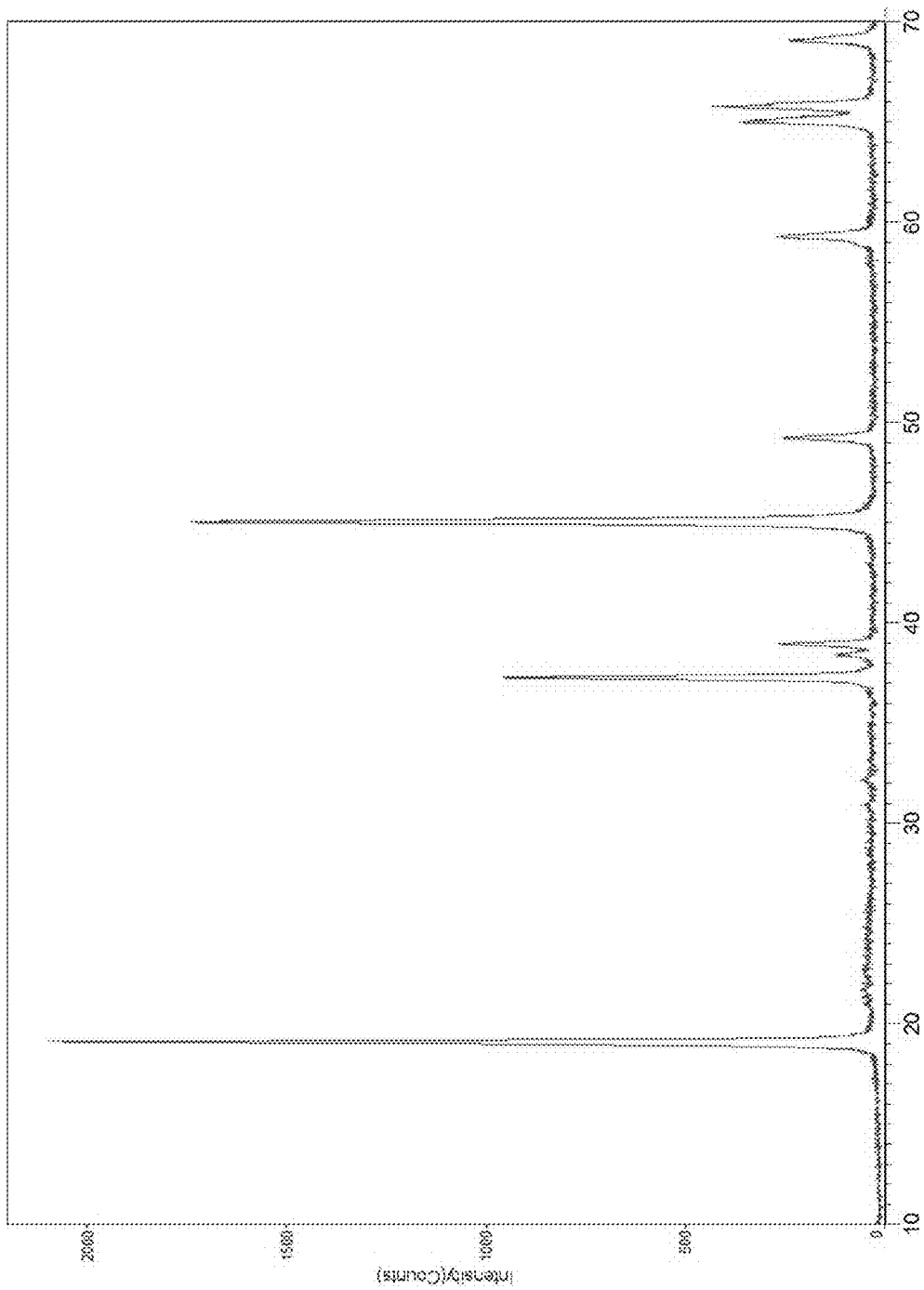
FIG. 13 shows an X-ray diffraction plot [Intensity v. Degree (2Θ)] for LR-NMC ($Li_{1+x}Ni_{0.5}Mn_{0.25}Co_{0.25}O_{2+(x/2)}$)
Figure 14:
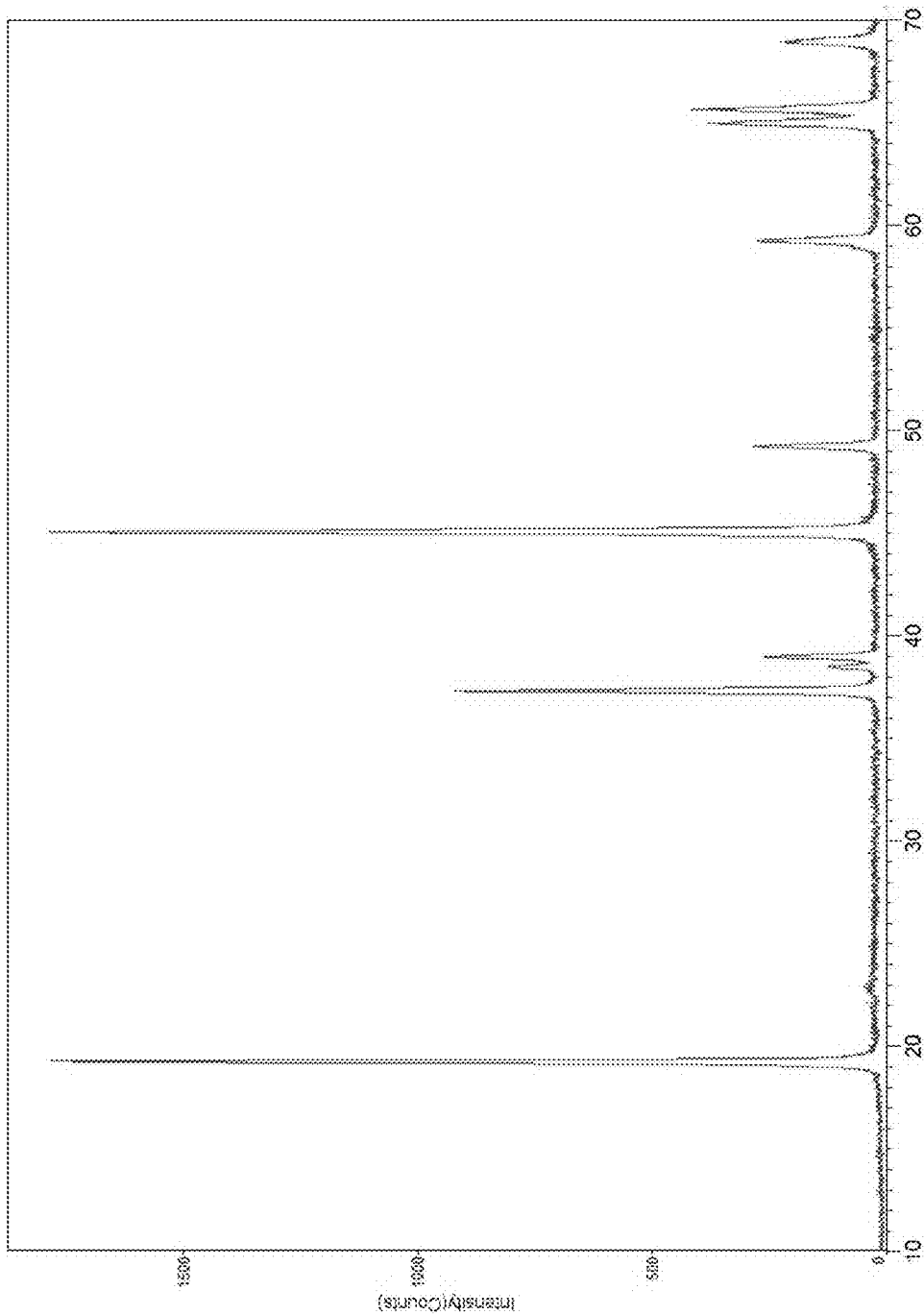
FIG. 14 shows an X-ray diffraction plot [Intensity v. Degree (2Θ)] for LR-NMC ($Li_{1+x}Ni_{0.5}Mn_{0.25}Co_{0.25}O_{2+(x/2)}$)
Figure 15:
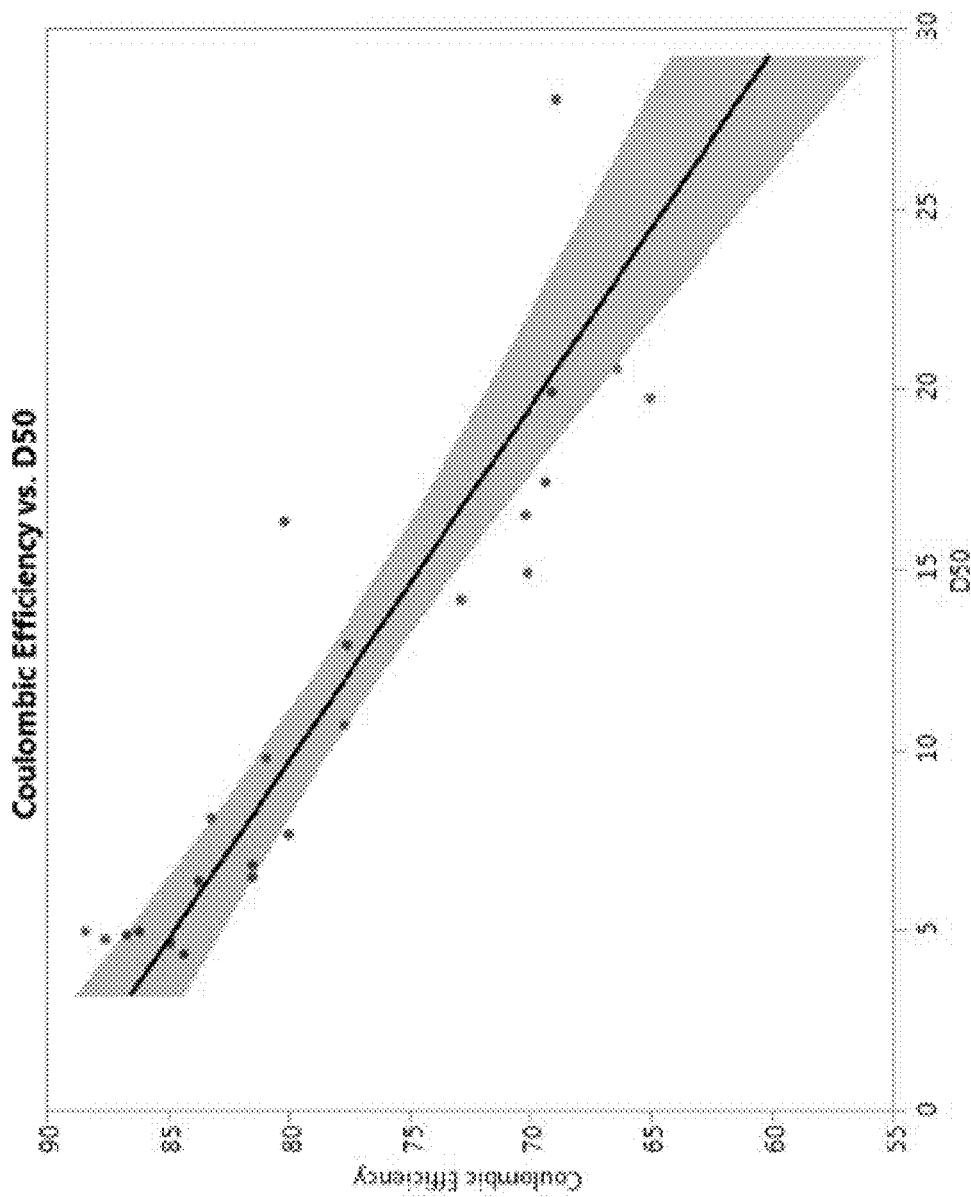
FIG. 15 shows Coulombic Efficiency for LR-NMC as a function of $d_{50}$ particle size.

Without being bound to a particular theory, the work here suggests that additional cations such as dopants can alter the chemical composition of the bulk cathode material and with a beneficial effect on the electrochemical performance of the lithium ion storage material. For example, discharge rate performance improves with lithium iron phosphate materials in which the dopants including Nb, Mn, Zr, Ti, V, Mo, Al, Mg. Some benefits of doping LR-NMC include, but are not limited to improving electronic conductivity of the active material, (e.g., Zr and Nb dopants in $LiFePO_4$), or improving the lithium ion conductivity of the material (e.g., V dopants in $LiFePO_4$), or improving structural stability during the charge/discharge cycle of the energy storage device (e.g., aluminum or magnesium). As shown in FIG. 12, small amounts of Fe at about 5 atomic % is shown to increase capacity retention (i.e., cycle life) for certain LR-NMC compositions. Other benefits of doping include, but are not limited to, increasing the LR-NMC conductivity, cycle reversibility or lowering the discharge-charge hysteresis. Ti or Zr dopants may reduce any reactivity with an electrolyte. Anion dopants may be useful for tuning the voltage of the LR-NMC.

In some of these examples, set forth herein is a positive electrode active material wherein the material has a surface coating selected from the group consisting of $AlF_x$ wherein $0 \leq x \leq 3$, $CoPO_4$, cobalt oxide, $LiFePO_4$, lithium phosphate, lithium hydrophosphate, alumina, aluminum phosphate, lithium aluminum phosphate, lithium aluminate, aluminum fluoride, titania, titanium phosphate, lithium titanate, lithium niobate, lithium zirconate, and lithiated or delithiated versions of the preceding coating compounds. In some of these examples, the coating is $AlF_x$ wherein $0 \leq x \leq 3$. In other examples, the coating is $CoPO_4$. In still other examples, the coating is $LiFePO_4$. In yet other examples, the coating is lithium phosphate. In some examples, the coating is lithium hydrophosphate. In still other examples, the coating is alumina. In some other examples, the coating is aluminum phosphate. In yet other examples, the coating is lithium aluminum phosphate. In some other examples, the coating is lithium aluminate. In certain other examples, the coating is aluminum fluoride. In some examples, the coating is titania. In some other examples, the coating is titanium phosphate. In some examples, the coating is lithium titanate. In other examples, the coating is lithium niobate. In some examples, the coating is lithium zirconate. In certain examples, the coating is a lithiated or delithiated versions of one of the preceding coatings.

As noted herein, the surface properties of positive electrode active materials influence electrochemical properties. Surface coatings can improve chemical compatibility of active materials when interfaced with electrolytes (i.e., decrease electrolyte reaction products). The severity of these reactions is exacerbated as the maximum oxidation voltage of the battery increases above 4-V. For example, previous work suggests that nickel is catalytically active at voltages above 4.4-V which accelerates electrolyte decompositions in several classes of cathode active materials, including $Li_1Ni_{0.5}Mn_{1.5}O_4$ (also called 5-V spinel), and $Li_1Ni_{0.8}Co_{0.2}O_2$. Previous work also suggests an improvement in cycling stability and electrolyte compatibility for the lithium storage material called NCA, $Li_1Ni_{0.8}Co_{0.15}Al_{0.05}O_2$, which can be characterized as an aluminum doped version of the is structural lithium, nickel, cobalt oxide phase, $Li_1Ni_{0.8}Co_{0.2}O_2$. Interestingly, the lithium-rich and high nickel compositions of the LR-NMC active materials set forth herein, demonstrate improved cycle life performance relative to commercially available materials even without surface modifications or coatings designed to eliminate side-reactions with liquid electrolyte. Without being bound to a particular theory, it may be that the LR-NMC active materials herein are particularly stable in part due to the partial lithium substitution within the metal oxide lattice structure and also due to the homogeneity of the crystalline grains and the grain size/morphology.

In some examples, set forth herein is a lithium-rich nickel, manganese, cobalt oxide of composition $Li_{1+x}Ni_{0.5}Mn_{0.25}Co_{0.25}O_{2+x/2}$, where some of the cobalt is locally enhanced in concentration at the surface of the crystallite grains and the interface between grain boundaries as described below in Example 6. Without being bound to a particular theory, these materials may be stabilized by having lattice sites primarily occupied by cobalt to the exclusion of manganese, which is known to be soluble in liquid electrolytes which are used in many lithium ion batteries, and nickel, which is thought to be particularly aggressive in causing side-reactions with the same liquid electrolytes.

In some examples, set forth herein is a lithium-rich nickel, manganese, cobalt oxide of composition $Li_{1+x}Ni_{0.5}Mn_{0.25}Co_{0.25}O_{2+x/2}$, where the surfaces of the primarily particles (i.e., grains) include an aluminum rich phase, such as aluminum fluoride or aluminum oxide, both of which may be lithiated or unlithiated. As described elsewhere, when a stoichiometric (Li/M~1) nickel cobalt oxide cathode material is modified by aluminum, and presumably at least some of the aluminum is localized near the surface of the oxide particles, the reactivity of the cathode material with liquid electrolyte is reduced and the rate electrochemical performance improved.

As detailed in Example 6, a $Li_{1+x}Ni_{0.5}Mn_{0.25}Co_{0.25}O_{2+x/2}$ can be coated with a thin layer of composition rich in $AlF_3$. This material shows improved cycle life capacity retention on account of a combination of the material being lithium-rich, due to the homogeneous composition and due to the surface composition that is rich in fluorine and not rich in nickel or manganese.

In some of these examples, set forth herein is a positive electrode active material wherein the material is characterized by a tap density of 1-2.5 g/cm³ for a $d_{50}$ particle size distribution from 4 to 30 μm. In some examples, the tap density is 1 g/cm³. In some other examples, the tap density is 1.5 g/cm³. In some examples, the tap density is 2 g/cm³. In certain examples, the tap density is 2.5 g/cm³. In some examples, the lithium rich nickel oxides set forth herein have a tap density of ≥1.8 g/cm³. In some examples, the lithium rich nickel oxides set forth herein have a tap density of ≥2.0 g/cm³.

Tap density can be controlled by modifying the concentration of the metal precursors during synthesis, the use or absence of chelating agents during synthesis, the pH of the solution used to precipitate the hydroxide, the stirring of the solution, the temperature and reaction time of the precursor solution, and the annealing temperature and time.

Tap density is expected to correlate with the cast electrode film density and therefore also the final cell energy density. The more compact the positive electrode active material particle, the more particles can be packed into an electrode film at a fixed or given thickness. Other benefits high tap density include preparing an ideal percolation network with solid-state catholyte or a solid-state cathode having densely packed (roughly) spherical particles of active material with and interpenetrated network of dense and ideally smaller spherical particles of catholyte which would fill the interstitial void between active particles. Other benefits include reducing the number of the active-particle to catholyte-particle contacts necessary in a film to achieve a fully percolating network. Other benefits include improving the density of films, the coulombic efficiency, and, or, the efficiency, capacity, and cycle life, at higher rate, of the materials set forth herein.

A. Particle Size

In some examples, the LR-NMCs set forth herein are characterized by a particle size in the range of about 3 μm to about 60 μm. In some examples, the $d_{50}$ particle size is in the range of about 4 to 30 μm. These particles may include smaller aggregated crystalline domains (i.e., grains) that may be characterized by a grain size of about 5 nm to about 500 nm.

In some examples, the LR-NMCs set forth herein are characterized by a particle size in the range of about 5 μm to about 20 μm. In some other examples, the LR-NMCs set forth herein are characterized by a particle size in the range of about 10 μm to about 20 μm. In some other examples, the LR-NMCs set forth herein are characterized by a particle size in the range of about 15 μm to about 20 μm. In some examples, the LR-NMCs set forth herein are characterized by a particle size in the range of about 5 μm to about 15 μm. In some other examples, the LR-NMCs set forth herein are characterized by a particle size in the range of about 10 μm to about 15 μm.

In the above particle size recitations, set forth herein are also materials having a tap density of ≥2.0 g/cm³.

In some other examples, the LR-NMCs set forth herein are characterized by a particle size of about 1 μm. In some examples, the LR-NMCs set forth herein are characterized by a particle size of about 2 μm. In certain examples, the LR-NMCs set forth herein are characterized by a particle size of about 3 μm. In other examples, the LR-NMCs set forth herein are characterized by a particle size of about 4 μm. In yet other examples, the LR-NMCs set forth herein are characterized by a particle size of about 5 μm. In some other examples, the LR-NMCs set forth herein are characterized by a particle size of about 6 μm. In some examples, the LR-NMCs set forth herein are characterized by a particle size of about 7 μm. In certain examples, the LR-NMCs set forth herein are characterized by a particle size of about 8 μm. In other examples, the LR-NMCs set forth herein are characterized by a particle size of about 9 μm. In yet other examples, the LR-NMCs set forth herein are characterized by a particle size of about 10 μm. In some other examples, the LR-NMCs set forth herein are characterized by a particle size of about 1 μm. In some examples, the LR-NMCs set forth herein are characterized by a particle size of about 2 μm. In certain examples, the LR-NMCs set forth herein are characterized by a particle size of about 3 μm. In other examples, the LR-NMCs set forth herein are characterized by a particle size of about 4 μm. In yet other examples, the LR-NMCs set forth herein are characterized by a particle size of about 5 μm. In some other examples, the LR-NMCs set forth herein are characterized by a particle size of about 6 μm. In some examples, the LR-NMCs set forth herein are characterized by a particle size of about 7 μm. In certain examples, the LR-NMCs set forth herein are characterized by a particle size of about 8 μm. In other examples, the LR-NMCs set forth herein are characterized by a particle size of about 9 μm. In yet other examples, the LR-NMCs set forth herein are characterized by a particle size of about 10 μm. In some other examples, the LR-NMCs set forth herein are characterized by a particle size of about 1 μm. In some examples, the LR-NMCs set forth herein are characterized by a particle size of about 2 μm. In certain examples, the LR-NMCs set forth herein are characterized by a particle size of about 3 μm. In other examples, the LR-NMCs set forth herein are characterized by a particle size of about 4 μm. In yet other examples, the LR-NMCs set forth herein are characterized by a particle size of about 5 μm. In some other examples, the LR-NMCs set forth herein are characterized by a particle size of about 6 μm. In some examples, the LR-NMCs set forth herein are characterized by a particle size of about 7 μm. In certain examples, the LR-NMCs set forth herein are characterized by a particle size of about 8 μm. In other examples, the LR-NMCs set forth herein are characterized by a particle size of about 9 μm. In yet other examples, the LR-NMCs set forth herein are characterized by a particle size of about 10 μm. In some other examples, the LR-NMCs set forth herein are characterized by a particle size of about 11 μm. In some examples, the LR-NMCs set forth herein are characterized by a particle size of about 12 μm. In certain examples, the LR-NMCs set forth herein are characterized by a particle size of about 13 μm. In other examples, the LR-NMCs set forth herein are characterized by a particle size of about 14 μm. In yet other examples, the LR-NMCs set forth herein are characterized by a particle size of about 15 μm. In some other examples, the LR-NMCs set forth herein are characterized by a particle size of about 16 μm. In some examples, the LR-NMCs set forth herein are characterized by a particle size of about 17 μm. In certain examples, the LR-NMCs set forth herein are characterized by a particle size of about 18 μm. In other examples, the LR-NMCs set forth herein are characterized by a particle size of about 19 μm. In yet other examples, the LR-NMCs set forth herein are characterized by a particle size of about 20 μm.

In some of these examples, set forth herein is a positive electrode active material that has particles with grains therein which are nanodimensioned. In some of these examples, the grains have a $d_{50}$ size of about 1 to about 50 nm. In some other of these examples, the grains have a $d_{50}$ size of about 1 to about 40 nm. In some of these examples, the grains have a $d_{50}$ size of about 1 to about 30 nm. In some of these examples, the grains have a $d_{50}$ size of about 1 to about 25 nm. In some other of these examples, the grains have a $d_{50}$ size of about 1 to about 20 nm. In some of these examples, the grains have a $d_{50}$ size of about 1 to about 15 nm. In some of these examples, the grains have a $d_{50}$ size of about 1 to about 10 nm. In some other of these examples, the grains have a $d_{50}$ size of about 1 to about 5 nm. In some of these examples, the grains have a $d_{50}$ size of about 1 to about 2 nm. In some of these examples, the grains have a $d_{50}$ size of about 5 to about 50 nm. In some other of these examples, the grains have a $d_{50}$ size of about 5 to about 40 nm. In some of these examples, the grains have a $d_{50}$ size of about 5 to about 30 nm. In some of these examples, the grains have a $d_{50}$ size of about 5 to about 25 nm. In some other of these examples, the grains have a $d_{50}$ size of about 5 to about 20 nm. In some of these examples, the grains have a $d_{50}$ size of about 5 to about 15 nm. In some of these examples, the grains have a $d_{50}$ size of about 5 to about 10 nm. In some other of these examples, the grains have a $d_{50}$ size of about 2 to about 5 nm. In some of these examples, the grains have a $d_{50}$ size of about 1 to about 2 nm.

In some examples, the LR-NMC materials are sintered in order to increase the particle size.

In some examples, the LR-NMC materials set forth herein are combined with a catholyte in a positive electrode film. In some examples, nanocomposites which include a mixed electron ion conductor (MEIC) and an LR-NMC material are formulated and subsequently mixed with a catholyte. Suitable catholytes and MEIC are set forth above and below, each example of which may be formulated with the LR-NMC materials set forth herein.

In some embodiments, the size ratio of the catholyte (e.g., LATS) to the composite (e.g., including LR-NMC) is 0.76 for $D_{10}/D_{90}$, or 2.5 for $D_{50}/D_{90}$, or 5.5 for $D_{90}/D_{90}$, or 17.5 for $D_{50}/D_{50}$. In some embodiments, the size ratio of the composite (e.g., including LR-NMC) to the catholyte (e.g., LATS) is 0.76 for $D_{10}/D_{90}$, or 2.5 for $D_{50}/D_{90}$, or 5.5 for $D_{90}/D_{90}$, or 17.5 for $D_{50}/D_{50}$. In some embodiments, the size ratio of the catholyte (e.g., LATS) to the composite (e.g., including LR-NMC) is 0.55 for $D_{10}/D_{90}$, or 2.0 for $D_{50}/D_{90}$, or 5.0 for $D_{90}/D_{90}$, or 16 for $D_{50}/D_{50}$. In some embodiments, the size ratio of the composite (e.g., including LR-NMC) to the catholyte (e.g., LATS) is 0.55 for $D_{10}/D_{90}$, or 2.0 for $D_{50}/D_{90}$, or 5.0 for $D_{90}/D_{90}$, or 16 for $D_{50}/D_{50}$. In some embodiments, the size ratio of the catholyte (e.g., LATS) to the composite (e.g., including LR-NMC) is 0.8 for $D_{10}/D_{90}$, or 3 for $D_{50}/D_{90}$, or 6 for $D_{90}/D_{90}$, or 18 for $D_{50}/D_{50}$. In some embodiments, the size ratio of the composite (e.g., including LR-NMC) to the catholyte (e.g., LATS) is 0.8 for $D_{10}/D_{90}$, or 3 for $D_{50}/D_{90}$, or 6 for $D_{90}/D_{90}$, or 18 for $D_{50}/D_{50}$.

B. Lithium Dispersion

In some examples, the lithium in the lithium rich nickel, manganese cobalt oxide occupies Ni, Mn, and, or Co crystal lattice positions. In some examples, the lithium in the lithium rich nickel, manganese cobalt oxide occupies interstitial positions in a Ni, Mn, and, or Co crystal. In some examples, the lithium in the lithium rich nickel, manganese cobalt oxide occupies vacant sites in an amorphous phases.

In some examples, the Li and Ni in $Li_{1+x}MO_2$ are ordered. In some other examples, the Li and Ni in $Li_{1+x}MO_2$ are disordered.

In some examples, the Li and Ni in $Li_{1+x}Ni_{yw}Mn_zCo_zO_{2+(x/2)}$ are ordered. In some other examples, the Li and Ni in $Li_{1+x}Ni_yMn_zCo_zO_{2+(x/2)}$ are disordered.

C. Liquid Cells

In some embodiments, set forth herein is a secondary battery formulated as a liquid cell. In some of these liquid cell examples, the positive electrode active materials set forth herein are useful for high power applications. In these liquid cells, a liquid electrolyte comprising a solvent (e.g., ethylcarbonate (EC), propylcarbonate (PC), dimethylcarbonate (DMC), diethylcarbonate (DEC), ethylmethylcarbonate (EMC)) and a dissolved lithium salt (e.g., $LiPF_6$, $LiClO_4$, Li-bis(oxalate)borate) is positioned in contact with both the positive and negative electrodes through a porous, but electronically insulating polyolefin separator (e.g. biaxially stretched, non-woven polyethylene film).

D. Solid State Cells

Generally, as the unit cell volume deceases as more Li inserts into the lithium rich nickel, manganese, cobalt oxide crystal lattice, the energy density of the oxide increases. Also, as the unit cell volume deceases as more Li inserts into the lithium rich nickel, manganese, cobalt oxide crystal lattice, the oxide's electronic conductivity increases because of improved metal orbital overlap.

In some examples, the oxides described herein are formulated with an internal void volume ≤10 vol %. In these examples, the microporosity between primary crystallites is reduced. In some of these examples, the microporosity is characterized by roughly spherical aggregates.

In some of the above examples, the aggregate particle size have a $d_{50}$ particle size of $4 \leq d_{50} \leq 35$ μm. In some of the above examples, the aggregate particle size has a range characterized by $(d_{90}-d_{10})/d_{50} \leq 10$ In some of the above examples, the primary particle (single crystal domains) diameter for the oxides described herein is between 50 and 500 nm. In some examples, this size is determined based on SEM. In some examples, these particles are as substantially shown in FIG. 7 and FIG. 8.

In some of the above examples, the primary particle morphology elongated has a high aspect ratio of >1.5 (longest dimension: shortest dimension)

In some of the above examples, and at full charge the theoretical capacity of ~273 mAh/g would be expected if all the lithium occupying the space between the predominantly transition-metal oxide layers has been removed. In the lithium-rich compositions the lithium occupying transition metal sites is not assumed to be completely removed during every charge.

Without being bound to a particular theory, it is known in the relevant field to which the instant disclosure pertains that the lithium ionic radius (measured in compounds where lithium is octahedral geometry), is about 0.7-0.8 angstrom smaller compared to nickel (measured where nickel is divalent and also in octahedral geometry). As such, as more lithium inserts into a LR-NMC, the unit cell deceases. This decreased unit cell volume is, in part, related to the improved discharge energy at higher C-rates (higher discharge currents) in part because of the decreased distance between adjacent transition metal lattice sites, which improves the molecular orbital overlap which influences the electronic conductivity. As such, many of the beneficial properties noted herein are related to the high nickel content of the LR-NMC materials, the rich lithium content, the homogenous nature of the LR-NMC, and, or, the homogenous nature of the metal oxide lattice therein. Also, many of the beneficial properties noted herein are related, in part, to the metal lattice positions which are occupied by lithium which enables the improved rate performance and energy density at discharge currents such as C/1 or higher.

E. Combinations with Other Conversion Chemistry Materials

In some examples, set forth herein are combinations of lithium rich nickel, manganese, cobalt oxides with other conversion chemistry positive active materials. In some examples, set forth herein is a positive electrode active material that includes at least one member selected from the group consisting of LiF, Fe, Cu, Ni, $FeF_2$, $FeO_dF_{3-2d}$, $FeF_3$, $CoF_3$, $CoF_2$, $CuF_2$, and $NiF_2$, where $0 \leq d \leq 0.5$, and also includes at least one member selected from a material characterized by the following formula: $Li_{1+x}Ni_yMn_zCo_zO_{2+(x/2)}$, wherein $0 \leq x \leq 0.25$, $0.5 \leq y \leq 0.8$, $0.1 \leq z \leq 0.25$. In some examples, the positive electrode includes a material characterized by $Li_{1+x}Ni_yMn_zCo_zO_{2+(x/2)}$ and a material characterized by LiF and Fe. In some examples, the positive electrode includes a material characterized by $Li_{1+x}Ni_yMn_zCo_zO_{2+(x/2)}$ and a material characterized by LiF and Co. In some examples, the positive electrode includes a material characterized by $Li_{1+x}Ni_yMn_zCo_zO_{2+(x/2)}$ and a material characterized by LiF and Ni. In some examples, the positive electrode includes a material characterized by $Li_{1+x}Ni_yMn_zCo_zO_{2+(x/2)}$ and a material characterized by LiF and Cu. In some examples, the positive electrode includes a material characterized by $Li_{1+x}Ni_yMn_zCo_zO_{2+(x/2)}$ and a material characterized by LiF and $FeF_2$. In some examples, the positive electrode includes a material characterized by $Li_{1+x}Ni_yMn_zCo_zO_{2+(x/2)}$ and a material characterized by $FeF_2$. In some examples, the positive electrode includes a material characterized by $Li_{1+x}Ni_yMn_zCo_zO_{2+(x/2)}$ and a material characterized by $FeO_dF_{3-2d}$, where $0 \leq d \leq 0.5$. In some examples, the positive electrode includes a material characterized by $Li_{1+x}Ni_yMn_zCo_zO_{2+(x/2)}$ and a material characterized by $FeF_3$. In some examples, the positive electrode includes a material characterized by $Li_{1+x}Ni_yMn_zCo_zO_{2+(x/2)}$ and a material characterized by $CoF_3$. In some examples, the positive electrode includes a material characterized by $Li_{1+x}Ni_yMn_zCo_zO_{2+(x/2)}$ and a material characterized by $CoF_2$. In some examples, the positive electrode includes a material characterized by $Li_{1+x}Ni_yMn_zCo_zO_{2+(x/2)}$ and a material characterized by $CuF_2$. In some examples, the positive electrode includes a material characterized by $Li_{1+x}Ni_yMn_zCo_zO_{2+(x/2)}$ and a material characterized by $NiF_2$.

III. LR-NMC WITH MEIC

In some examples, set forth herein are combinations of mixed electron ionic conductors (MEIC) with the LR-NMCs materials. In some examples, the weight ratio of the LR-NMC to the MEIC is 10:1. In some examples, the weight ratio of the LR-NMC to the MEIC is 9:1. In some examples, the weight ratio of the LR-NMC to the MEIC is 8:1. In some examples, the weight ratio of the LR-NMC to the MEIC is 7:1. In some examples, the weight ratio of the LR-NMC to the MEIC is 6:1. In some examples, the weight ratio of the LR-NMC to the MEIC is 5:1. In some examples, the weight ratio of the LR-NMC to the MEIC is 4:1. In some examples, the weight ratio of the LR-NMC to the MEIC is 3:1. In some examples, the weight ratio of the LR-NMC to the MEIC is 2:1. In some examples, the weight ratio of the LR-NMC to the MEIC is 1:1.

As set forth herein and above, LR-NMC includes a material characterized by $Li_{1+x}Ni_yMn_zCo_zO_{2+(x/2)}$, wherein $0 \leq x \leq 0.25$, $0.5 \leq y \leq 0.8$, $0.1 \leq z \leq 0.25$, and $x+y+2z=1$.

In some examples, set forth herein is a Li-secondary battery positive electrode film including composite particles that include a LR-NMC material and also a MEIC. In some examples, the composite particles include a mixed electronic ionic conductor (MEIC), a LR-NMC material and optionally a metal fluoride (MF), and optionally an electrically conductive additive including carbon. In some embodiments, the composite particles include a metal fluoride (MF) and electrically conductive carbon. The film further includes a catholyte and a binder, wherein the catholyte and binder contact the composite particles surfaces but are not contained therein. The weight ratio of MEIC to LR-NMC in the composite particles is about 1:99 to 25:75 w/w. In some embodiments, the weight ratio of MEIC to LR-NMC in the composite particles is about 5:90 to 20:80. In some embodiments, the particle size of the composite particle is 0.5 μm to 10 μm at its maximum characteristic length. In some embodiments, the composite particle is 0.5 μm to 10 μm and the film thickness is from 1 μm to 120 μm or from 30 μm to 90 μm.

IV. LR-NMC with Surface Coating

In some examples, set forth herein is a LR-NMC having a surface coating thereupon. In some examples, the coating improves electronic or ionic conductivity. In some examples, the coating improves low voltage stability. In yet other examples, the coating improves chemical compatibility with catholytes and electrolytes which contact the LR-NMC.

In some embodiments, the coating includes a phosphate coating. In some of these examples, the phosphate coating is present in an amount less than 1% w/w. In certain embodiments, when a phosphate is present, the phosphate is a coating on the LR-NMC. In certain of these embodiments, the phosphate coating is in an amount that is less than 1% w/w.

In some embodiments, the coating is a lithium aluminum oxide.

In some embodiments, the coating is a lithium fluoride.

In some embodiments, the coating aluminum phosphate.

In some embodiments, the coating Lithium zirconate

In some embodiments, the LR-NMC have an oxide coating on the surface as a result of a milling process.

In some examples, the coating is deposited onto the LR-NMC by bath coating. In other examples, the coating is deposited onto the LR-NMC by spray coating. In yet other examples, the coating is deposited onto the LR-NMC by atomic layer deposition (ALD).

In some examples, other coatings are deposited onto the LR-NMC. For example, a $AlF_3$ coating can be deposited according to the methods set forth in H.-B. Kim, et al, *Journal of Power Sources* 179 (2008) 347-350.

In some examples, surface coatings can be deposited by synthesizing an inorganic coating on the LR-NMC cathode particles to improve the particle's chemical compatibility with other components, the stability over a large voltage window, and certain conductivity properties.

In some examples, the LR-NMC is transferred to a media bottle and homogenized in a solvent homogenizer at about 10,000 RPM for about 10-30 seconds. In one example, the solvent is isopropanol. LR-NMC is then coated using a spray dryer with flowing Argon while agitating the LR-NMC. The inorganic coating spray dried onto the LR-NMC includes, in some examples, isopropanol, LR-NMC, $LiNO_3$, $Al(NO_3)_3 \cdot 9H_2O$, $H_3PO_4$. The spray coated LR-NMC is placed in an oven to evaporate the water, $HNO_3$, and isopropanol. The product includes LR-NMC coated with a lithium aluminum phosphate characterized by the chemical formula $LiAl(PO_4)_{1.33}$. In some instances, this chemical formula is represented in a simplified manner as $LiAl(PO_4)$. In this example, the $LiAl(PO_4)$ is a thin coating (i.e., shell) surrounding the LR-NMC.

V. Devices

In some examples, the lithium rick nickel, manganese, cobalt oxides, set forth herein, are formulated into positive electrodes. In some examples, the electrodes are films. In some other examples, the electrodes are thin films.

In some examples, the positive electrode films further comprise a solid state catholyte. In some of these examples, the catholyte is intimately mixed with the lithium rich nickel, manganese, cobalt oxides, which are set forth herein. In some of these examples, the catholytes include those materials set forth in PCT/US2014/059575, filed Oct. 7, 2014, and entitled GARNET MATERIALS FOR LI SECONDARY BATTERIES AND METHODS OF MAKING AND USING GARNET MATERIALS, the contents of which are incorporated by reference in their entirety. In some of these examples, the catholytes include those set forth in PCT/US2014/059578 filed Oct. 7, 2014, and entitled GARNET MATERIALS FOR LI SECONDARY BATTERIES AND METHODS OF MAKING AND USING GARNET MATERIALS, the contents of which are incorporated by reference in their entirety. In some examples, the catholytes include those materials set forth in PCT/US14/38283, filed May 15, 2014, and entitled, SOLID STATE CATHOLYTE OR ELECTROLYTES FOR BATTERY USING $Li_4MP_BS_C$ (M=Si, Ge, or Sn), the contents of which are incorporated by reference in their entirety.

In some examples, the positive electrode films set forth herein comprise a lithium rich nickel, manganese, cobalt oxides, which are set forth herein in combination with another positive electrode active material. Other positive electrode active materials which are suitable for these combinations include, but are not limited to, U.S. Patent Application Publication No. 2014/0170493, entitled NANOSTRUCTURED MATERIALS FOR ELECTROCHEMICAL CONVERSION REACTIONS, and filed Jun. 19, 2013 as U.S. patent application Ser. No. 13/922,214, the contents of which are incorporated by reference in their entirety; also in U.S. Provisional Patent Application No. 62/038,059, entitled DOPED CONVERSION MATERIALS FOR SECONDARY BATTERY CATHODES, and filed Aug. 15, 2014, the contents of which are incorporated by reference in their entirety; also in U.S. Provisional Patent Application No. 61/944,502, filed Feb. 25, 2014, entitled HYBRID ELECTRODES WITH BOTH INTERCALATION AND CONVERSION MATERIALS, the contents of which are incorporated by reference in their entirety; also in U.S. Provisional Patent Application No. 62/027,908, filed Jul. 23, 2014, entitled HYBRID ELECTRODES WITH BOTH INTERCALATION AND CONVERSION MATERIALS, the contents of which are incorporated by reference in their entirety.

In some examples, the lithium rich nickel, manganese, cobalt oxides, set forth herein, are formulated into an electrochemical device comprising a positive electrode, a negative electrode, and an electrolyte separator between the positive and negative electrodes.

VI. Methods Of Making

In some examples, set forth herein is a method of making a lithium rich manganese cobalt oxide, including providing an aqueous mixture of a nickel (II) precursor, a manganese (II) precursor, and a cobalt (II) precursor at a specified ratio; optionally warming the mixture; adjusting the pH of the mixture to about 10 or 11; optionally stirring the mixture; precipitating a nickel manganese cobalt hydroxide precipitate; mixing the hydroxide with a lithium salt; annealing the mixture of the hydroxide with the lithium salt, thereby forming a lithium rich manganese cobalt oxide.

In some examples, the specified ratio of Ni:Mn:Co is 2:1:1 or 3:1:1.

In some examples, the method further includes annealing the precipitate at a temperature of at least 200° C.

In some examples, the method further includes annealing the precipitate at a temperature of at least 350° C.

In some examples, the method includes warming and the warming includes heating the mixture to about 40-90° C.

In some examples, the pH is adjusted by adding NaOH. In other examples, the pH is adjusted by adding any suitable base.

In some examples, the precipitating includes spray drying the mixture.

In some examples, the precipitating includes recovering powder from the mixture using filtration.

In some examples, the nickel (II) precursor is substituted for a nickel (III) precursor. In certain examples, the specified ratio of Ni:Mn:Co is 3:1:1, 2:1:1, 1:1:0.5 or 5:2.5:2.5. In some examples, the warming the mixture step includes warming to a temperature of about 30 to 90° C. In some of these examples, the temperature is about 50 to 60° C. In certain examples, the annealing the mixture of the hydroxide with the lithium salt is at a temperature of at least 200° C. In some of these examples, the annealing temperature is a temperature of at least 350° C. In other examples, the annealing temperature is at least 700° C. In yet other examples, the annealing temperature is at least 750° C. In still other examples, the annealing temperature is at least 800° C.

In yet other examples, the annealing the mixture of the hydroxide with the lithium salt includes holding the maximum annealing temperature for at least 1, 4, or 6, hours. In some of these examples, the maximum annealing temperature is achieved by way of a 3 degree C. per minute heating ramp rate. In some of these examples, the annealing temperature refers to the temperature of the mixture.

In certain examples, the pH is adjusted by adding NaOH, LiOH, $Mg(OH)_2$, $NH_4OH$, or combinations thereof.

In some examples, precipitating the hydroxide includes spray drying the mixture.

In some examples, the lithium salt is selected from the group consisting of LiOH, $LiCo_3$, and $LiNO_3$. In some examples, mixing the hydroxide with a lithium salt includes dry mixing, dry milling, solvent milling, or mixing in a mortar and pestle. In some examples, mixing the hydroxide with a lithium salt includes an aqueous suspension of the hydroxide and the lithium salt.

Some of the methods set forth herein include stirring the aqueous suspension until the oxide is precipitated.

Some of the methods set forth herein include spray drying the aqueous suspension.

Some of the methods set forth herein include an aqueous suspension that has as concentration of a 10 w/w % solids.

Some of the methods set forth herein include precipitating the hydroxide further comprises recovering precipitate as a powder using filtration.

Additional methods of making lithium, nickel, manganese, cobalt oxides are found in Journal of Power Source 162 (2006) 1346-1350; also Chem Mater 2009, 21, 1500-1503; also Journal of the Electrochemical Society, 161, (3) A355-A363 (2014)

VII. Examples

A. Example 1—Synthesis of LR-NMC

LR-NMC and LR-NMC-2 were made by the following generalizable synthetic protocol. As used in this example, LR-NMC=$Li_{1+x}Ni_{0.5}Mn_{0.25}Co_{0.25}O_2$, LR-NMC-2=$Li_{1+x}Ni_{0.6}Mn_{0.20}Co_{0.20}O_2$.

Nickel (II) sulfate hexahydrate, manganese (II) sulfate monohydrate, cobalt (II) sulfate heptahydrate were dissolved to make a 100-ml solution with total metal concentration of 2.0M with mole ratio of Ni:Mn:Co=0.5:0.25:0.25 (other ratios included, but where not limited to Ni:Mn:Co=0.6:0.2:0.2; Ni:Mn:Co=0.5:0.5:0.05). Specifically, 26.67 g of nickel sulfate, 8.45 g of manganese sulfate and 14.05 g of cobalt sulfate were added to the required volume of deionized water to make a solution of 100-ml (final volume). The dissolved metal salts were kept under argon to prevent a change of valence. This solution was added slowly to a warm flask containing 170-ml 0.3M $NH_4OH$ solution while simultaneously adding 4M NaOH solution to maintain the solution's pH between 10 and 11. Approximately 100-ml of NaOH were added in total. The solution was stirred continually during the precipitation of the transitional metal hydroxide, $M(II)OH_2$-$xH_2O$ precipitate, and the temperature was controlled between 40° C. and 75° C. In some examples, chelating agents were used to improve the solubility of the metal ions.

The $M(II)OH_2$-$xH_2O$ precipitate, where M=Ni, Mn, Co and X is nominally less than 0.5, was collected by filtration and washed with copious amounts of water then dried under vacuum. The recovered dry powder was then dispersed in 700-ml of 0.375M LiOH solution and then flash dried by spraying an aerosol mist into a stream of 220° C. argon gas and collecting the dry powder by cyclonic separation.

The lithium and transitional metal mixture was annealed at a rate of 3-4° C./min to 350° C. for 2-hours. The product was then heated again by raising the temperature at 3-4° C./min to 800 or 850° C. for an additional four (4) hours. This formed a layered metal oxide phase with is predominantly R3m symmetry by powder XRD analysis. A minor component included $Li_2MnO_3$ but was not prevalent in the XRD pattern.

As noted herein, the instantly claimed materials have higher capacities than commercially available oxide-based active materials. Also, as noted herein, the instantly claimed materials have better rate capability than known NMCs, and the claimed invention also demonstrates beneficial cycle life at, for example, 35° C. and when cycled between 3.0-4.5V.

As noted below, the instantly claimed invention has a Coulombic efficiency which is dependent on particle size distribution. In some examples, the methods included synthesis steps set forth in Dahn, Chem. Mater. 2009, 21, 1500-1503; or Wang, Powder Technology 187 (2008) 124-129; or Glaser, Kinetics of Ammonia Exchange, Vol. 4, No. 2, February 1965.

B. Example 2—Electrochemical Testing of LR-NMC

A 3032 coin cell battery was made using the material synthesized according to Example 1. The cathode was formulated (as standard practice in the lithium ion battery field) with a 90:5:5 composition by weight, where 90 wt % is active material (per example 1), 5 wt % is carbon black (Timcal C65), 5 wt % high-molecular weight PVDF (polyvinyldifluoride resin, Solvay). The material was dispensed as a 40wt % slurry in N-methyl-2-pyrolidone as the solvent, onto a 20 μm aluminum foil. After drying to remove the solvent, the film was punched in either 14-mm or 15-mm diameter disks for assembly into the coin cell stack. Whatman filter paper, GF-D (GE Lifesciences) punched into a 16-mm disk was used to separate the cathode from a 350-um lithium metal foil anode. The electrolyte used in the coin cell battery was 1.0M $LiPF_6$ in ethylene carbonate and ethylmethylcarbonate in a 30:70 mol ratio as solvent (BASF).

The coin cell battery was charged and discharged in a symmetry current ca. 200-400 uA, equivalent to a C/10 ($10^{th}$ of the battery capacity utilized per hour) or ca 2-4 mA, equivalent to 1 C (full battery capacity utilized in one hour) using a multi-channel battery tester (Arbin Scientific), between voltage limits of 2.7 to 4.6V for C/10, and between voltage limits of 2.7 to 4.5V for C/1.

The specific discharge capacity (Wh/kg) observed for these materials at 1 C and C/10 rate are shown in FIG. 1.

LR-NMC was observed to have a specific discharge capacity of 725 Wh/kg and 825 Wh/kg at 1 C and C/10 rate, respectively. These measurements observed under 35° C. conditions. As shown in FIG. 1, LR-NMC and LR-NMC-2 demonstrated better capacities than commercially available nickel cobalt aluminum oxide (NCA) and NMCs (e.g., Umicore Lithium Nickel Cobalt Manganese Oxide; Grade: TH10; Lot #71163). For example, LR-NMC and LR-NMC-2 demonstrated higher capacities than NCA.

The LR-NMC and LR-NMC-2 also demonstrated better rate capabilities than NMC. For example, as shown in FIG. 1, the LR-NMC and LR-NMC-2 had higher capacity at twice the discharge current.

The LR-NMC and LR-NMC-2 also demonstrated higher capacities and better charge-discharge rates than commercially available NCA. See FIG. 2.

The LR-NMC and LR-NMC-2 used in this example did not include a dopant or a surface treatment.

Figure 3:
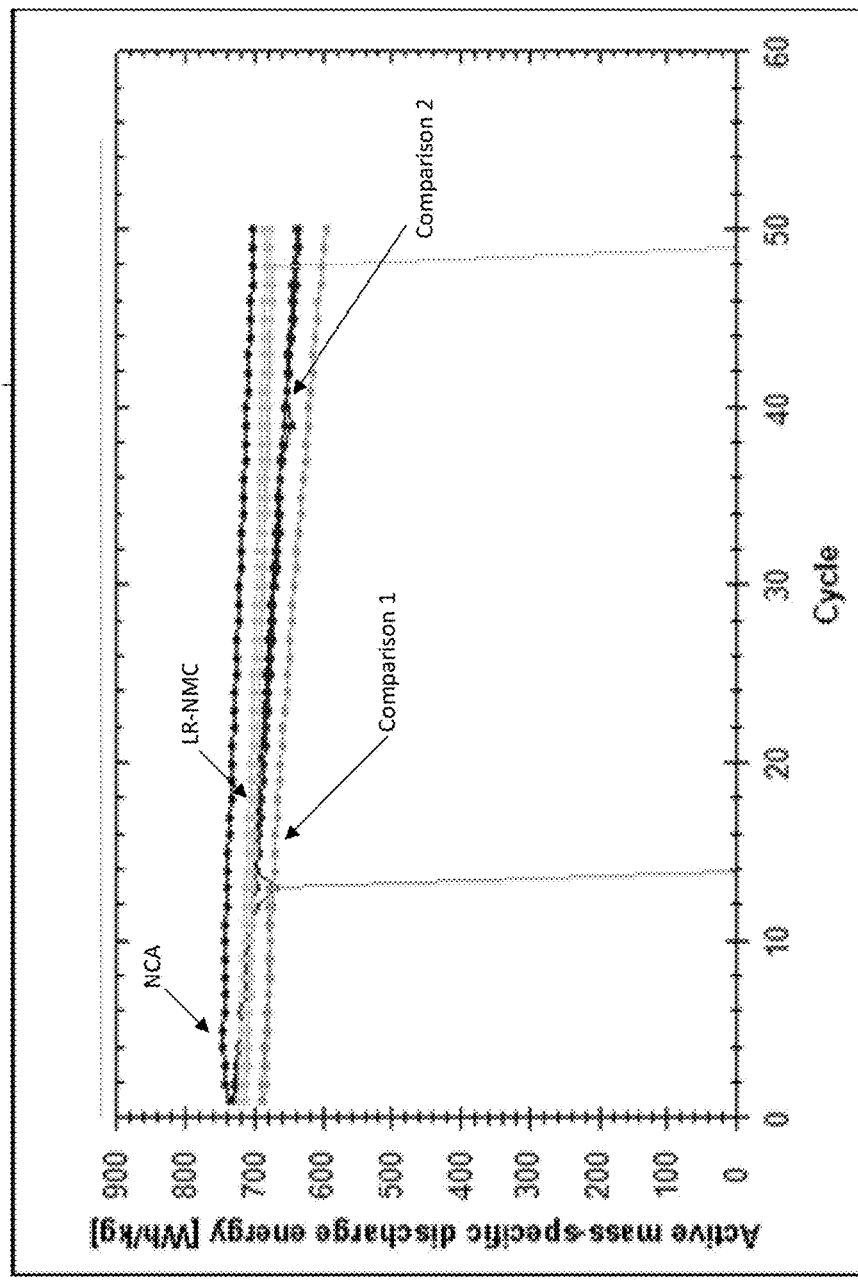
FIG. 3 shows a plot of Active mass-specific discharge energy (Wh/kg) as a function of charge-discharge cycle for LR-NMC ($Li_{1+x}Ni_{0.5}Mn_{0.25}Co_{0.25}O_{2+(x/2)}$), wherein $0 \leq x \leq 0.25$, NCA ($LiNi_{0.8}Co_{0.15}Al_{0.05}O_2$), Comparison 1 ($LiNi_{0.5}Mn_{0.3}Co_{0.2}O_2$), and Comparison 2($LiNi_{0.6}Mn_{0.2}Co_{0.2}O_2$)

As shown in FIG. 3, the LR-NMC of Example 1 has beneficial cycling (cycle life) properties.

C. Example 3—Electrochemical Testing of LR-NMC

As shown in FIG. 3, LR-NMC was tested against NCA-coated, NCA-uncoated, and Comparison 1. LR-NMC demonstrated a high specific energy with comparison to these other materials. The LR-NMC demonstrated a long cycle life. The LR-NMC, unlike Comparison-1 did not show a soft short, which suggests that the Mn in LR-NMC is not dissolving into the electrolyte as is suspected for the Comparison-1 material.

Figure 4:
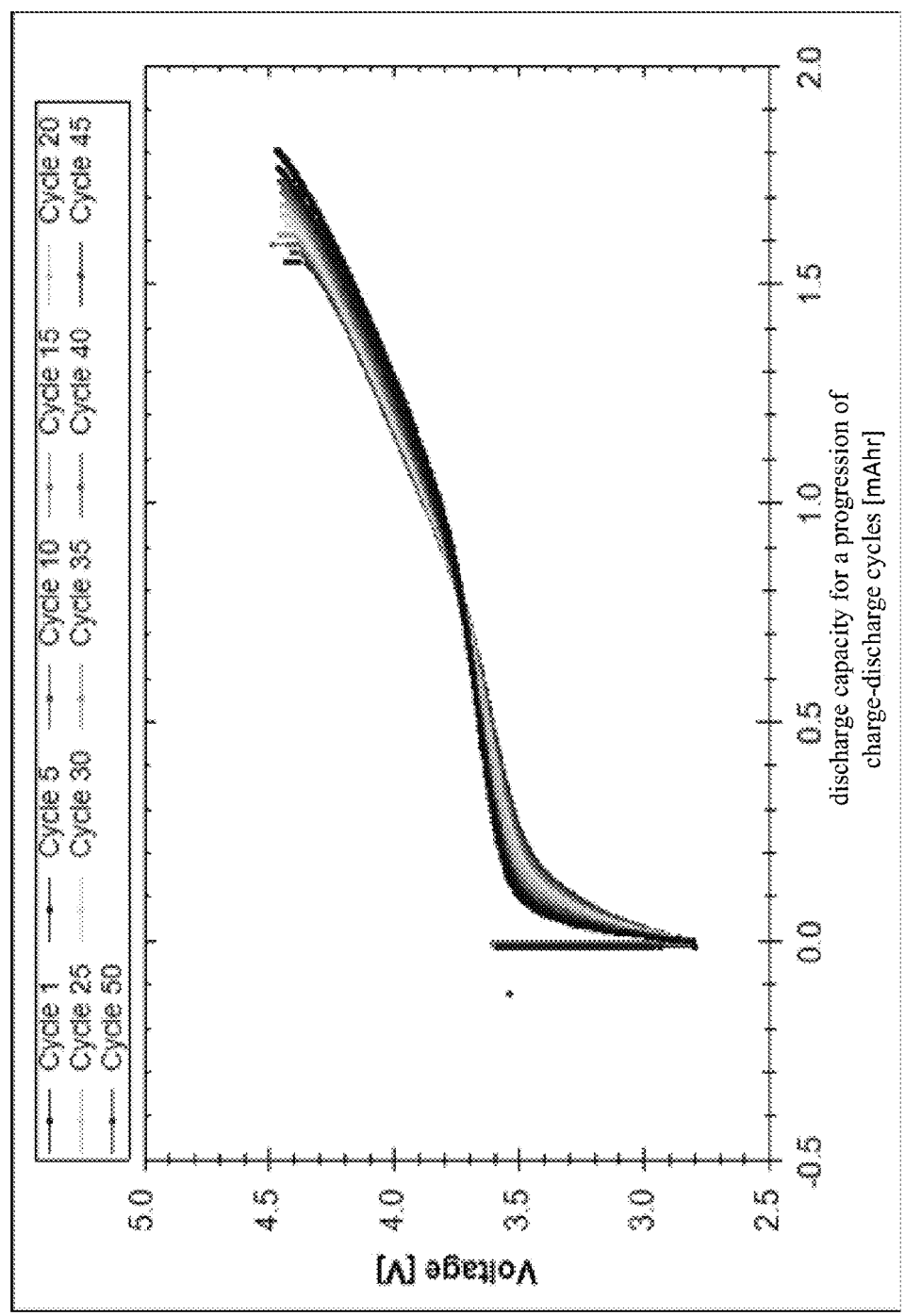
FIG. 4 shows a plot of Voltage (V v. Li-metal) as a function of discharge capacity for a progression of charge-discharge cycles for LR-NMC.

As shown in FIG. 4, no phase change (or voltage fade) was observed for LR-NMC. The impedance which did grow in was less than 25% with respect to state of charge (SOC).

Figure 5:
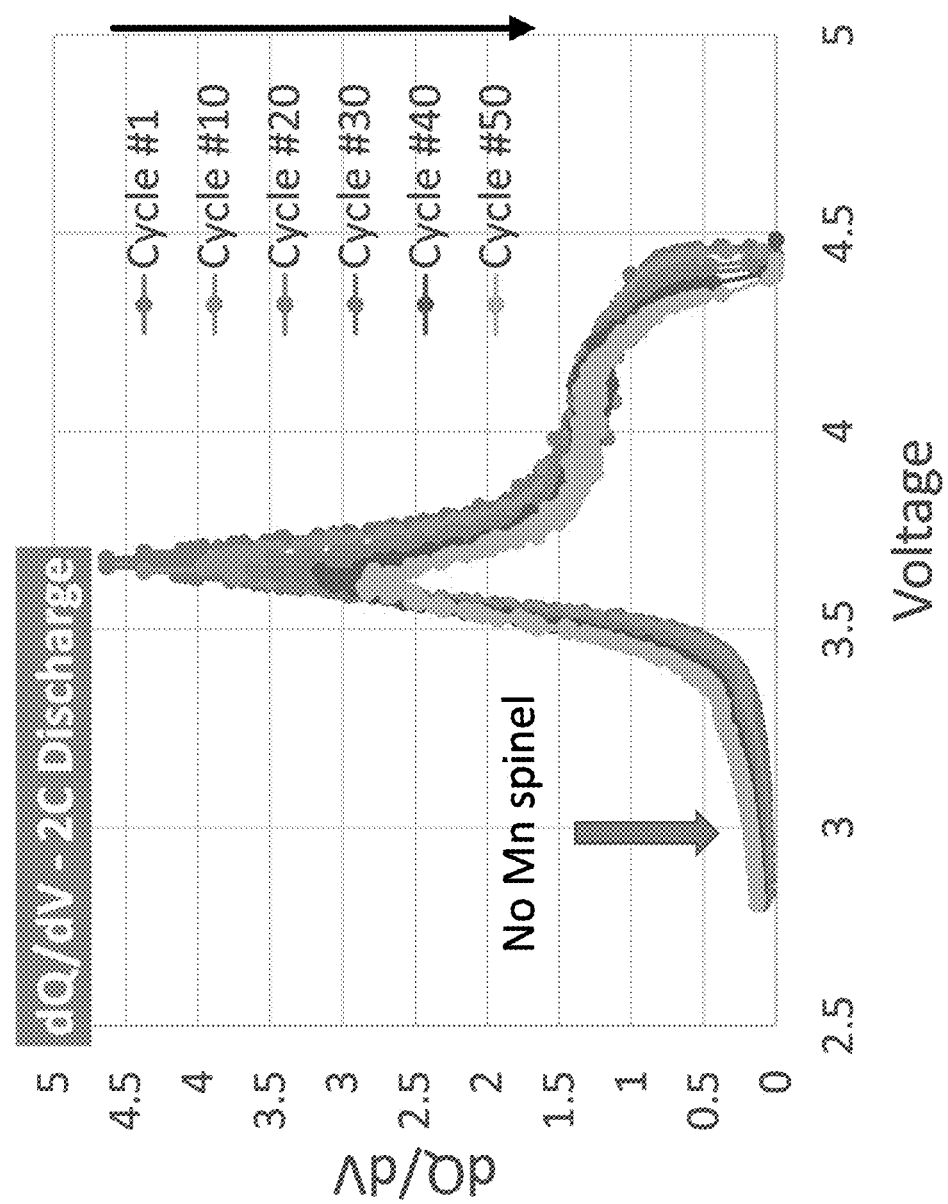
FIG. 5 shows a plot of dQ/dV as a function of Voltage.

As shown in FIG. 5, the LR-NMC was capable of being over-lithiated but without a voltage-fade.

Also as shown in FIG. 5, the LR-NMC retains a high discharge voltage despite a decrease in capacity. This activity suggests that low voltage stable phases (e.g., spinel phases) are not forming during the charge-discharge cycles. As compared to, for example, the materials in Ates, et al., Journal of the Electrochemical Society, 161 (3) A355-A363 (2014), in which the Mn-including spinel phase has a voltage peak at 3V, this low voltage Mn-including spinel is not observed in the instant LR-NMC materials first disclosed herein. With comparison to Ates, et al., Journal of the Electrochemical Society, 161 (3) A355-A363 (2014), the LR-NMC herein has a novel ratio of metals with a higher voltage peak and which does not form a spinel phase when cycled and overlithiated. The crystallinity of the material, as shown in FIGS. 13-14 and 17-18 is more crystalline than that in Ates, et al., *Journal of the Electrochemical Society*, 161 (3) A355-A363 (2014). The LR-NMC herein also is observed to have a higher energy density with comparison to Ates, et al., *Journal of the Electrochemical Society*, 161 (3) A355-A363 (2014).

The class of lithium ion cathode materials called layered-layered oxides, where one phase is primarily $Li_2MnO_3$ (as described above) and a second phase in another layered oxide often comprised of nickel, manganese and/or cobalt, e.g. $Li(Mn_{1/3}Ni_{1/3}Co_{1/3})O_2$ is described in the art. These layered-layered oxides have been demonstrated to achieve very high specific capacities, e.g., 250 mAh/g in certain examples. However, these materials suffer from a lack of structural stability, wherein at least one of the phases is shown to irreversibly change upon electrochemical cycling (in a battery), and usually exhibiting a lower voltage corresponding to the new structural phase. Previous work suggests that the predominantly manganese rich phase (like $Li_2MnO_3$, Cm/2) can transform into a spinel phase (with tetragonal or cubic symmetry), which exhibits up to half of its lithium storage capacity at less than 3V (vs. Li). This decrease in lithium intercalation potential, from ca. 3.9V (as in the materials described herein) to a material with significant storage capacity below 3V, results in cathode material (and/or battery device comprising said material) of lower energy density. As demonstrated in FIG. 5, the differential storage capacity vs. discharge voltage of the test cell has substantially all of the lithium storage capacity for the material claim between 3.5-4.5V. During electrochemical cycling no peak(s) emerge at about 3V, which shows that the LR-NMC herein are stable and don't convert to a Mn-containing spinel structure, as it known to occur for other previously disclosed layered-layered oxide structures, which typically contain higher proportions of manganese.

With comparison to the materials in Ates, et al., *Journal of the Electrochemical Society*, 161 (3) A355-A363 (2014), the Ates, et al. materials have an inferior specific capacity (<200 mAh/g) and have a peak discharge voltage (measured in a dQ/dV vs. V plot) less than 3.5V. This lower average discharge voltage and slower specific discharge capacity reported in Attes et al., is therefore demonstrative of an inferior material when compared to the LR-NMCs first described in the instant disclosure.

The results herein demonstrate that beneficial electrochemical properties are observed with a composition is primarily rich in nickel, as opposed to rich in manganese, and also when the distribution of the lithium, nickel, manganese and cobalt (and further any dopant elements included) within the crystalline two-dimensional crystal lattice are as described above. In contrast to the understanding in the art, the lithium-rich and nickel-rich LR-NMC described herein have improved capacity and stability as compared to commercially available sources. As such, the three-dimensional ordering of the metals is equally important to the chemical composition, e.g., molar ratio of metals, when considered in view of the electrochemical properties described herein. A primarily homogeneous distribution of the metals within the two-dimensional lamellar sheets, wherein at least some of the metal sites are also occupied by lithium, and a primarily exclusive occupancy of the interstitial space between the lamellar layers by lithium is also related to the beneficial results reported in the instant disclosure. Also, the size and the morphology of the primary particles (e.g., crystallite grains) is important and related to the beneficial results reported in the instant disclosure, e.g., energy density at practically useful discharge currents (i.e., C-rates).

Figure 6:
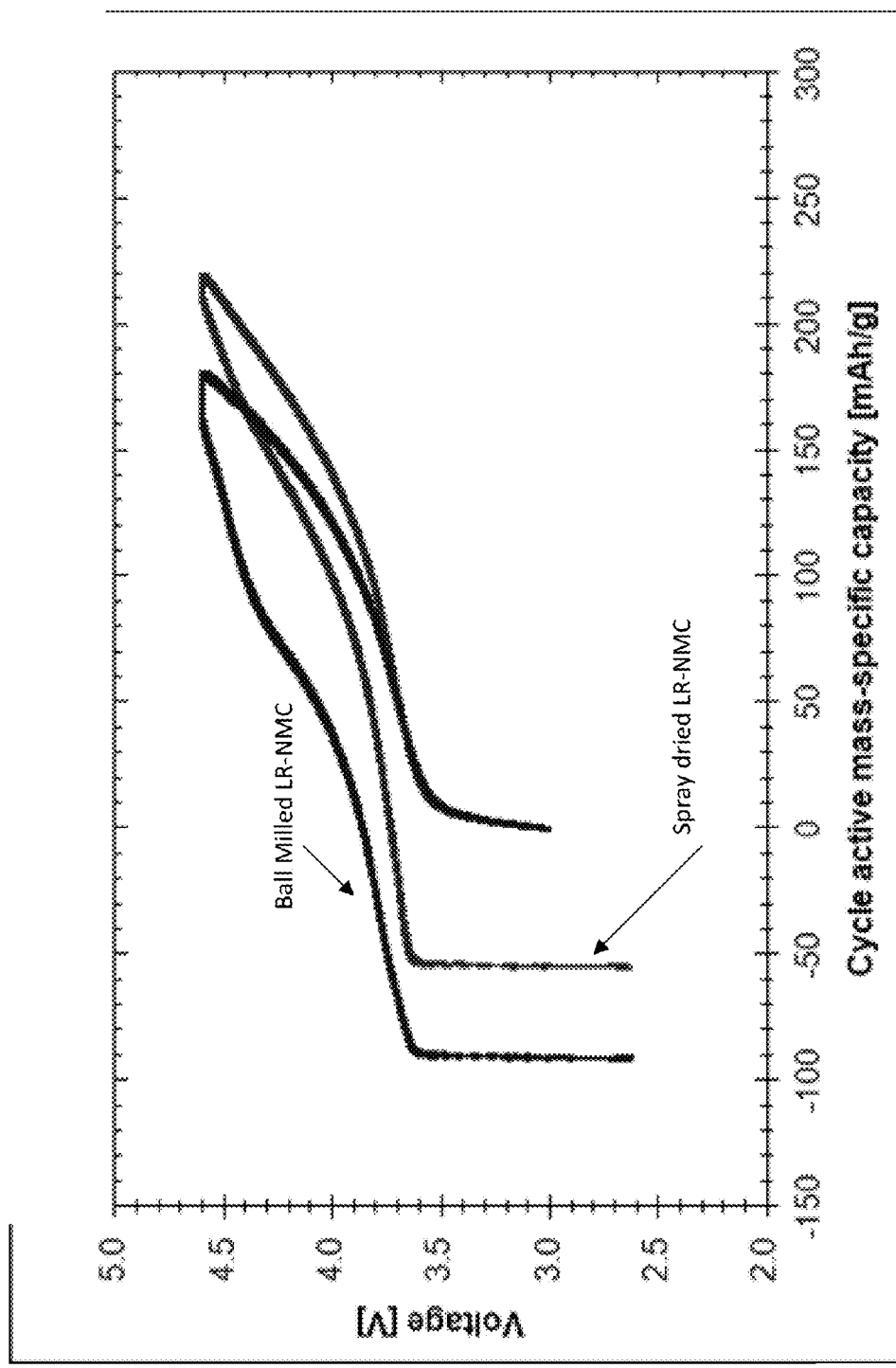
FIG. 6 shows a plot of Voltage as a function of Cycle active mass-specific capacity (mAh/g) for ball-milled LR-NMC and for spray dried LR-NMC.

As shown in FIG. 6, the charge voltage at ~4.4V indicates $Li_2Mn^4O_3$ activation. When the LR-NMC material was spray dried, this region was minimized as compared to when the LR-NMC was ball milled. This indicated that ball-milling results in a two-phase (cubic and hexagonal), whereas the spray drying results in a single phase (hexagonal) which is observed to have a higher reversible discharge capacity.

As shown in FIG. 12, doped LR-NMC show beneficial capacity retention. The material in FIG. 12 was prepared in accordance with example 5 with the addition of Al doping at about 5 mol %. The Al-doped LR-NMC demonstrates slower impedance growth with each cycle.

Figure 2:
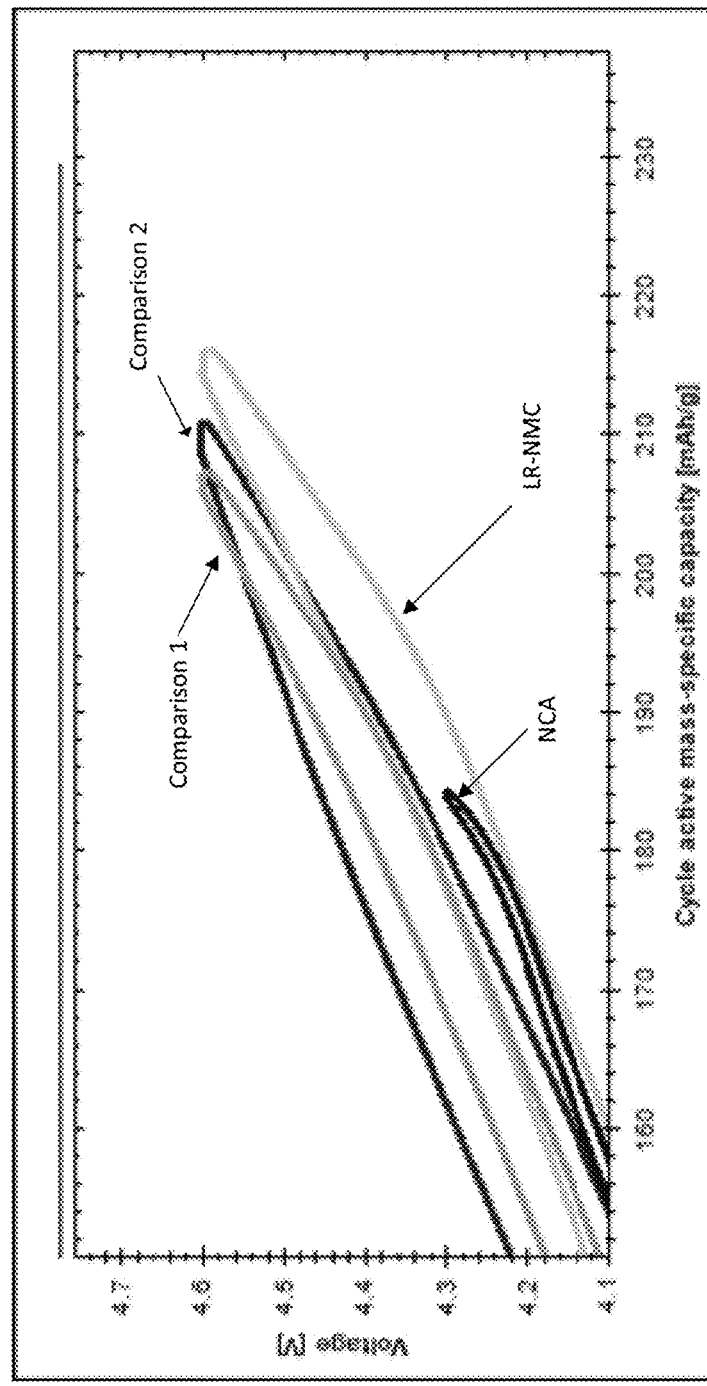
FIG. 2 shows a comparison charge-discharge plots of Voltage v. Li for LR-NMC ($Li_{1+x}Ni_{0.5}Mn_{0.25}Co_{0.25}O_{2+(x/2)}$), wherein $0 \leq x \leq 0.25$, NCA ($LiNi_{0.8}Co_{0.15}Al_{0.05}O_2$), Comparison 1 ($LiNi_{0.5}Mn_{0.3}Co_{0.2}O_2$), and Comparison 2 ($LiNi_{0.6}Mn_{0.2}Co_{0.2}O_2$).

As shown in FIG. 2, FIG. 3, and FIG. 12, for example, the LR-NMCs set forth herein have higher Ni amounts than known NMCs and can be cycled many times over and at high voltages (e.g., 4.5V) without substantially degradation in performance (e.g., not substantially decreasing the Active mass-specific discharge energy in FIG. 12). This electrochemical performance indicates that the LR-NMCs set forth herein are highly stable positive electrode active materials. In these examples, the liquid electrolyte employed was 30% EC (i.e., ethylene carbonate, 5% of which was perfluorinated carbon), 70% DC (i.e., diethylene carbonate) with 1M $LiPF_6$.

D. Example 4—Grain Size Characterization

Figure 7:
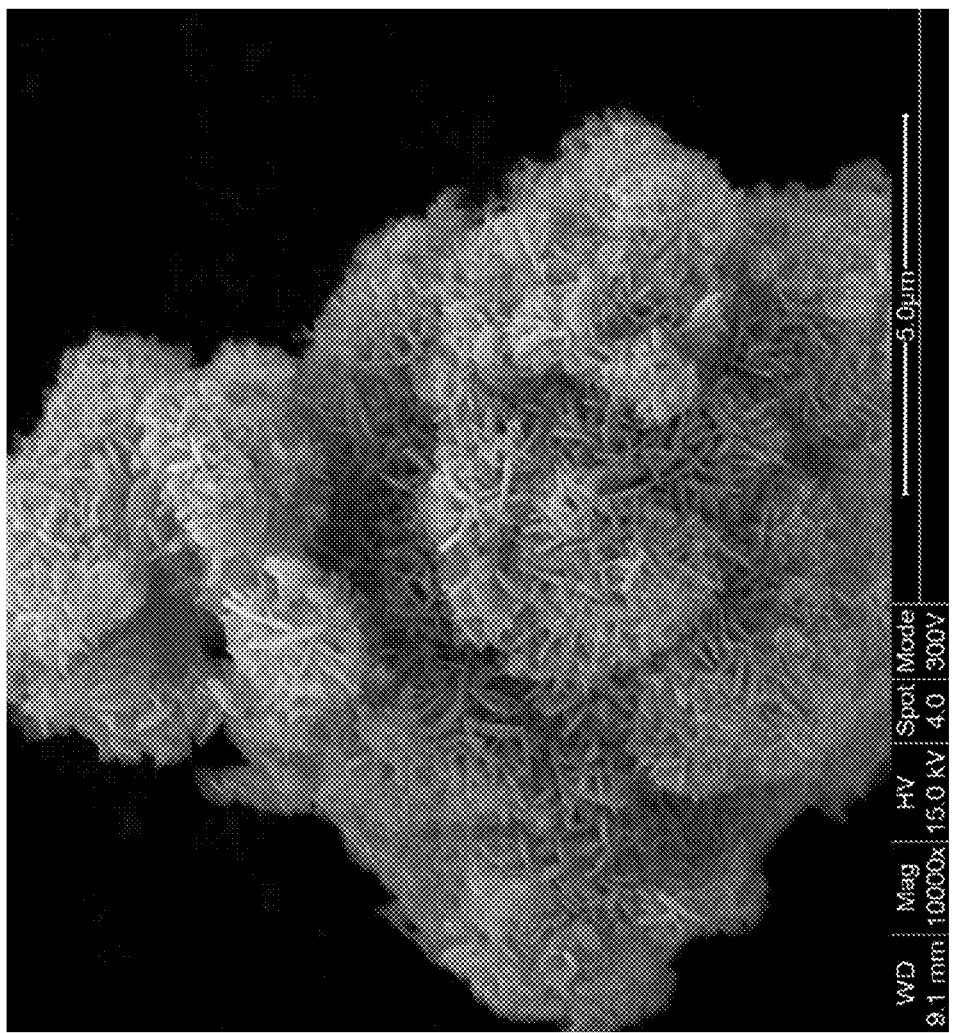
FIG. 7 shows an SEM image of spray dried LR-NMC, which is observed to have a plate structure.
Figure 8:
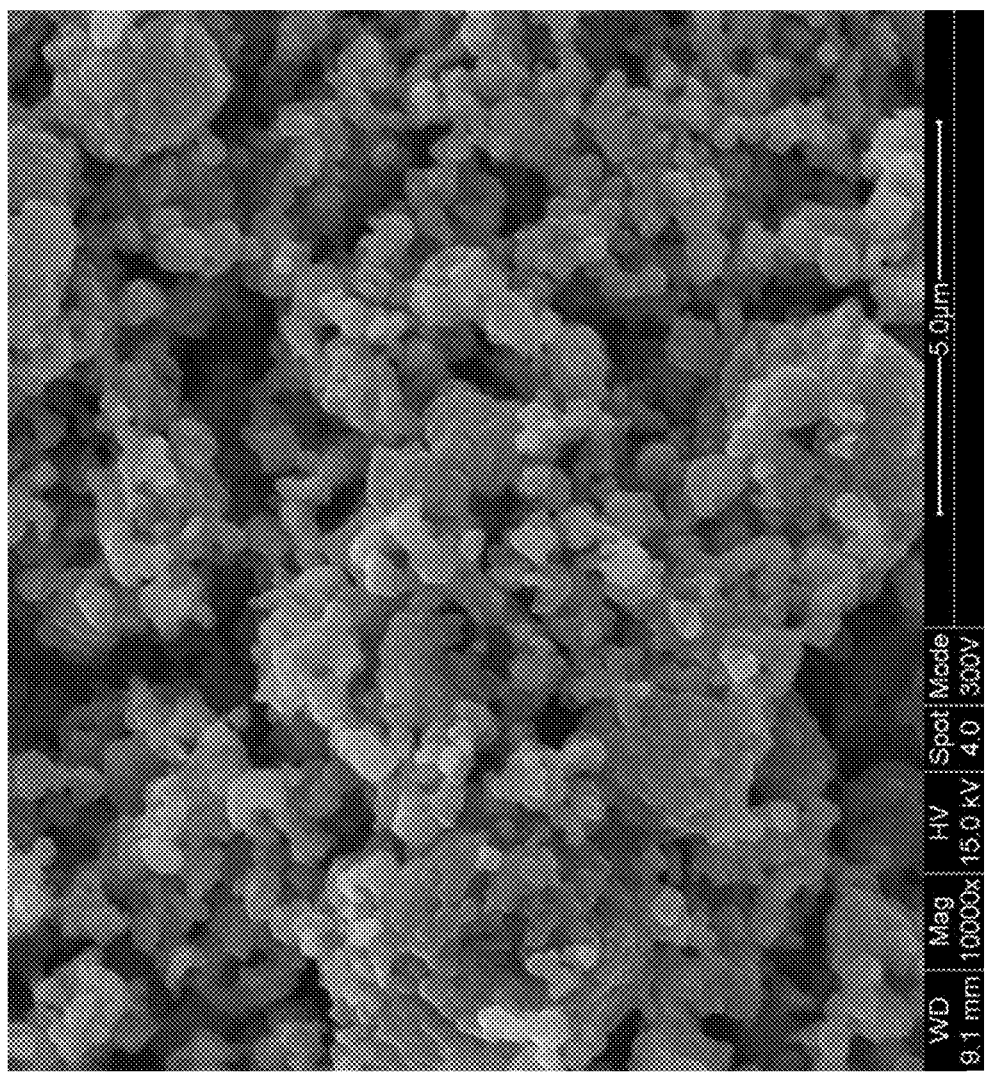
FIG. 8 shows an SEM image of ball-milled LR-NMC.

In this example, the grain size of the LR-NMC was determined by observation of scanning electron microscopy images, such as those in FIG. 7 and FIG. 8. In this example, grain sizes where also determined by analyzing the FWHM of the XRD patterns included herein and using the Scherrer equation.

E. Example 5—Doping NMCs

Doped compositions of LR-NMC and LR-NMC-2 were made by the following generalizable synthetic protocol.

Nickel (II) sulfate hexahydrate, manganese (II) sulfate monohydrate, cobalt (II) sulfate heptahydrate were dissolved to make a 100-ml solution with total metal concentration of 2.0M with mole ratio of Ni:Mn:Co=0.5:0.25:0.25. Dopants such as iron sulfate or iron nitrate (for Fe dopant) were added to this mixture at the desired dopant amount (e.g., 5 mol %). Other dopant precursors included, but were not limited to, manganese sulfate or manganese nitrate $[Mg(NO_3)_2]$, or $[Al(NO_3)_3]$. These dopants precipitated with Ni, Mn, and Co in the hydroxide precursor, likely in transition metal crystallographic lattice positions. Other dopants, noted above, can be added in the aforementioned synthesis step in order to be incorporated into the LR-NMC. Specifically, 26.67 g of nickel sulfate, 8.45 g of manganese sulfate and 14.05 g of cobalt sulfate were added to the required volume of deionized water to make a solution of 100-ml (final volume). The dissolved metal salts were kept under argon to prevent a change of valence. This solution was added slowly to a warm flask containing 170-ml 0.3M NH4OH solution while simultaneously adding 4M NaOH solution to maintain the solution's pH between 10 and 11. Approximately 100-ml of NaOH were added in total. The solution was stirred continually during the precipitation of the transitional metal hydroxide and the temperature was controlled between 40 and 75° C.

The $M(II)OH_2$-$xH_2O$ precipitate, where M=Ni, Mn, Co and X is nominally less than 0.5, was collected by filtration and washed with copious amounts of water then dried under vacuum. The recovered dry powder was then dispersed in 700-ml of 0.375M LiOH solution and then flash dried by spraying an aerosol mist into a stream of 220° C. argon gas and collecting the dry powder by cyclonic separation. In some examples, Mg was mixed with LiOH (as MgSO$_4$) to make a dispersion that was 10% w/w with the transition metal double hydroxide. In some of these examples, the dispersion was spray dried, in which the Mg dopant doped certain Li positions.

The lithium and transitional metal mixture was annealed at a rate of 3-4° C./min to 350° C. for 2-hours. The product was then heated again by raising the temperature at 3-4° C./min to 800 or 850° C. for an additional four (4) hours. This formed a layered metal oxide phase with is predominantly R3m symmetry by powder XRD analysis. A minor component included Li$_2$MnO$_3$ but was not prevalent in the XRD pattern.

As noted herein, the instantly claimed materials have higher capacities than commercially available oxide-based active materials. Also, as noted herein, the instantly claimed materials have better rate capability than known NMCs, and the claimed invention also demonstrates beneficial cycle life at, for example, 35° C. and when cycled between 3.0-4.5V.

As noted herein, the instantly claimed invention has a Coulombic efficiency which is dependent on particle size distribution.

Figure 22:
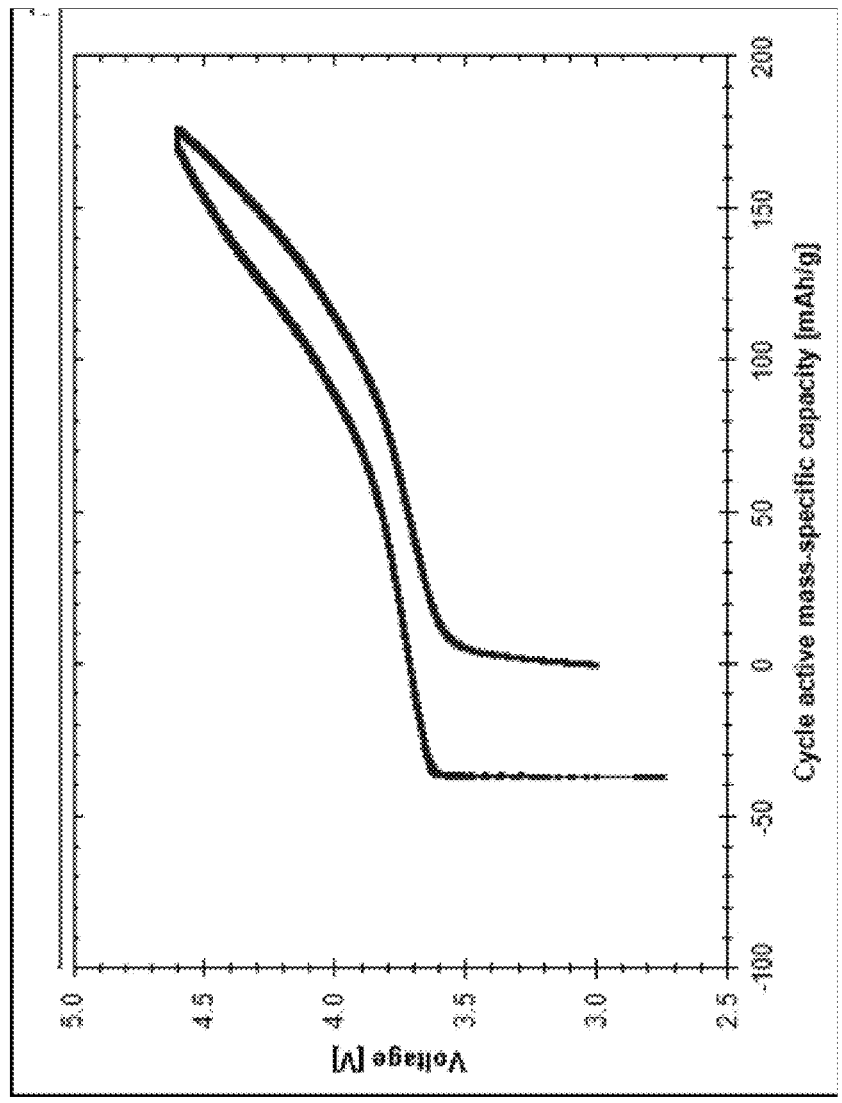
FIG. 22 shows Voltage (V v. Li) v. Cycle Active Mass-specific Capacity [mAh/g] for LR-NMC doped with 2.5 atomic % Al and 2.5 atomic % Fe.
Figure 23:
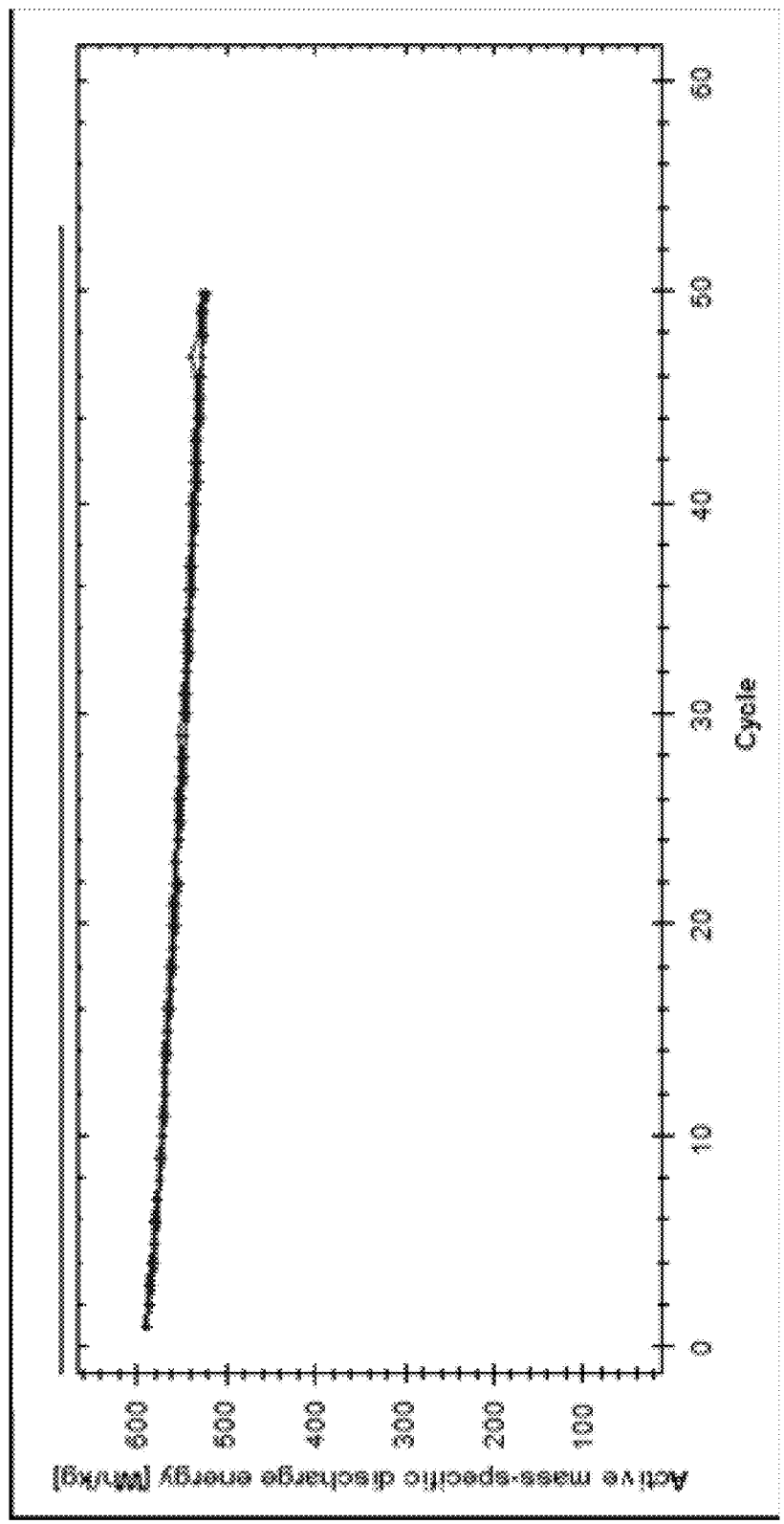
FIG. 23 shows Active mass-specific discharge energy [Wh/kg] for LR-NMC doped with 2.5 atomic % Al and 2.5 atomic % Fe at 1 C and 35° C.
Figure 24:
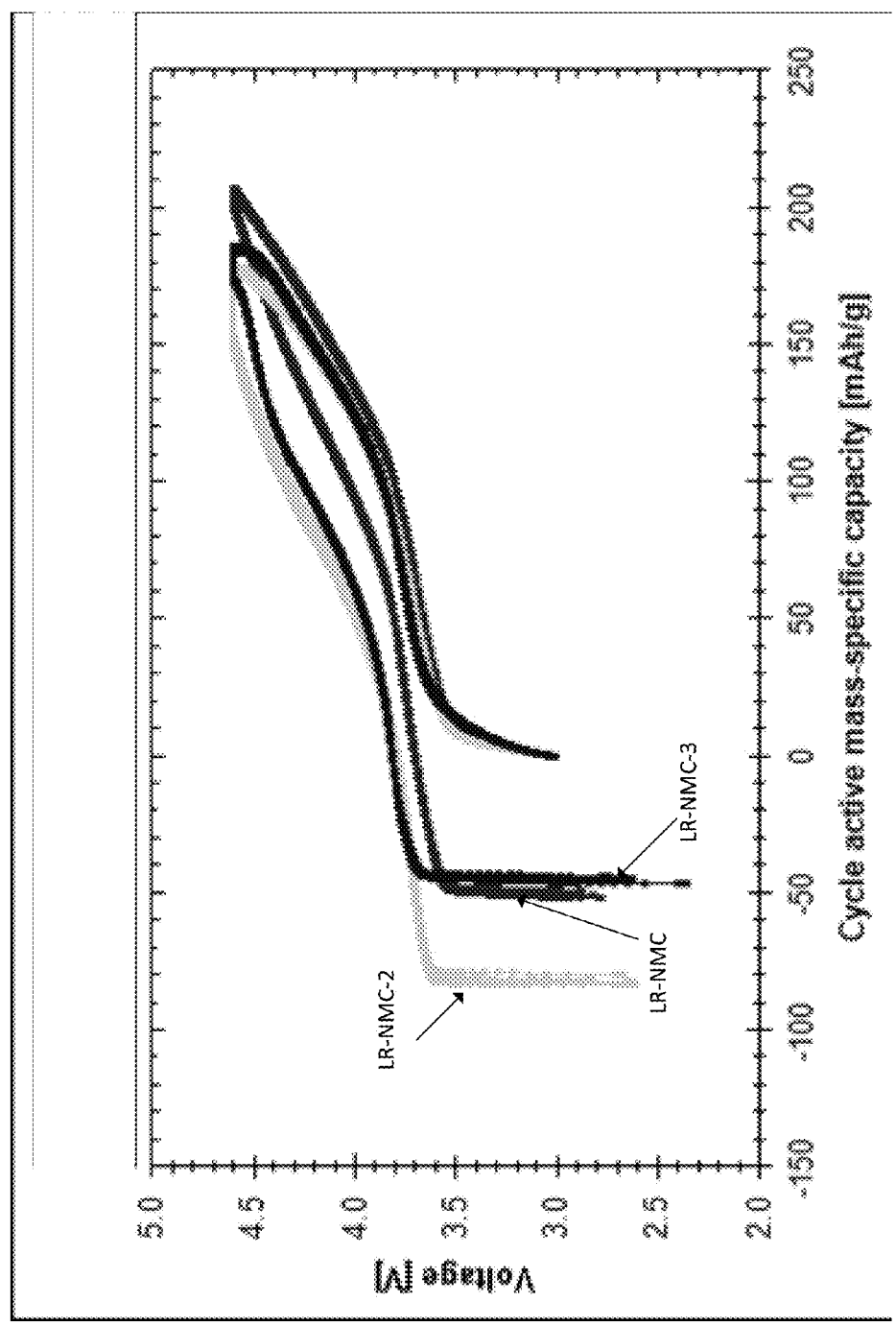
FIG. 24 shows Voltage (V. Li) v. Cycle Active Mass-specific capacity [mAh/g] for LR-NMC ($Li_{1+x}Ni_{0.5}Mn_{0.25}Co_{0.25}O_{2+(x/2)}$), LR-NMC-2=($Li_{1+x}Ni_{0.6}Mn_{0.2}Co_{0.2}O_{2+(x/2)}$), and LR-NMC-3 ($Li_{1+x}Ni_{0.5}Mn_{0.25}Co_{0.25}O_{2+(x/2)}$), all prepared according the synthesis steps set forth in Example 1 using initial Ni:Mn:Co ratios of 0.5:0.5:0.05, 0.6:0.2:0.2, and 0.5:0.5:0.05, respectively.

As shown in FIG. 22, the hysteresis and impedance of the LR-NMC doped with 2.5 atomic % Al and 2.5 atomic % Fe had beneficial electrochemical properties. The Specific capacity of this material is calculated to be about 175 mAh/g. As shown in FIG. 23, this material had beneficial capacity retention.

F. Example 6—Surface Treatment of NMCs

In this example, surface treatments of the LR-NMC is shown. The coatings used in this example included cobalt oxides and also aluminum fluorides. Other coatings can be used as well. Following the synthesis in Examples 1 or 5, after the final annealing step, the Li-NMC is formulated into a liquid dispersion at about 10% w/w with a dissolve salt, such as cobalt nitrate or cobalt sulfate. To make an aluminum fluoride coating, aluminum nitrate and ammonium fluoride can be used in place of the aforementioned cobalt precursors. In one example, ammonium fluoride was used to deposit a fluoride coating on the LR-NMC. The liquid dispersion is then spray dried and then anneal at the aforementioned annealing temperatures. This results in a surface coating on the LR-NMC. In this example, the cobalt oxide improves chemical compatibility and also improves the impedance at grain boundary interfaces. In this example, the annealing occurred below 850° C.

Other coatings are possible, e.g., those set forth in U.S. Pat. No. 7,381,496.

G. Example 7—Neutron Diffraction of LR-NMC

Neutron diffraction analysis of LR-NMC-2 sample from Example 1 was conducted. The empirical formula of the lithium-rich nickel-rich compound was Li$_{1.02}$Ni$_6$Mn$_2$Co$_2$O$_{12}$, as determined by inductively coupled plasma (ICP) chemical analysis. Table 1 below shows the results of this neutron diffraction analysis as Rietveld refinement of the neutron diffraction pattern.

TABLE 1

| Space group: R3m; a = 2.8690(6) Å, c = 15.2021(3) Å | | | |
|---|---|---|---|
| Element | Site | Z-position | Occupancy |
| Li | 3a | 0.0000 | 0.939(2) |
| Li' | 3b | 0.5000 | 0.079(3) |
| Ni | 3b | 0.5000 | 0.608(2) |
| Ni' | 3a | 0.0000 | 0.061(2) |
| Mn | 3b | 0.5000 | 0.156(6) |

TABLE 1-continued

| Space group: R3m; a = 2.8690(6) Å, c = 15.2021(3) Å | | | |
|---|---|---|---|
| Element | Site | Z-position | Occupancy |
| Co | 3b | 0.5000 | 0.156(6) |
| O | 6c | 0.2416 | 0.967(2) |

For the Rietveld refinement, the metal sites, 3a and 3b, were assumed to be completely filled, but the atomic distribution within each site was allowed to vary in the fit. Ni and Li anti-site disorder was unconstrained, but only nickel was allowed to occupy the 3a site (according to accepted convention). Fit error was minimized after 150 iterations by the bootstrap method.

Neutron diffraction analysis of LR-NMC-2 sample from Example 1 was conducted. The empirical formula of the lithium-rich nickel-rich compound was Li$_{1.09}$Ni$_6$Mn$_2$Co$_2$O$_{12}$, as determined by inductively coupled plasma (ICP) chemical analysis. Table 2 below shows the results of this neutron diffraction analysis as Rietveld refinement of the neutron diffraction pattern.

TABLE 2

| Space group: R3m; a = 2.8640(5) c = 14.1945(3) | | | |
|---|---|---|---|
| Element | Site | Z-position | Occupancy |
| Li | 3a | 0.0000 | 0.970(2) |
| Li' | 3b | 0.5000 | 0.107(3) |
| Ni | 3b | 0.5000 | 0.589(2) |
| Ni' | 3a | 0.0000 | 0.030(2) |
| Mn | 3b | 0.5000 | 0.151(8) |
| Co | 3b | 0.5000 | 0.151(8) |
| O | 6c | 0.2411 | 0.919(2) |

For the Rietveld refinement, the metal sites, 3a and 3b, were assumed to be completely filled, but the atomic distribution within each site was allowed to vary in the fit. Ni and Li anti-site disorder was unconstrained, but only nickel was allowed to occupy the 3a site (according to accepted convention). Fit error was minimized after 150 iterations by the bootstrap method.

These neutron diffraction results demonstrate that lithium occupies the Ni lattice sites as the amount of Li increases. Also, these neutron diffraction results demonstrate that oxygen sites become deficient as the amount of Li in the NMC lattice increases. These results show that lithium substitutes into a single R3m lattice. These results show that lithium substitution into the lattice of transition metals leads to the presence of oxygen defects.

H. Example 8—Stem And Eels Analysis

In this example, a commercially available NMC oxide (Umicore Lithium Nickel Cobalt Manganese Oxide; Grade: TH10; Lot #71163) is compared with the the LR-NMC prepared according to Example 1 (LR-NMC-1). The samples were characterized by STEM-EELS using a FEI Tecnai TF300 TEM system and Gatan GIF Quantum SE EELS system. The beam energy was set at 200 KV with convergence angle 8.4 mrad, acceptance angle 19.0 mrad, energy range 200-2200 eV and integration time 0.1 s.

Figure 25:
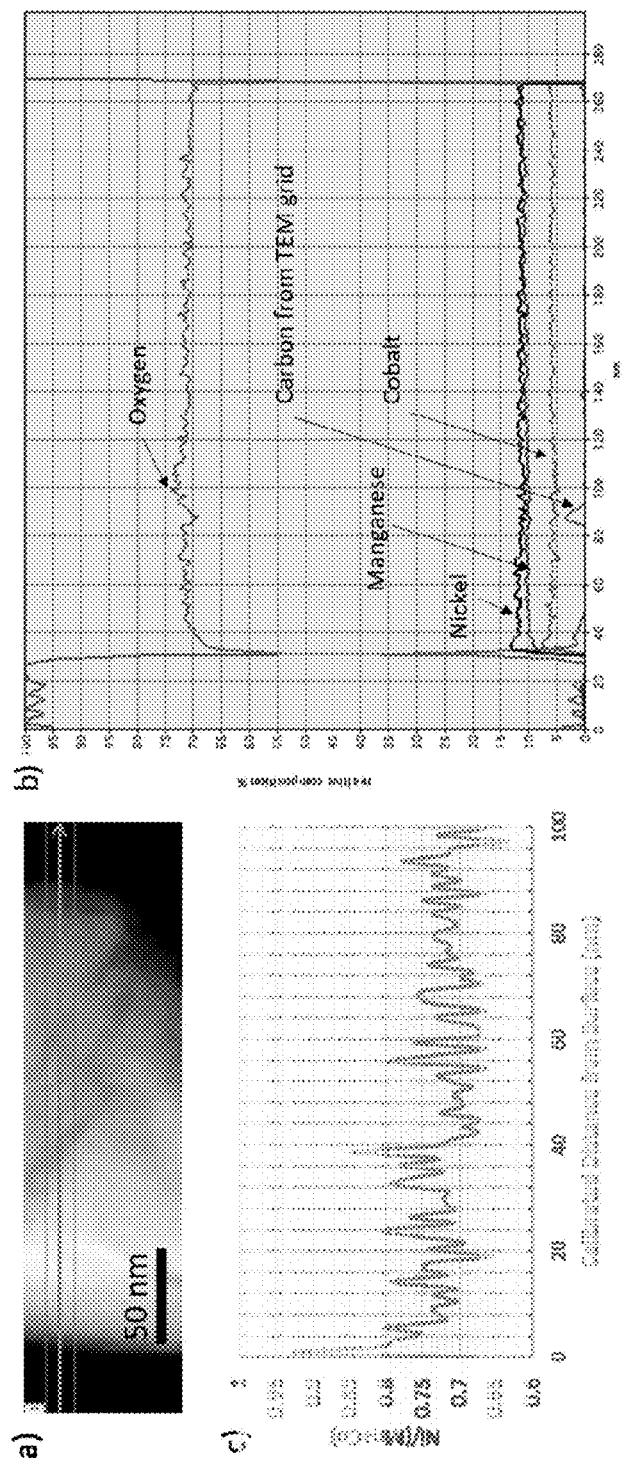
FIG. 25 shows in, section (a), a scanning transmission electron micrograph (STEM) image showing the area and the direction were a corresponding electron energy loss spectrograph (EELS) spectra were collected for a commercially available source of a nickel manganese cobalt oxide positive electrode active material (Umicore Lithium Nickel Cobalt Manganese Oxide; Grade: TH10; Lot #71163, $LiNi_{0.5}Mn_{0.3}Co_{0.2}O_2$). In section (b)
Figure 26:
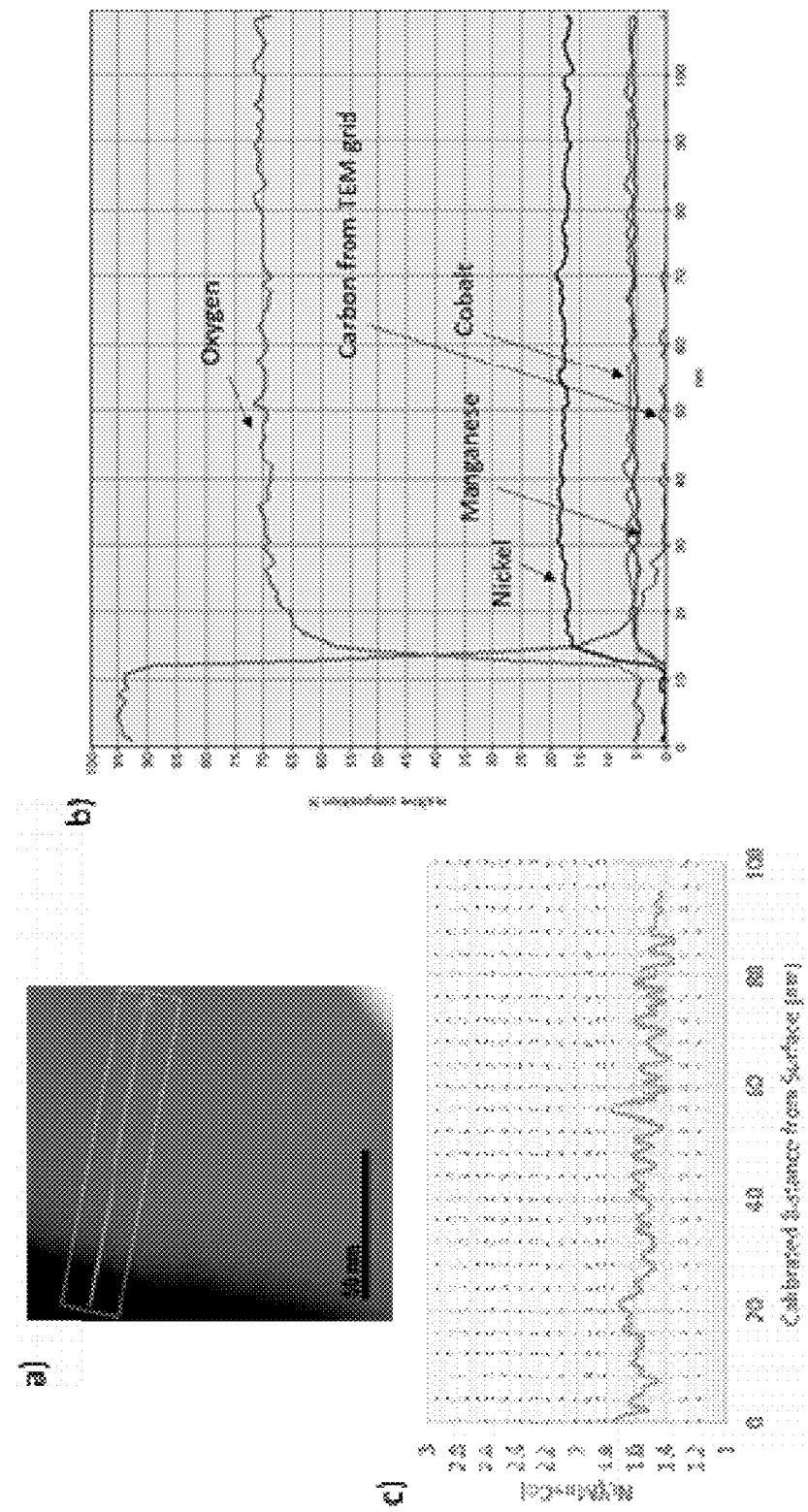
FIG. 26 shows in, section (a), a scanning transmission electron micrograph (STEM) image showing the area and the direction were a corresponding electron energy loss spectrograph (EELS) spectra were collected for a LR-NMC prepared according to Example 1 (LR-NMC 2). In section (b)

FIG. 25*a* and FIG. 26*a* show the direction of the chemical analysis EELS scan line. FIG. 25*b* shows the respective amounts of the constituent elements in the commercially available NMC. FIG. 26*b* shows the respective amounts of the constituent elements in the LR-NMC-1 prepared according to Example 1. FIG. 25C shows the concentration of Nickel as a function of distance from the surface of the particle analyzed. These results show that the commercially available source of the NMC compound has an inhomogeneous distribution of Nickel along the direction from the particle surface and towards the center of the particle, in particular at the surface region, where it is rich in nickel. In contrast, FIG. 26C shows the concentration of Nickel as a function of distance from the surface of the particle for the LR-NMC prepared according to Example 1. This result shows that the LR-NMC-1 particle has a homogeneous distribution of Nickel along the direction from the particle surface and towards the center of the particle. FIG. 26 also shows that the LR-NMC material prepared according to Example 1 has a homogenous distribution of transition metals.

I. Example 9—X-ray Absorption Spectroscopy (XAS) Analysis

Figure 27:
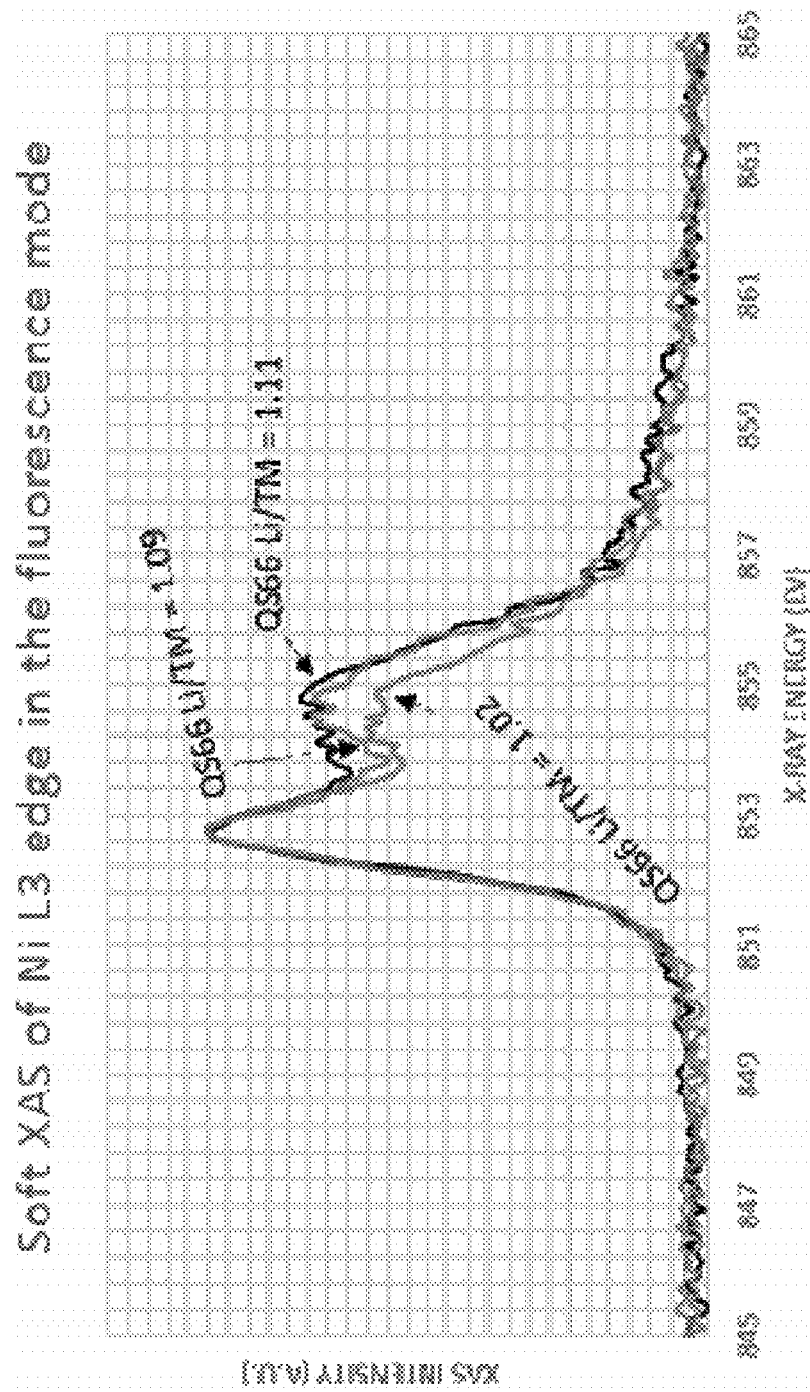
FIG. 27 shows Soft X-ray Absorption Spectroscopy (XAS) for LR-NMC compounds prepared according to Example 1 and having various Li/(transition metal) ratios. Li/Tm=molar ratio of lithium atoms with respect to the total transition metal atoms.

In this example, a series of LR-NMC compounds where prepared according to Example 1 but wherein the ratio of Li to the sum total of the transition metals was systematically varied. As shown in FIG. 27, as excess lithium is incorporated into the NMC bulk (i.e., the lattice) and over-lithiates the NMC, the average average oxidation state of the nickel also increase. This demonstrates that as the NMC is over lithiated, the lithium is not forming a secondary phase, e.g., Li2O, but is rather substituting for a transition metal at a transition metal lattice position. This substitution of Li for a transition metal causes the remaining unsubstituted transition metals to increase their oxidation number or create oxygen deficiencies in order to maintain charge neutrality.

As shown in FIG. 27, the Ni L3-edge soft X-ray absorption spectroscopy is shown for LR-NMC compounds with various Li/TM ratios prepared according to Example 1. The increased intensity of the peak centered at ~854 eV demonstrates the increase of nickel oxidation states. In the data presented in FIG. 27, nickel shows the highest oxidation state when the ratio of lithium to the sum total of the transition metals is about 1.11. In the data presented in FIG. 27, nickel shows the second highest oxidation state when the ratio of lithium to the sum total of the transition metals is about 1.09. In the data presented in FIG. 27, nickel shows the lowest oxidation state when the ratio of lithium to the sum total of the transition metals is about 1.02.

Although the foregoing embodiments have been described in some detail for purposes of clarity of understanding, it will be apparent that certain changes and modifications may be practiced within the scope of the appended claims. It should be noted that there are many alternative ways of implementing the processes, systems and apparatus of the present embodiments. Accordingly, the present embodiments are to be considered as illustrative and not restrictive, and the embodiments are not to be limited to the details given herein.

What is claimed is:

1. An oxygen-deficient positive electrode active material, characterized by the following formula: $Li_{1+x}Ni_yMn_wCo_zO_{2-(x/2)}$, wherein:
   $0.02 \leq x \leq 0.25$;
   $0.5 \leq y \leq 0.8$;
   $0.1 \leq w \leq 0.6$;
   $0.05 \leq z \leq 0.45$; and
   $y+w+z=1$.

2. The material of claim 1, wherein w=z.

3. The material of claim 1, wherein y>w and y>z.

4. The material of claim 1, wherein y>w+z.

5. The material of claim 1, wherein y >w.

6. The material of claim 1, wherein y is at least two times greater than w.

7. The material of claim 1, wherein y is at least two and a half times greater than w.

8. The material of claim 1, wherein y >z.

9. The material of claim 1, wherein an amount of the Li occupies Ni, Mn, or Co crystal lattice positions.

10. The material of claim 9, wherein an amount of the Li occupies Ni crystal lattice positions.

11. The material of claim 10, wherein an amount of the Li ranges from 0.1 to 25 mol %.

12. The material of claim 1, wherein the material is a layered-layered oxide.

13. The material of claim 12, wherein the material comprises at least two polycrystalline layered oxide phases.

14. The material of claim 13, wherein the at least two polycrystalline layered oxide phases are inter-grown phases.

15. The material of claim 13, comprising a third polycrystalline inter-growth layered oxide.

16. The material of claim 13, wherein one of the at least two crystalline layered oxide phases is $Li_2M^1O_3$ where $M^1$ is selected from Ni, Mn, and Co.

17. The material of claim 16, wherein the $Li_2M^1O_3$ is isostructural to $Na_2MnO_3$ and has C2/m symmetry.

18. The material of claim 13, wherein one of the at least two crystalline layered oxide phases is $Li_{1+x}M^2O_2$ where $M^2$ is selected from Ni, Mn, and Co.

19. The material of claim 18, wherein the $Li_{1+x}M^2O_2$ is iso-structural to $NaFeO_2$ and has R3m symmetry.

20. The material of claim 19, wherein the third polycrystalline inter-growth layered oxide is selected from a low voltage stability phase.

21. The material of claim 20, wherein the low voltage stability phase is a spinel phase.

22. The material of claim 13, wherein the material is described as a two-phase mixture $aLi_2M^1O_3 + (1-a)Li_{1+x}M^2O_2$, wherein:
   $0 \leq a \leq 0.3$;
   "a" is the relative mole fraction of $Li_2M^1O_3$;
   $0 \leq x \leq 0.1$; and
   "x" is the mole fraction of excess lithium in the material characterized by the formula $Li_{1+x}M^2O_2$.

23. The material of claim 1, further comprising a dopant selected from the group consisting of Al, Fe, Mg, Na, V, Cr, Ti, Zr and combinations thereof.

24. The material of claim 23, wherein the dopant is Al at a concentration of about 0.1 to about 5 mol %.

25. The material of claim 23, wherein the dopant is Fe at a concentration of about 0.1 to about 5 mol %.

26. The material of claim 23, wherein the dopant is a combination of Al and Fe at a total dopant concentration of about 5 mol %.

27. The material of claim 1, wherein the material is polycrystalline and characterized by a first X-ray diffraction (XRD) pattern intensity {003} peak at 19(2Θ) and a second XRD pattern intensity {101} peak at 38-39° (2Θ), and wherein the ratio of the first peak to the second peak is equal to or greater than 1.

28. The material of claim 27, wherein the ratio is greater than 1.5.

29. The material of claim 27, wherein the ratio is greater than 2.0.

30. The material of claim 1, wherein the material is polycrystalline.

31. The material of claim 1, wherein the unit cell of $Li_{1+x}M^2$ is characterized by a unit cell volume ranging from 95 to 120 Å$^3$.

32. The material of claim 31, wherein the unit cell of $Li_{1+x}M^2O_2$ is characterized by a unit cell volume ranging from 102 to 103 Å$^3$.

33. The material of claim 31, wherein the unit cell of $Li_{1+x}M^2O_2$ is characterized by a unit cell volume less than 102 Å$^3$.

34. The material of claim 31, wherein the unit cell is greater than 95 Å$^3$.

35. The material of claim 33, wherein x is 0.25.

36. The material of claim 1, having a specific capacity of at least 212 mAh/g and C/10 rate.

37. The material claim 1, having a specific energy density of at least 725 Wh/kg and 825 Wh/kg at 1C and C/10 rate, respectively.

38. The material of claim 1, having a specific energy density of at least 750 mWh/g at C/1 rate.

39. The material of claim 1, having a specific energy density of at least 680 mWh/g at 2C rate.

40. The material of claim 1, having a specific energy density of at least 820 Wh/kg at C/10 rate.

41. The material of claim 1, having a specific energy density of at least 740 Wh/kg at 1C rate.

42. The material of claim 1, wherein one of the at least one crystalline material therein has a grain size from about 50 nm to about 500 nm.

43. The material of claim 42, wherein the grain size is about 200 nm.

44. The material of claim 42, wherein the grain size is determined by analysis of a scanning electron microscopy image.

45. The material of claim 42, wherein the determined grain size is from the dominant or majority crystal phase.

46. The material of claim 1, characterized by one formula selected from the group consisting of:

$Li_{1+x}Ni_{0.5}Mn_{0.25}Co_{0.25}O_{2-(x/2)}$;
$Li_{1+x}Ni_{0.6}Mn_{0.20}Co_{0.20}O_{2-(x/2)}$;
$Li_{1+x}Ni_{0.55}Mn_{0.4}Co_{0.05}O_{2-(x/2)}$;
$Li_{1+x}Ni_{0.71}Mn_{0.15}Co_{0.14}O_{2-(x/2)}$;
$Li_{1+x}Ni_{0.71}Mn_{0.14}Co_{0.15}O_{2-(x/2)}$;
$Li_{1+x}Ni_{0.70}Mn_{0.15}Co_{0.15}O_{2-(x/2)}$.

47. The material of claim 1, further comprising a dopant selected from the group consisting of Al, Fe, Mg, Na, V, Cr, Ti, Zr and combinations thereof.

48. The material of claim 47, wherein the dopant is present at about 0.1 to 10 atomic %.

49. The material of claim 47, wherein the dopant is present at about 1 to 5 atomic %.

50. The material of claim 1, wherein the material has a surface coating selected from the group consisting of $AlF_x$ wherein $0 \leq x \leq 3$, $CoPO_4$, $LiFePO_4$, lithium phosphate, lithium hydroxyphosphate, cobalt oxide, alumina, aluminum phosphate, lithium aluminum phosphate, lithium aluminate, aluminum fluoride, titania, titanium phosphate, lithium titanate, lithium niobate, lithium zirconate, and lithiated or delithiated versions of the preceding compounds.

51. The material of claim 50, wherein the surface coating has a thickness less than 20 nm, 15 nm, 10 nm or 5 nm.

52. The material of claim 50, wherein the surface coating is aluminum fluoride, titania, or doped aluminum fluoride.

53. The material of claim 1, wherein the material is characterized by a tap density of 1-2.5 g/cm$^3$ for a $d_{50}$ particle size distribution from 4 to 30 μm.

54. A positive electrode comprising the material of claim 1.

55. An electrochemical device comprising a positive electrode comprising the material of claim 1.

56. The material of claim 1, wherein all of the Ni atoms have a Mn or Co nearest neighbor.

57. The material of claim 56, wherein no two Ni atoms are in direct contact or sharing an oxygen bond.

58. The material of claim 1, wherein a crystalline component is characterized by a unit cell that includes twenty (20) transition metal atoms.

59. The material of claim 58, wherein the twenty transition metal atoms comprise fourteen (14) Ni atoms, three (3) Mn atoms, and three (3) Co atoms.

60. The material of claim 1, wherein y is 0.71.

61. The material of claim 1, wherein w or z, or both are 0.14 or 0.15.

62. The material of claim 1, wherein y is 0.71 and the sum of w and z is 0.29.

63. The material of claim 1, wherein y is 0.70 and the sum of w and z is 0.30.

* * * * *